US010277054B2

(12) United States Patent
Hosseini et al.

(10) Patent No.: US 10,277,054 B2
(45) Date of Patent: Apr. 30, 2019

(54) NEAR-FIELD CHARGING PAD FOR WIRELESS POWER CHARGING OF A RECEIVER DEVICE THAT IS TEMPORARILY UNABLE TO COMMUNICATE

(71) Applicant: ENERGOUS CORPORATION, San Jose, CA (US)

(72) Inventors: Alister Hosseini, Long Beach, CA (US); Michael A. Leabman, San Ramon, CA (US)

(73) Assignee: Energous Corporation, San Jose, CA (US)

( * ) Notice: Subject to any disclaimer, the term of this patent is extended or adjusted under 35 U.S.C. 154(b) by 349 days.

(21) Appl. No.: 15/046,210

(22) Filed: Feb. 17, 2016

(65) Prior Publication Data

US 2017/0187224 A1    Jun. 29, 2017

Related U.S. Application Data

(60) Provisional application No. 62/387,205, filed on Dec. 24, 2015.

(51) Int. Cl.
*H02J 7/00* (2006.01)
*H02J 7/02* (2016.01)
(Continued)

(52) U.S. Cl.
CPC ............ *H02J 7/025* (2013.01); *H02J 7/0027* (2013.01); *H02J 7/027* (2013.01); *H02J 7/045* (2013.01);
(Continued)

(58) Field of Classification Search
CPC .......... H02J 7/025; H02J 7/0027; H02J 7/027; H02J 7/045; H02J 2007/0096; H04B 5/0037; H04W 8/005
See application file for complete search history.

(56) References Cited

U.S. PATENT DOCUMENTS 787,412 A    4/1905  Tesla
3,167,775 A   1/1965  Guertler
(Continued)

FOREIGN PATENT DOCUMENTS

CN    203826555 U    9/2014
CN    104090265 A   10/2014
(Continued)

OTHER PUBLICATIONS

Energous Corp., ISRWO, PCT/US2014/037170, Sep. 15, 2014, 11 pgs.
(Continued)

*Primary Examiner* — Drew A Dunn
*Assistant Examiner* — Sailesh Thapa
(74) *Attorney, Agent, or Firm* — Morgan, Lewis & Bockius LLP

(57) ABSTRACT

Disclosed is a system including RF circuitry configured to generate an RF signal; a plurality of unit cells configured to receive the RF signal and to cause an RF energy signal having a center frequency to be present within the unit cells; and receiver circuitry configured to charge an electronic device in response to an antenna of the electronic device receiving the RF energy signal when the antenna is tuned to the center frequency and positioned in a near-field distance from one or more of the unit cells.

24 Claims, 25 Drawing Sheets

(51) Int. Cl.
  *H02J 7/04* (2006.01)
  *H04B 5/00* (2006.01)
  *H04W 8/00* (2009.01)
  *H02J 50/20* (2016.01)

(52) U.S. Cl.
  CPC ............ *H02J 50/20* (2016.02); *H04B 5/0037* (2013.01); *H04W 8/005* (2013.01); *H02J 2007/0096* (2013.01)

(56) References Cited

U.S. PATENT DOCUMENTS

| | | | |
|---|---|---|---|
| 3,434,678 A | 3/1969 | Brown et al. |
| 3,696,384 A | 10/1972 | Lester |
| 3,754,269 A | 8/1973 | Clavin |
| 4,101,895 A | 7/1978 | Jones, Jr. |
| 4,360,741 A | 11/1982 | Fitzsimmons et al. |
| 4,944,036 A | 7/1990 | Hyatt |
| 4,995,010 A | 2/1991 | Knight |
| 5,200,759 A | 4/1993 | McGinnis |
| 5,211,471 A | 5/1993 | Rohrs |
| 5,548,292 A | 8/1996 | Hirshfield et al. |
| 5,556,749 A | 9/1996 | Mitsuhashi et al. |
| 5,568,088 A | 10/1996 | Dent et al. |
| 5,646,633 A | 7/1997 | Dahlberg |
| 5,697,063 A | 12/1997 | Kishigami et al. |
| 5,712,642 A | 1/1998 | Hulderman |
| 5,936,527 A | 8/1999 | Isaacman et al. |
| 5,982,139 A | 11/1999 | Parise |
| 6,046,708 A | 4/2000 | MacDonald, Jr. et al. |
| 6,127,799 A | 10/2000 | Krishnan |
| 6,127,942 A | 10/2000 | Welle |
| 6,163,296 A | 12/2000 | Lier et al. |
| 6,289,237 B1 | 9/2001 | Mickle et al. |
| 6,329,908 B1 | 12/2001 | Frecska |
| 6,421,235 B2 | 7/2002 | Ditzik |
| 6,437,685 B2 | 8/2002 | Hanaki |
| 6,456,253 B1 | 9/2002 | Rummeli et al. |
| 6,476,795 B1 | 11/2002 | Derocher et al. |
| 6,501,414 B2 | 12/2002 | Amdt et al. |
| 6,583,723 B2 | 6/2003 | Watanabe et al. |
| 6,597,897 B2 | 7/2003 | Tang |
| 6,615,074 B2 | 9/2003 | Mickle et al. |
| 6,650,376 B1 | 11/2003 | Obitsu |
| 6,664,920 B1 | 12/2003 | Mott et al. |
| 6,798,716 B1 | 9/2004 | Charych |
| 6,803,744 B1 | 10/2004 | Sabo |
| 6,853,197 B1 | 2/2005 | McFarland |
| 6,856,291 B2 | 2/2005 | Mickle et al. |
| 6,911,945 B2 | 6/2005 | Korva |
| 6,960,968 B2 | 11/2005 | Odendaal et al. |
| 6,967,462 B1 | 11/2005 | Landis |
| 6,988,026 B2 | 1/2006 | Breed et al. |
| 7,003,350 B2 | 2/2006 | Denker et al. |
| 7,027,311 B2 | 4/2006 | Vanderelli et al. |
| 7,068,234 B2 | 6/2006 | Sievenpiper |
| 7,068,991 B2 | 6/2006 | Parise |
| 7,183,748 B1 | 2/2007 | Unno et al. |
| 7,191,013 B1 | 3/2007 | Miranda et al. |
| 7,196,663 B2 | 3/2007 | Bolzer et al. |
| 7,205,749 B2 | 4/2007 | Hagen et al. |
| 7,222,356 B1 | 5/2007 | Yonezawa et al. |
| 7,274,334 B2 | 9/2007 | o'riordan et al. |
| 7,274,336 B2 | 9/2007 | Carson |
| 7,351,975 B2 | 4/2008 | Brady et al. |
| 7,359,730 B2 | 4/2008 | Dennis et al. |
| 7,392,068 B2 | 6/2008 | Dayan |
| 7,403,803 B2 | 7/2008 | Mickle et al. |
| 7,443,057 B2 | 10/2008 | Nunally |
| 7,451,839 B2 | 11/2008 | Perlman |
| 7,463,201 B2 | 12/2008 | Chiang et al. |
| 7,471,247 B2 | 12/2008 | Saily |
| 7,535,195 B1 | 5/2009 | Horovitz et al. |
| 7,614,556 B2 | 11/2009 | Overhultz et al. |
| 7,639,994 B2 | 12/2009 | Greene et al. |
| 7,643,312 B2 | 1/2010 | Vanderelli et al. |
| 7,652,577 B1 | 1/2010 | Madhow et al. |
| 7,679,576 B2 | 3/2010 | Riedel et al. |
| 7,702,771 B2 | 4/2010 | Ewing et al. |
| 7,786,419 B2 | 8/2010 | Hyde et al. |
| 7,812,771 B2 | 10/2010 | Greene et al. |
| 7,830,312 B2 | 11/2010 | Choudhury et al. |
| 7,844,306 B2 | 11/2010 | Shearer et al. |
| 7,868,482 B2 | 1/2011 | Greene et al. |
| 7,898,105 B2 | 3/2011 | Greene et al. |
| 7,904,117 B2 | 3/2011 | Doan et al. |
| 7,911,386 B1 | 3/2011 | Ito et al. |
| 7,925,308 B2 | 4/2011 | Greene et al. |
| 7,948,208 B2 | 5/2011 | Partovi et al. |
| 8,055,003 B2 | 11/2011 | Mittleman et al. |
| 8,070,595 B2 | 12/2011 | Alderucci et al. |
| 8,072,380 B2 | 12/2011 | Crouch |
| 8,092,301 B2 | 1/2012 | Alderucci et al. |
| 8,099,140 B2 | 1/2012 | Arai |
| 8,115,448 B2 | 2/2012 | John |
| 8,159,090 B2 | 4/2012 | Greene et al. |
| 8,159,364 B2 | 4/2012 | Zeine |
| 8,180,286 B2 | 5/2012 | Yamasuge |
| 8,228,194 B2 | 7/2012 | Mickle |
| 8,234,509 B2 | 7/2012 | Gioscia et al. |
| 8,264,101 B2 | 9/2012 | Hyde et al. |
| 8,264,291 B2 | 9/2012 | Morita |
| 8,276,325 B2 | 10/2012 | Clifton et al. |
| 8,278,784 B2 | 10/2012 | Cook et al. |
| 8,284,101 B2 | 10/2012 | Fusco |
| 8,310,201 B1 | 11/2012 | Wright |
| 8,338,991 B2 | 12/2012 | Von Novak et al. |
| 8,362,745 B2 | 1/2013 | Tinaphong |
| 8,380,255 B2 | 2/2013 | Shearer et al. |
| 8,410,953 B2 | 4/2013 | Zeine |
| 8,411,963 B2 | 4/2013 | Luff |
| 8,432,062 B2 | 4/2013 | Greene et al. |
| 8,432,071 B2 | 4/2013 | Huang et al. |
| 8,446,248 B2 | 5/2013 | Zeine |
| 8,447,234 B2 | 5/2013 | Cook et al. |
| 8,451,189 B1 | 5/2013 | Fluhler |
| 8,452,235 B2 | 5/2013 | Kirby et al. |
| 8,457,656 B2 | 6/2013 | Perkins et al. |
| 8,461,817 B2 | 6/2013 | Martin et al. |
| 8,467,733 B2 | 6/2013 | Leabman |
| 8,497,601 B2 | 7/2013 | Hall et al. |
| 8,497,658 B2 | 7/2013 | Von Novak et al. |
| 8,552,597 B2 | 8/2013 | Song et al. |
| 8,558,661 B2 | 10/2013 | Zeine |
| 8,560,026 B2 | 10/2013 | Chanterac |
| 8,604,746 B2 | 12/2013 | Lee |
| 8,614,643 B2 | 12/2013 | Leabman |
| 8,621,245 B2 | 12/2013 | Shearer et al. |
| 8,626,249 B2 | 1/2014 | Kuusilinna et al. |
| 8,629,576 B2 | 1/2014 | Levine |
| 8,653,966 B2 | 2/2014 | Rao et al. |
| 8,674,551 B2 | 3/2014 | Low et al. |
| 8,686,685 B2 | 4/2014 | Moshfeghi |
| 8,712,355 B2 | 4/2014 | Black et al. |
| 8,712,485 B2 | 4/2014 | Tam |
| 8,718,773 B2 | 5/2014 | Wills et al. |
| 8,729,737 B2 | 5/2014 | Schatz et al. |
| 8,736,228 B1 | 5/2014 | Freed et al. |
| 8,760,113 B2 | 6/2014 | Keating |
| 8,770,482 B2 | 7/2014 | Ackermann et al. |
| 8,772,960 B2 | 7/2014 | Yoshida |
| 8,823,319 B2 | 9/2014 | Von Novak, III et al. |
| 8,832,646 B1 | 9/2014 | Wendling |
| 8,854,176 B2 | 10/2014 | Zeine |
| 8,860,364 B2 | 10/2014 | Low et al. |
| 8,897,770 B1 | 11/2014 | Frolov et al. |
| 8,903,456 B2 | 12/2014 | Chu et al. |
| 8,917,057 B2 | 12/2014 | Hui |
| 8,923,189 B2 | 12/2014 | Leabman |
| 8,928,544 B2 | 1/2015 | Massie et al. |
| 8,937,408 B2 | 1/2015 | Ganem et al. |
| 8,946,940 B2 | 2/2015 | Kim et al. |
| 8,963,486 B2 | 2/2015 | Kirby et al. |
| 8,970,070 B2 | 3/2015 | Sada et al. |

(56) References Cited

U.S. PATENT DOCUMENTS

| | | |
|---|---|---|
| 8,989,053 B1 | 3/2015 | Skaaksrud et al. |
| 9,000,616 B2 | 4/2015 | Greene et al. |
| 9,001,622 B2 | 4/2015 | Perry |
| 9,006,934 B2 | 4/2015 | Kozakai et al. |
| 9,021,277 B2 | 4/2015 | Shearer et al. |
| 9,030,161 B2 | 5/2015 | Lu et al. |
| 9,059,598 B2 | 6/2015 | Kang et al. |
| 9,059,599 B2 | 6/2015 | Won et al. |
| 9,077,188 B2 | 7/2015 | Moshfeghi |
| 9,083,595 B2 | 7/2015 | Rakib et al. |
| 9,088,216 B2 | 7/2015 | Garrity et al. |
| 9,124,125 B2 | 9/2015 | Leabman et al. |
| 9,130,397 B2 | 9/2015 | Leabman et al. |
| 9,130,602 B2 | 9/2015 | Cook |
| 9,142,998 B2 | 9/2015 | Yu et al. |
| 9,143,000 B2 | 9/2015 | Leabman et al. |
| 9,143,010 B2 | 9/2015 | Urano |
| 9,178,389 B2 | 11/2015 | Hwang |
| 9,225,196 B2 | 12/2015 | Huang et al. |
| 9,240,469 B2 | 1/2016 | Sun et al. |
| 9,242,411 B2 | 1/2016 | Kritchman et al. |
| 9,244,500 B2 | 1/2016 | Cain et al. |
| 9,252,628 B2 | 2/2016 | Leabman et al. |
| 9,270,344 B2 | 2/2016 | Rosenberg |
| 9,282,582 B1 | 3/2016 | Dunsbergen et al. |
| 9,294,840 B1 | 3/2016 | Anderson et al. |
| 9,297,896 B1 | 3/2016 | Andrews |
| 9,318,898 B2 | 4/2016 | John |
| 9,368,020 B1 | 6/2016 | Bell et al. |
| 9,401,977 B1 | 7/2016 | Gaw |
| 9,409,490 B2 | 8/2016 | Kawashima |
| 9,438,045 B1 | 9/2016 | Leabman |
| 9,438,046 B1 | 9/2016 | Leabman |
| 9,444,283 B2 | 9/2016 | Son et al. |
| 9,450,449 B1 | 9/2016 | Leabman et al. |
| 9,461,502 B2 | 10/2016 | Lee et al. |
| 9,520,725 B2 | 12/2016 | Masaoka et al. |
| 9,520,748 B2 | 12/2016 | Hyde et al. |
| 9,522,270 B2 | 12/2016 | Perryman et al. |
| 9,537,354 B2 | 1/2017 | Bell et al. |
| 9,537,357 B2 | 1/2017 | Leabman |
| 9,537,358 B2 | 1/2017 | Leabman |
| 9,538,382 B2 | 1/2017 | Bell et al. |
| 9,544,640 B2 | 1/2017 | Lau |
| 9,559,553 B2 | 1/2017 | Bae |
| 9,564,773 B2 | 2/2017 | Pogorelik et al. |
| 9,571,974 B2 | 2/2017 | Choi et al. |
| 9,590,317 B2 | 3/2017 | Zimmerman et al. |
| 9,590,444 B2 | 3/2017 | Walley |
| 9,620,996 B2 | 4/2017 | Zeine |
| 9,647,328 B2 | 5/2017 | Dobric |
| 9,711,999 B2 | 7/2017 | Hietala et al. |
| 9,723,635 B2 | 8/2017 | Nambord et al. |
| 9,793,758 B2 | 10/2017 | Leabman |
| 9,793,764 B2 | 10/2017 | Perry |
| 9,806,564 B2 | 10/2017 | Leabman |
| 9,819,230 B2 | 11/2017 | Petras et al. |
| 9,866,279 B2 | 1/2018 | Bell et al. |
| 2001/0027876 A1 | 10/2001 | Tsukamoto et al. |
| 2002/0001307 A1 | 1/2002 | Nguyen et al. |
| 2002/0024471 A1 | 2/2002 | Ishitobi |
| 2002/0028655 A1 | 3/2002 | Rosener et al. |
| 2002/0034958 A1 | 3/2002 | Oberschmidt et al. |
| 2002/0054330 A1 | 5/2002 | Jinbo et al. |
| 2002/0065052 A1 | 5/2002 | Pande et al. |
| 2002/0072784 A1 | 6/2002 | Sheppard et al. |
| 2002/0095980 A1 | 7/2002 | Breed et al. |
| 2002/0103447 A1 | 8/2002 | Terry |
| 2002/0133592 A1 | 9/2002 | Matsuda |
| 2002/0172223 A1 | 11/2002 | Stilp |
| 2003/0005759 A1 | 1/2003 | Breed et al. |
| 2003/0058187 A1 | 3/2003 | Billiet et al. |
| 2003/0076274 A1 | 4/2003 | Phelan et al. |
| 2003/0179152 A1 | 9/2003 | Watada et al. |
| 2003/0179573 A1 | 9/2003 | Chun |
| 2003/0192053 A1 | 10/2003 | Sheppard et al. |
| 2004/0019624 A1 | 1/2004 | Sukegawa |
| 2004/0020100 A1 | 2/2004 | O'Brian et al. |
| 2004/0036657 A1 | 2/2004 | Forster et al. |
| 2004/0066251 A1 | 4/2004 | Eleftheriades et al. |
| 2004/0107641 A1 | 6/2004 | Walton et al. |
| 2004/0113543 A1 | 6/2004 | Daniels |
| 2004/0119675 A1 | 6/2004 | Washio et al. |
| 2004/0130425 A1 | 7/2004 | Dayan et al. |
| 2004/0130442 A1 | 7/2004 | Breed |
| 2004/0142733 A1 | 7/2004 | Parise |
| 2004/0145342 A1 | 7/2004 | Lyon |
| 2004/0196190 A1 | 10/2004 | Mendolia et al. |
| 2004/0203979 A1 | 10/2004 | Attar et al. |
| 2004/0207559 A1 | 10/2004 | Milosavljevic |
| 2004/0218759 A1 | 11/2004 | Yacobi |
| 2004/0259604 A1 | 12/2004 | Mickle et al. |
| 2004/0263124 A1 | 12/2004 | Wieck et al. |
| 2005/0007276 A1 | 1/2005 | Barrick et al. |
| 2005/0030118 A1 | 2/2005 | Wang |
| 2005/0046584 A1 | 3/2005 | Breed |
| 2005/0055316 A1 | 3/2005 | Williams |
| 2005/0093766 A1 | 5/2005 | Turner |
| 2005/0116683 A1 | 6/2005 | Cheng |
| 2005/0117660 A1 | 6/2005 | Vialle et al. |
| 2005/0134517 A1 | 6/2005 | Gottl |
| 2005/0171411 A1 | 8/2005 | KenKnight |
| 2005/0198673 A1 | 9/2005 | Kit et al. |
| 2005/0227619 A1 | 10/2005 | Lee et al. |
| 2005/0232469 A1 | 10/2005 | Schofield |
| 2005/0237249 A1 | 10/2005 | Nagel |
| 2005/0237258 A1 | 10/2005 | Abramov et al. |
| 2005/0282591 A1 | 12/2005 | Shaff |
| 2006/0013335 A1 | 1/2006 | Leabman |
| 2006/0019712 A1 | 1/2006 | Choi |
| 2006/0030279 A1 | 2/2006 | Leabman et al. |
| 2006/0033674 A1 | 2/2006 | Essig, Jr. et al. |
| 2006/0071308 A1 | 4/2006 | Tang et al. |
| 2006/0092079 A1 | 5/2006 | de Rochemont |
| 2006/0094425 A1 | 5/2006 | Mickle et al. |
| 2006/0113955 A1 | 6/2006 | Nunally |
| 2006/0119532 A1 | 6/2006 | Yun et al. |
| 2006/0136004 A1 | 6/2006 | Cowan et al. |
| 2006/0160517 A1 | 7/2006 | Yoon |
| 2006/0183473 A1 | 8/2006 | Ukon |
| 2006/0190063 A1 | 8/2006 | Kanzius |
| 2006/0192913 A1 | 8/2006 | Shutou et al. |
| 2006/0199620 A1 | 9/2006 | Greene et al. |
| 2006/0238365 A1 | 10/2006 | Vecchione et al. |
| 2006/0266564 A1 | 11/2006 | Perlman et al. |
| 2006/0266917 A1 | 11/2006 | Baldis et al. |
| 2006/0278706 A1 | 12/2006 | Hatakayama et al. |
| 2006/0284593 A1 | 12/2006 | Nagy et al. |
| 2006/0287094 A1 | 12/2006 | Mahaffey et al. |
| 2007/0007821 A1 | 1/2007 | Rossetti |
| 2007/0019693 A1 | 1/2007 | Graham |
| 2007/0021140 A1 | 1/2007 | Keyes |
| 2007/0060185 A1 | 3/2007 | Simon et al. |
| 2007/0070490 A1 | 3/2007 | Tsunoda et al. |
| 2007/0090997 A1 | 4/2007 | Brown et al. |
| 2007/0093269 A1 | 4/2007 | Leabman et al. |
| 2007/0097653 A1 | 5/2007 | Gilliland et al. |
| 2007/0103110 A1 | 5/2007 | Sagoo |
| 2007/0106894 A1 | 5/2007 | Zhang |
| 2007/0109121 A1 | 5/2007 | Cohen |
| 2007/0139000 A1 | 6/2007 | Kozuma |
| 2007/0149162 A1 | 6/2007 | Greene et al. |
| 2007/0164868 A1 | 7/2007 | Deavours et al. |
| 2007/0173196 A1 | 7/2007 | Gallic |
| 2007/0173214 A1 | 7/2007 | Mickle et al. |
| 2007/0178857 A1 | 8/2007 | Greene et al. |
| 2007/0178945 A1 | 8/2007 | Cook et al. |
| 2007/0182367 A1 | 8/2007 | Partovi |
| 2007/0191074 A1 | 8/2007 | Harrist et al. |
| 2007/0191075 A1 | 8/2007 | Greene et al. |
| 2007/0197281 A1 | 8/2007 | Stronach |
| 2007/0210960 A1 | 9/2007 | Rofougaran et al. |
| 2007/0222681 A1 | 9/2007 | Greene et al. |
| 2007/0257634 A1 | 11/2007 | Leschin et al. |

(56) References Cited

U.S. PATENT DOCUMENTS

| | | |
|---|---|---|
| 2007/0273486 A1 | 11/2007 | Shiotsu |
| 2007/0296639 A1 | 12/2007 | Hook et al. |
| 2007/0298846 A1 | 12/2007 | Greene et al. |
| 2008/0014897 A1 | 1/2008 | Cook et al. |
| 2008/0024376 A1 | 1/2008 | Norris et al. |
| 2008/0048917 A1 | 2/2008 | Achour et al. |
| 2008/0062062 A1 | 3/2008 | Borau et al. |
| 2008/0062255 A1 | 3/2008 | Gal |
| 2008/0067874 A1 | 3/2008 | Tseng |
| 2008/0074324 A1 | 3/2008 | Puzella et al. |
| 2008/0089277 A1 | 4/2008 | Aledander et al. |
| 2008/0110263 A1 | 5/2008 | Klessel et al. |
| 2008/0113816 A1 | 5/2008 | Mahaffey et al. |
| 2008/0122297 A1 | 5/2008 | Arai |
| 2008/0123383 A1 | 5/2008 | Shionoiri |
| 2008/0129536 A1 | 6/2008 | Randall et al. |
| 2008/0140278 A1 | 6/2008 | Breed |
| 2008/0169910 A1 | 7/2008 | Greene et al. |
| 2008/0197802 A1 | 8/2008 | Onishi |
| 2008/0204342 A1 | 8/2008 | Kharadly |
| 2008/0204350 A1 | 8/2008 | Tam et al. |
| 2008/0210762 A1 | 9/2008 | Osada et al. |
| 2008/0211458 A1 | 9/2008 | Lawther et al. |
| 2008/0233890 A1 | 9/2008 | Baker |
| 2008/0248758 A1 | 10/2008 | Schedelbeck et al. |
| 2008/0248846 A1 | 10/2008 | Stronach et al. |
| 2008/0258993 A1 | 10/2008 | Gummalla et al. |
| 2008/0266191 A1 | 10/2008 | Hilgers |
| 2008/0278378 A1 | 11/2008 | Chang et al. |
| 2008/0309452 A1 | 12/2008 | Zeine |
| 2009/0002493 A1 | 1/2009 | Kates |
| 2009/0019183 A1 | 1/2009 | Wu et al. |
| 2009/0036065 A1 | 2/2009 | Siu |
| 2009/0047998 A1 | 2/2009 | Alberth, Jr. |
| 2009/0058354 A1 | 3/2009 | Harrison |
| 2009/0058361 A1 | 3/2009 | John |
| 2009/0058731 A1 | 3/2009 | Geary et al. |
| 2009/0067208 A1 | 3/2009 | Martin et al. |
| 2009/0096412 A1 | 4/2009 | Huang |
| 2009/0096413 A1 | 4/2009 | Partovi |
| 2009/0102292 A1 | 4/2009 | Cook et al. |
| 2009/0102296 A1 | 4/2009 | Greene et al. |
| 2009/0108679 A1 | 4/2009 | Porwal |
| 2009/0122847 A1 | 5/2009 | Nysen et al. |
| 2009/0128262 A1 | 5/2009 | Lee et al. |
| 2009/0157911 A1 | 6/2009 | Aihara |
| 2009/0200985 A1 | 8/2009 | Zane et al. |
| 2009/0206791 A1 | 8/2009 | Jung |
| 2009/0207090 A1 | 8/2009 | Pettus et al. |
| 2009/0207092 A1 | 8/2009 | Nysen et al. |
| 2009/0218884 A1 | 9/2009 | Soar |
| 2009/0218891 A1 | 9/2009 | McCollough |
| 2009/0219903 A1 | 9/2009 | Alamouti et al. |
| 2009/0243397 A1 | 10/2009 | Cook et al. |
| 2009/0264069 A1 | 10/2009 | Yamasuge |
| 2009/0280866 A1 | 11/2009 | Lo et al. |
| 2009/0281678 A1 | 11/2009 | Wakamatsu |
| 2009/0284082 A1 | 11/2009 | Mohammadian |
| 2009/0284083 A1 | 11/2009 | Karalis et al. |
| 2009/0284220 A1 | 11/2009 | Toncich et al. |
| 2009/0284227 A1 | 11/2009 | Mohammadian et al. |
| 2009/0284325 A1 | 11/2009 | Rossiter et al. |
| 2009/0286475 A1 | 11/2009 | Toncich et al. |
| 2009/0291634 A1 | 11/2009 | Saarisalo |
| 2009/0299175 A1 | 12/2009 | Bernstein et al. |
| 2009/0312046 A1 | 12/2009 | Clevenger et al. |
| 2009/0315412 A1 | 12/2009 | Yamamoto et al. |
| 2009/0322281 A1 | 12/2009 | Kamijo et al. |
| 2010/0001683 A1 | 1/2010 | Huang et al. |
| 2010/0007307 A1 | 1/2010 | Baarman et al. |
| 2010/0007569 A1 | 1/2010 | Sim et al. |
| 2010/0019686 A1 | 1/2010 | Gutierrez, Jr. |
| 2010/0019908 A1 | 1/2010 | Cho et al. |
| 2010/0026605 A1 | 2/2010 | Yang et al. |
| 2010/0027379 A1 | 2/2010 | Saulnier et al. |
| 2010/0029383 A1 | 2/2010 | Dai |
| 2010/0033021 A1 | 2/2010 | Bennett |
| 2010/0033390 A1 | 2/2010 | Alamouti et al. |
| 2010/0034238 A1 | 2/2010 | Bennett |
| 2010/0041453 A1 | 2/2010 | Grimm, Jr. |
| 2010/0044123 A1 | 2/2010 | Perlman et al. |
| 2010/0054200 A1 | 3/2010 | Tsai |
| 2010/0060534 A1 | 3/2010 | Oodachi |
| 2010/0066631 A1 | 3/2010 | Puzella et al. |
| 2010/0075607 A1 | 3/2010 | Hosoya |
| 2010/0079005 A1 | 4/2010 | Hyde et al. |
| 2010/0082193 A1 | 4/2010 | Chiappetta |
| 2010/0087227 A1 | 4/2010 | Francos et al. |
| 2010/0090524 A1 | 4/2010 | Obayashi |
| 2010/0090656 A1 | 4/2010 | Shearer et al. |
| 2010/0109443 A1 | 5/2010 | Cook et al. |
| 2010/0117926 A1 | 5/2010 | DeJean, II |
| 2010/0119234 A1 | 5/2010 | Suematsu et al. |
| 2010/0123618 A1 | 5/2010 | Martin et al. |
| 2010/0123624 A1 | 5/2010 | Minear et al. |
| 2010/0127660 A1 | 5/2010 | Cook et al. |
| 2010/0142418 A1 | 6/2010 | Nishioka et al. |
| 2010/0142509 A1 | 6/2010 | Zhu et al. |
| 2010/0148723 A1 | 6/2010 | Cook et al. |
| 2010/0151808 A1 | 6/2010 | Toncich et al. |
| 2010/0156721 A1 | 6/2010 | Alamouti et al. |
| 2010/0156741 A1 | 6/2010 | Vazquez et al. |
| 2010/0164296 A1 | 7/2010 | Kurs et al. |
| 2010/0164433 A1 | 7/2010 | Janefalker et al. |
| 2010/0171461 A1 | 7/2010 | Baarman et al. |
| 2010/0174629 A1 | 7/2010 | Taylor et al. |
| 2010/0176934 A1 | 7/2010 | Chou et al. |
| 2010/0181961 A1 | 7/2010 | Novak et al. |
| 2010/0181964 A1 | 7/2010 | Huggins et al. |
| 2010/0194206 A1 | 8/2010 | Burdo et al. |
| 2010/0201189 A1 | 8/2010 | Kirby et al. |
| 2010/0201201 A1 | 8/2010 | Mobarhan et al. |
| 2010/0201314 A1 | 8/2010 | Toncich et al. |
| 2010/0207572 A1 | 8/2010 | Kirby et al. |
| 2010/0210233 A1 | 8/2010 | Cook et al. |
| 2010/0213895 A1 | 8/2010 | Keating et al. |
| 2010/0214177 A1 | 8/2010 | Parsche |
| 2010/0225270 A1 | 9/2010 | Jacobs et al. |
| 2010/0227570 A1 | 9/2010 | Hendin |
| 2010/0231470 A1 | 9/2010 | Lee et al. |
| 2010/0237709 A1 | 9/2010 | Hall et al. |
| 2010/0244576 A1 | 9/2010 | Hillan et al. |
| 2010/0256831 A1 | 10/2010 | Abramo et al. |
| 2010/0259110 A1 | 10/2010 | Kurs et al. |
| 2010/0259447 A1 | 10/2010 | Crouch |
| 2010/0264747 A1 | 10/2010 | Hall et al. |
| 2010/0277003 A1 | 11/2010 | Von Novak et al. |
| 2010/0277121 A1 | 11/2010 | Hall et al. |
| 2010/0279606 A1 | 11/2010 | Hillan et al. |
| 2010/0289341 A1 | 11/2010 | Ozaki et al. |
| 2010/0295372 A1 | 11/2010 | Hyde et al. |
| 2010/0308767 A1 | 12/2010 | Rofougaran et al. |
| 2010/0309079 A1 | 12/2010 | Rofougaran et al. |
| 2010/0309088 A1 | 12/2010 | Hyvonen et al. |
| 2010/0315045 A1 | 12/2010 | Zeine |
| 2010/0316163 A1 | 12/2010 | Forenza et al. |
| 2010/0327766 A1 | 12/2010 | Recker et al. |
| 2010/0328044 A1 | 12/2010 | Waffenschmidt et al. |
| 2010/0332401 A1 | 12/2010 | Prahlad et al. |
| 2011/0013198 A1 | 1/2011 | Shirley |
| 2011/0018360 A1 | 1/2011 | Baarman et al. |
| 2011/0028114 A1 | 2/2011 | Kerselaers |
| 2011/0031928 A1 | 2/2011 | Soar |
| 2011/0032149 A1 | 2/2011 | Leabman |
| 2011/0032866 A1 | 2/2011 | Leabman |
| 2011/0034190 A1 | 2/2011 | Leabman |
| 2011/0034191 A1 | 2/2011 | Leabman |
| 2011/0043047 A1 | 2/2011 | Karalis et al. |
| 2011/0043163 A1 | 2/2011 | Baarman et al. |
| 2011/0043327 A1 | 2/2011 | Baarman et al. |
| 2011/0050166 A1 | 3/2011 | Cook et al. |
| 2011/0055037 A1 | 3/2011 | Hayashigawa et al. |
| 2011/0056215 A1 | 3/2011 | Ham |
| 2011/0057607 A1 | 3/2011 | Carobolante |

(56) References Cited

U.S. PATENT DOCUMENTS

| | | |
|---|---|---|
| 2011/0062788 A1 | 3/2011 | Chen et al. |
| 2011/0074342 A1 | 3/2011 | MacLaughlin |
| 2011/0074349 A1 | 3/2011 | Ghovanloo |
| 2011/0074620 A1 | 3/2011 | Wintermantel |
| 2011/0078092 A1 | 3/2011 | Kim et al. |
| 2011/0090126 A1 | 4/2011 | Szini et al. |
| 2011/0109167 A1 | 5/2011 | Park et al. |
| 2011/0114401 A1 | 5/2011 | Kanno et al. |
| 2011/0115303 A1 | 5/2011 | Baarman et al. |
| 2011/0115432 A1 | 5/2011 | El-Maleh |
| 2011/0115605 A1 | 5/2011 | Dimig et al. |
| 2011/0121660 A1 | 5/2011 | Azancot et al. |
| 2011/0122018 A1 | 5/2011 | Tarng et al. |
| 2011/0122026 A1 | 5/2011 | DeLaquil et al. |
| 2011/0127845 A1 | 6/2011 | Walley et al. |
| 2011/0127952 A1 | 6/2011 | Walley et al. |
| 2011/0133655 A1 | 6/2011 | Recker et al. |
| 2011/0133691 A1 | 6/2011 | Hautanen |
| 2011/0148578 A1 | 6/2011 | Aloi et al. |
| 2011/0151789 A1 | 6/2011 | Viglione et al. |
| 2011/0154429 A1 | 6/2011 | Stantchev |
| 2011/0156494 A1 | 6/2011 | Mashinsky |
| 2011/0156640 A1 | 6/2011 | Moshfeghi |
| 2011/0163128 A1 | 7/2011 | Taguchi et al. |
| 2011/0175455 A1 | 7/2011 | Hashiguchi |
| 2011/0175461 A1 | 7/2011 | Tinaphong |
| 2011/0181120 A1 | 7/2011 | Liu et al. |
| 2011/0182245 A1 | 7/2011 | Malkamaki et al. |
| 2011/0184842 A1 | 7/2011 | Melen |
| 2011/0188207 A1 | 8/2011 | Won et al. |
| 2011/0194543 A1 | 8/2011 | Zhao et al. |
| 2011/0195722 A1 | 8/2011 | Walter et al. |
| 2011/0199046 A1 | 8/2011 | Tsai et al. |
| 2011/0215086 A1 | 9/2011 | Yeh |
| 2011/0217923 A1 | 9/2011 | Ma |
| 2011/0220634 A1 | 9/2011 | Yeh |
| 2011/0221389 A1 | 9/2011 | Won et al. |
| 2011/0222272 A1 | 9/2011 | Yeh |
| 2011/0243040 A1 | 10/2011 | Khan et al. |
| 2011/0243050 A1 | 10/2011 | Yanover |
| 2011/0244913 A1 | 10/2011 | Kim et al. |
| 2011/0248573 A1 | 10/2011 | Kanno et al. |
| 2011/0248575 A1 | 10/2011 | Kim et al. |
| 2011/0249678 A1 | 10/2011 | Bonicatto |
| 2011/0254377 A1 | 10/2011 | Widmer et al. |
| 2011/0254503 A1 | 10/2011 | Widmer et al. |
| 2011/0259953 A1 | 10/2011 | Baarman et al. |
| 2011/0273977 A1 | 11/2011 | Shapira et al. |
| 2011/0278941 A1 | 11/2011 | Krishna et al. |
| 2011/0279226 A1 | 11/2011 | Chen et al. |
| 2011/0281535 A1 | 11/2011 | Low et al. |
| 2011/0282415 A1 | 11/2011 | Eckhoff et al. |
| 2011/0285213 A1 | 11/2011 | Kowalewski |
| 2011/0286374 A1 | 11/2011 | Shin et al. |
| 2011/0291489 A1 | 12/2011 | Tsai et al. |
| 2011/0302078 A1 | 12/2011 | Failing |
| 2011/0304216 A1 | 12/2011 | Baarman |
| 2011/0304437 A1 | 12/2011 | Beeler |
| 2011/0304521 A1 | 12/2011 | Ando et al. |
| 2012/0013196 A1 | 1/2012 | Kim et al. |
| 2012/0013198 A1 | 1/2012 | Uramoto et al. |
| 2012/0013296 A1 | 1/2012 | Heydari et al. |
| 2012/0019419 A1 | 1/2012 | Prat et al. |
| 2012/0043887 A1 | 2/2012 | Mesibov |
| 2012/0051109 A1 | 3/2012 | Kim et al. |
| 2012/0051294 A1 | 3/2012 | Guillouard |
| 2012/0056486 A1 | 3/2012 | Endo et al. |
| 2012/0056741 A1 | 3/2012 | Zhu et al. |
| 2012/0068906 A1 | 3/2012 | Asher et al. |
| 2012/0074891 A1 | 3/2012 | Anderson et al. |
| 2012/0080957 A1* | 4/2012 | Cooper ............... H02J 5/005 307/104 |
| 2012/0086284 A1 | 4/2012 | Capanella et al. |
| 2012/0095617 A1 | 4/2012 | Martin et al. |
| 2012/0098350 A1 | 4/2012 | Campanella et al. |
| 2012/0098485 A1 | 4/2012 | Kang et al. |
| 2012/0099675 A1 | 4/2012 | Kitamura et al. |
| 2012/0103562 A1 | 5/2012 | Clayton |
| 2012/0104849 A1 | 5/2012 | Jackson |
| 2012/0105252 A1 | 5/2012 | Wang |
| 2012/0112532 A1 | 5/2012 | Kesler et al. |
| 2012/0119914 A1 | 5/2012 | Uchida |
| 2012/0126743 A1 | 5/2012 | Rivers, Jr. |
| 2012/0132647 A1 | 5/2012 | Beverly et al. |
| 2012/0133214 A1 | 5/2012 | Yun et al. |
| 2012/0146426 A1 | 6/2012 | Sabo |
| 2012/0146576 A1 | 6/2012 | Partovi |
| 2012/0146577 A1 | 6/2012 | Tanabe |
| 2012/0147802 A1 | 6/2012 | Ukita et al. |
| 2012/0149307 A1 | 6/2012 | Terada et al. |
| 2012/0150670 A1 | 6/2012 | Taylor et al. |
| 2012/0153894 A1 | 6/2012 | Widmer et al. |
| 2012/0157019 A1 | 6/2012 | Li |
| 2012/0161531 A1 | 6/2012 | Kim et al. |
| 2012/0161544 A1 | 6/2012 | Kashiwagi et al. |
| 2012/0169276 A1 | 7/2012 | Wang |
| 2012/0169278 A1 | 7/2012 | Choi |
| 2012/0173418 A1 | 7/2012 | Beardsmore et al. |
| 2012/0179004 A1 | 7/2012 | Roesicke et al. |
| 2012/0181973 A1 | 7/2012 | Lyden |
| 2012/0182427 A1 | 7/2012 | Marshall |
| 2012/0187851 A1 | 8/2012 | Huggins et al. |
| 2012/0193999 A1 | 8/2012 | Zeine |
| 2012/0200399 A1 | 8/2012 | Chae |
| 2012/0201153 A1 | 8/2012 | Bharadia et al. |
| 2012/0201173 A1 | 8/2012 | Jian et al. |
| 2012/0206299 A1 | 8/2012 | Valdes-Garcia |
| 2012/0212072 A1 | 8/2012 | Miyabayashi et al. |
| 2012/0214462 A1 | 8/2012 | Chu et al. |
| 2012/0214536 A1 | 8/2012 | Kim et al. |
| 2012/0228956 A1 | 9/2012 | Kamata |
| 2012/0231856 A1 | 9/2012 | Lee et al. |
| 2012/0235636 A1 | 9/2012 | Partovi |
| 2012/0242283 A1 | 9/2012 | Kim et al. |
| 2012/0248886 A1 | 10/2012 | Kesler et al. |
| 2012/0248888 A1 | 10/2012 | Kesler et al. |
| 2012/0248891 A1 | 10/2012 | Drennen |
| 2012/0249051 A1 | 10/2012 | Son et al. |
| 2012/0262002 A1 | 10/2012 | Widmer et al. |
| 2012/0265272 A1 | 10/2012 | Judkins |
| 2012/0267900 A1 | 10/2012 | Huffman et al. |
| 2012/0268238 A1 | 10/2012 | Park et al. |
| 2012/0274154 A1 | 11/2012 | DeLuca |
| 2012/0280650 A1 | 11/2012 | Kim et al. |
| 2012/0286582 A1 | 11/2012 | Kim et al. |
| 2012/0292993 A1 | 11/2012 | Mettler et al. |
| 2012/0293021 A1 | 11/2012 | Teggatz et al. |
| 2012/0293119 A1 | 11/2012 | Park et al. |
| 2012/0299389 A1 | 11/2012 | Lee et al. |
| 2012/0299540 A1 | 11/2012 | Perry |
| 2012/0299541 A1 | 11/2012 | Perry |
| 2012/0299542 A1 | 11/2012 | Perry |
| 2012/0300588 A1 | 11/2012 | Perry |
| 2012/0300592 A1 | 11/2012 | Perry |
| 2012/0300593 A1 | 11/2012 | Perry |
| 2012/0306705 A1 | 12/2012 | Sakurai et al. |
| 2012/0306707 A1 | 12/2012 | Yang et al. |
| 2012/0306720 A1 | 12/2012 | Tanmi et al. |
| 2012/0309295 A1 | 12/2012 | Maguire |
| 2012/0309308 A1 | 12/2012 | Kim et al. |
| 2012/0309332 A1 | 12/2012 | Liao |
| 2012/0313449 A1 | 12/2012 | Kurs |
| 2012/0326660 A1 | 12/2012 | Lu et al. |
| 2013/0002550 A1 | 1/2013 | Zalewski |
| 2013/0024059 A1 | 1/2013 | Miller et al. |
| 2013/0026981 A1 | 1/2013 | Van Der Lee |
| 2013/0026982 A1 | 1/2013 | Rothenbaum |
| 2013/0032589 A1 | 2/2013 | Chung |
| 2013/0033571 A1 | 2/2013 | Steen |
| 2013/0038124 A1 | 2/2013 | Newdoll et al. |
| 2013/0038402 A1 | 2/2013 | Karalis et al. |
| 2013/0043738 A1 | 2/2013 | Park et al. |
| 2013/0044035 A1 | 2/2013 | Zhuang |
| 2013/0049471 A1 | 2/2013 | Oleynik |

(56) References Cited

U.S. PATENT DOCUMENTS

| | | |
|---|---|---|
| 2013/0049475 A1 | 2/2013 | Kim et al. |
| 2013/0049484 A1 | 2/2013 | Weissentern et al. |
| 2013/0057078 A1 | 3/2013 | Lee |
| 2013/0057205 A1 | 3/2013 | Lee et al. |
| 2013/0057210 A1 | 3/2013 | Negaard et al. |
| 2013/0057364 A1 | 3/2013 | Kesler et al. |
| 2013/0063082 A1 | 3/2013 | Lee et al. |
| 2013/0063143 A1 | 3/2013 | Adalsteinsson et al. |
| 2013/0069444 A1 | 3/2013 | Waffenschmidt et al. |
| 2013/0077650 A1 | 3/2013 | Traxler et al. |
| 2013/0078918 A1 | 3/2013 | Crowley et al. |
| 2013/0082651 A1 | 4/2013 | Park et al. |
| 2013/0082653 A1 | 4/2013 | Lee et al. |
| 2013/0083774 A1 | 4/2013 | Son et al. |
| 2013/0088082 A1 | 4/2013 | Kang et al. |
| 2013/0088090 A1 | 4/2013 | Wu |
| 2013/0088192 A1 | 4/2013 | Eaton |
| 2013/0088331 A1 | 4/2013 | Cho |
| 2013/0093388 A1 | 4/2013 | Partovi |
| 2013/0099389 A1 | 4/2013 | Hong et al. |
| 2013/0099586 A1 | 4/2013 | Kato |
| 2013/0106197 A1 | 5/2013 | Bae et al. |
| 2013/0107023 A1 | 5/2013 | Tanaka et al. |
| 2013/0119777 A1 | 5/2013 | Rees |
| 2013/0119929 A1 | 5/2013 | Partovi |
| 2013/0120217 A1 | 5/2013 | Ueda et al. |
| 2013/0132010 A1 | 5/2013 | Winger et al. |
| 2013/0134923 A1 | 5/2013 | Smith |
| 2013/0137455 A1 | 5/2013 | Xia |
| 2013/0141037 A1 | 6/2013 | Jenwatanavet et al. |
| 2013/0148341 A1 | 6/2013 | Williams |
| 2013/0149975 A1 | 6/2013 | Yu et al. |
| 2013/0154387 A1 | 6/2013 | Lee et al. |
| 2013/0155748 A1 | 6/2013 | Sundstrom |
| 2013/0157729 A1 | 6/2013 | Tabe |
| 2013/0169061 A1 | 7/2013 | Microshnichenko et al. |
| 2013/0169219 A1 | 7/2013 | Gray |
| 2013/0169348 A1 | 7/2013 | Shi |
| 2013/0171939 A1 | 7/2013 | Tian et al. |
| 2013/0175877 A1 | 7/2013 | Abe et al. |
| 2013/0178253 A1 | 7/2013 | Karaoguz |
| 2013/0181881 A1 | 7/2013 | Christie et al. |
| 2013/0190031 A1 | 7/2013 | Persson et al. |
| 2013/0193769 A1 | 8/2013 | Mehta et al. |
| 2013/0197320 A1 | 8/2013 | Albert et al. |
| 2013/0200064 A1 | 8/2013 | Alexander |
| 2013/0207477 A1 | 8/2013 | Nam et al. |
| 2013/0207604 A1 | 8/2013 | Zeine |
| 2013/0207879 A1 | 8/2013 | Rada et al. |
| 2013/0210357 A1 | 8/2013 | Qin et al. |
| 2013/0221757 A1 | 8/2013 | Cho et al. |
| 2013/0234530 A1 | 9/2013 | Miyauchi |
| 2013/0234536 A1 | 9/2013 | Chemishkian et al. |
| 2013/0234658 A1 | 9/2013 | Endo et al. |
| 2013/0241306 A1 | 9/2013 | Aber et al. |
| 2013/0241468 A1 | 9/2013 | Moshfeghi |
| 2013/0241474 A1 | 9/2013 | Moshfeghi |
| 2013/0249478 A1 | 9/2013 | Hirano |
| 2013/0249479 A1 | 9/2013 | Partovi |
| 2013/0254578 A1 | 9/2013 | Huang et al. |
| 2013/0264997 A1 | 10/2013 | Lee et al. |
| 2013/0268782 A1 | 10/2013 | Tam et al. |
| 2013/0270923 A1 | 10/2013 | Cook et al. |
| 2013/0278209 A1 | 10/2013 | Von Novak |
| 2013/0285477 A1 | 10/2013 | Lo et al. |
| 2013/0285606 A1 | 10/2013 | Ben-Shalom et al. |
| 2013/0288600 A1 | 10/2013 | Kuusilinna et al. |
| 2013/0293423 A1 | 11/2013 | Moshfeghi |
| 2013/0307751 A1 | 11/2013 | Yu-Juin et al. |
| 2013/0310020 A1 | 11/2013 | Kazuhiro |
| 2013/0311798 A1 | 11/2013 | Sultenfuss |
| 2013/0328417 A1 | 12/2013 | Takeuchi |
| 2013/0334883 A1 | 12/2013 | Kim et al. |
| 2013/0339108 A1 | 12/2013 | Ryder et al. |
| 2013/0343251 A1 | 12/2013 | Zhang |
| 2014/0001846 A1 | 1/2014 | Mosebrook |
| 2014/0001875 A1 | 1/2014 | Nahidipour |
| 2014/0001876 A1 | 1/2014 | Fujiwara et al. |
| 2014/0006017 A1 | 1/2014 | Sen |
| 2014/0008992 A1 | 1/2014 | Leabman |
| 2014/0008993 A1 | 1/2014 | Leabman |
| 2014/0009108 A1 | 1/2014 | Leabman |
| 2014/0009110 A1 | 1/2014 | Lee |
| 2014/0011531 A1 | 1/2014 | Burstrom et al. |
| 2014/0015336 A1 | 1/2014 | Weber et al. |
| 2014/0015344 A1 | 1/2014 | Mohamadi |
| 2014/0021907 A1 | 1/2014 | Yun et al. |
| 2014/0021908 A1 | 1/2014 | McCool |
| 2014/0035524 A1 | 2/2014 | Zeine |
| 2014/0035526 A1 | 2/2014 | Tripathi et al. |
| 2014/0035786 A1 | 2/2014 | Ley |
| 2014/0043248 A1 | 2/2014 | Yeh |
| 2014/0049422 A1 | 2/2014 | Von Novak et al. |
| 2014/0054971 A1 | 2/2014 | Kissin |
| 2014/0055098 A1 | 2/2014 | Lee et al. |
| 2014/0057618 A1 | 2/2014 | Zirwas et al. |
| 2014/0062395 A1 | 3/2014 | Kwon et al. |
| 2014/0082435 A1 | 3/2014 | Kitgawa |
| 2014/0086125 A1 | 3/2014 | Polo et al. |
| 2014/0086592 A1 | 3/2014 | Nakahara et al. |
| 2014/0091756 A1 | 4/2014 | Ofstein et al. |
| 2014/0091968 A1 | 4/2014 | Harel et al. |
| 2014/0103869 A1 | 4/2014 | Radovic |
| 2014/0111147 A1 | 4/2014 | Soar |
| 2014/0113689 A1 | 4/2014 | Lee |
| 2014/0117946 A1 | 5/2014 | Muller et al. |
| 2014/0118140 A1 | 5/2014 | Amis |
| 2014/0128107 A1 | 5/2014 | An |
| 2014/0132210 A1 | 5/2014 | Partovi |
| 2014/0133279 A1 | 5/2014 | Khuri-Yakub |
| 2014/0139034 A1 | 5/2014 | Sankar et al. |
| 2014/0139039 A1 | 5/2014 | Cook et al. |
| 2014/0139180 A1 | 5/2014 | Kim et al. |
| 2014/0141838 A1 | 5/2014 | Cai et al. |
| 2014/0142876 A1 | 5/2014 | John et al. |
| 2014/0143933 A1 | 5/2014 | Low et al. |
| 2014/0145879 A1 | 5/2014 | Pan |
| 2014/0145884 A1 | 5/2014 | Dang et al. |
| 2014/0152117 A1 | 6/2014 | Sanker |
| 2014/0159651 A1 | 6/2014 | Von Novak et al. |
| 2014/0159652 A1 | 6/2014 | Hall et al. |
| 2014/0159662 A1 | 6/2014 | Furui |
| 2014/0159667 A1 | 6/2014 | Kim et al. |
| 2014/0169385 A1 | 6/2014 | Hadani et al. |
| 2014/0175893 A1 | 6/2014 | Sengupta et al. |
| 2014/0176054 A1 | 6/2014 | Porat et al. |
| 2014/0176061 A1 | 6/2014 | Cheatham, III et al. |
| 2014/0177399 A1 | 6/2014 | Teng et al. |
| 2014/0184148 A1 | 7/2014 | Van Der Lee et al. |
| 2014/0184155 A1 | 7/2014 | Cha |
| 2014/0184163 A1 | 7/2014 | Das et al. |
| 2014/0184170 A1 | 7/2014 | Jeong |
| 2014/0191568 A1 | 7/2014 | Partovi |
| 2014/0194092 A1 | 7/2014 | Wanstedt et al. |
| 2014/0194095 A1 | 7/2014 | Wanstedt et al. |
| 2014/0206384 A1 | 7/2014 | Kim et al. |
| 2014/0210281 A1 | 7/2014 | Ito et al. |
| 2014/0217955 A1 | 8/2014 | Lin |
| 2014/0217967 A1 | 8/2014 | Zeine et al. |
| 2014/0225805 A1 | 8/2014 | Pan et al. |
| 2014/0232320 A1 | 8/2014 | Ento July et al. |
| 2014/0232610 A1 | 8/2014 | Shigemoto et al. |
| 2014/0239733 A1 | 8/2014 | Mach et al. |
| 2014/0241231 A1 | 8/2014 | Zeine |
| 2014/0245036 A1 | 8/2014 | Oishi |
| 2014/0246416 A1 | 9/2014 | White |
| 2014/0247152 A1 | 9/2014 | Proud |
| 2014/0252813 A1 | 9/2014 | Lee et al. |
| 2014/0252866 A1 | 9/2014 | Walsh et al. |
| 2014/0265725 A1 | 9/2014 | Angle et al. |
| 2014/0265727 A1 | 9/2014 | Berte |
| 2014/0265943 A1 | 9/2014 | Angle et al. |
| 2014/0266025 A1 | 9/2014 | Jakubowski |
| 2014/0273892 A1 | 9/2014 | Nourbakhsh |

(56) References Cited

U.S. PATENT DOCUMENTS

| | | |
|---|---|---|
| 2014/0281655 A1 | 9/2014 | Angle et al. |
| 2014/0292090 A1 | 10/2014 | Cordeiro et al. |
| 2014/0300452 A1 | 10/2014 | Rofe et al. |
| 2014/0312706 A1 | 10/2014 | Fiorello et al. |
| 2014/0325218 A1 | 10/2014 | Shimizu et al. |
| 2014/0327320 A1 | 11/2014 | Muhs et al. |
| 2014/0327390 A1 | 11/2014 | Park et al. |
| 2014/0346860 A1 | 11/2014 | Aubry et al. |
| 2014/0354063 A1 | 12/2014 | Leabman et al. |
| 2014/0354221 A1 | 12/2014 | Leabman et al. |
| 2014/0355718 A1 | 12/2014 | Guan et al. |
| 2014/0357309 A1 | 12/2014 | Leabman et al. |
| 2014/0368048 A1 | 12/2014 | Leabman |
| 2014/0368161 A1 | 12/2014 | Leabman et al. |
| 2014/0368405 A1 | 12/2014 | Ek et al. |
| 2014/0375139 A1 | 12/2014 | Tsukamoto |
| 2014/0375253 A1 | 12/2014 | Leabman et al. |
| 2014/0375255 A1 | 12/2014 | Leabman et al. |
| 2014/0375258 A1 | 12/2014 | Arkhipenkov |
| 2014/0375261 A1 | 12/2014 | Manova-Elssibony et al. |
| 2014/0376646 A1 | 12/2014 | Leabman et al. |
| 2015/0001949 A1 | 1/2015 | Leabman et al. |
| 2015/0002086 A1 | 1/2015 | Matos et al. |
| 2015/0003207 A1 | 1/2015 | Lee et al. |
| 2015/0008980 A1 | 1/2015 | Kim et al. |
| 2015/0011160 A1 | 1/2015 | Uurgovan et al. |
| 2015/0015180 A1 | 1/2015 | Miller et al. |
| 2015/0015182 A1 | 1/2015 | Brandtman et al. |
| 2015/0015192 A1 | 1/2015 | Leabamn |
| 2015/0015194 A1 | 1/2015 | Leabman et al. |
| 2015/0015195 A1 | 1/2015 | Leabman et al. |
| 2015/0021990 A1 | 1/2015 | Myer et al. |
| 2015/0022008 A1 | 1/2015 | Leabman et al. |
| 2015/0022009 A1 | 1/2015 | Leabman et al. |
| 2015/0022010 A1 | 1/2015 | Leabman et al. |
| 2015/0023204 A1 | 1/2015 | Wil et al. |
| 2015/0028688 A1 | 1/2015 | Masaoka |
| 2015/0028694 A1 | 1/2015 | Leabman et al. |
| 2015/0028697 A1 | 1/2015 | Leabman et al. |
| 2015/0028875 A1 | 1/2015 | Irie et al. |
| 2015/0029397 A1 | 1/2015 | Leabman et al. |
| 2015/0035378 A1 | 2/2015 | Calhoun et al. |
| 2015/0035715 A1 | 2/2015 | Kim et al. |
| 2015/0041459 A1 | 2/2015 | Leabman et al. |
| 2015/0042264 A1 | 2/2015 | Leabman et al. |
| 2015/0042265 A1 | 2/2015 | Leabman et al. |
| 2015/0044977 A1 | 2/2015 | Ramasamy et al. |
| 2015/0046526 A1 | 2/2015 | Bush et al. |
| 2015/0061404 A1 | 3/2015 | Lamenza et al. |
| 2015/0076917 A1 | 3/2015 | Leabman et al. |
| 2015/0076927 A1 | 3/2015 | Leabman et al. |
| 2015/0077036 A1 | 3/2015 | Leabman et al. |
| 2015/0077037 A1 | 3/2015 | Leabman et al. |
| 2015/0091520 A1 | 4/2015 | Blum et al. |
| 2015/0091706 A1 | 4/2015 | Chemishkian et al. |
| 2015/0097663 A1 | 4/2015 | Sloo et al. |
| 2015/0102681 A1 | 4/2015 | Leabman et al. |
| 2015/0102764 A1 | 4/2015 | Leabman et al. |
| 2015/0102769 A1 | 4/2015 | Leabman et al. |
| 2015/0102973 A1 | 4/2015 | Hand et al. |
| 2015/0108848 A1 | 4/2015 | Joehren |
| 2015/0109181 A1 | 4/2015 | Hyde et al. |
| 2015/0115877 A1 | 4/2015 | Aria et al. |
| 2015/0115878 A1 | 4/2015 | Park |
| 2015/0123483 A1 | 5/2015 | Leabman et al. |
| 2015/0123496 A1 | 5/2015 | Leabman et al. |
| 2015/0128733 A1 | 5/2015 | Taylor et al. |
| 2015/0130285 A1 | 5/2015 | Leabman et al. |
| 2015/0130293 A1 | 5/2015 | Hajimiri et al. |
| 2015/0148664 A1 | 5/2015 | Stolka et al. |
| 2015/0155737 A1 | 6/2015 | Mayo |
| 2015/0155738 A1 | 6/2015 | Leabman et al. |
| 2015/0162751 A1 | 6/2015 | Leabman et al. |
| 2015/0162779 A1 | 6/2015 | Lee et al. |
| 2015/0171513 A1 | 6/2015 | Chen et al. |
| 2015/0171656 A1 | 6/2015 | Leabman et al. |
| 2015/0171658 A1 | 6/2015 | Manova-Elssibony et al. |
| 2015/0171931 A1 | 6/2015 | Won et al. |
| 2015/0177326 A1 | 6/2015 | Chakraborty et al. |
| 2015/0180133 A1 | 6/2015 | Hunt |
| 2015/0188352 A1 | 7/2015 | Peek et al. |
| 2015/0199665 A1 | 7/2015 | Chu |
| 2015/0207333 A1 | 7/2015 | Baarman et al. |
| 2015/0207542 A1 | 7/2015 | Zeine |
| 2015/0222126 A1 | 8/2015 | Leabman et al. |
| 2015/0236520 A1 | 8/2015 | Baarman |
| 2015/0244070 A1 | 8/2015 | Cheng et al. |
| 2015/0244187 A1 | 8/2015 | Horie |
| 2015/0244201 A1 | 8/2015 | Chu |
| 2015/0244341 A1 | 8/2015 | Ritter et al. |
| 2015/0249484 A1 | 9/2015 | Mach et al. |
| 2015/0255989 A1 | 9/2015 | Walley et al. |
| 2015/0263534 A1 | 9/2015 | Lee et al. |
| 2015/0263548 A1 | 9/2015 | Cooper |
| 2015/0270741 A1 | 9/2015 | Leabman et al. |
| 2015/0280484 A1 | 10/2015 | Radziemski et al. |
| 2015/0288438 A1 | 10/2015 | Maltsev et al. |
| 2015/0311585 A1 | 10/2015 | Church et al. |
| 2015/0312721 A1 | 10/2015 | Singh |
| 2015/0318729 A1 | 11/2015 | Leabman |
| 2015/0326024 A1 | 11/2015 | Bell et al. |
| 2015/0326025 A1 | 11/2015 | Bell et al. |
| 2015/0326063 A1 | 11/2015 | Leabman et al. |
| 2015/0326068 A1 | 11/2015 | Bell et al. |
| 2015/0326069 A1 | 11/2015 | Petras et al. |
| 2015/0326070 A1 | 11/2015 | Petras et al. |
| 2015/0326072 A1 | 11/2015 | Petras et al. |
| 2015/0326142 A1 | 11/2015 | Petras et al. |
| 2015/0326143 A1 | 11/2015 | Petras et al. |
| 2015/0327085 A1 | 11/2015 | Hadani |
| 2015/0333528 A1 | 11/2015 | Leabman |
| 2015/0333529 A1 | 11/2015 | Leabman |
| 2015/0333573 A1 | 11/2015 | Leabman |
| 2015/0333800 A1 | 11/2015 | Perry et al. |
| 2015/0340759 A1 | 11/2015 | Bridgelall et al. |
| 2015/0340903 A1 | 11/2015 | Bell et al. |
| 2015/0340909 A1 | 11/2015 | Bell et al. |
| 2015/0340910 A1 | 11/2015 | Petras et al. |
| 2015/0340911 A1 | 11/2015 | Bell et al. |
| 2015/0341087 A1 | 11/2015 | Moore et al. |
| 2015/0349574 A1 | 12/2015 | Leabman |
| 2015/0358222 A1 | 12/2015 | Berger et al. |
| 2015/0365137 A1 | 12/2015 | Miller et al. |
| 2015/0365138 A1 | 12/2015 | Miller et al. |
| 2016/0005068 A1 | 1/2016 | Im et al. |
| 2016/0012695 A1 | 1/2016 | Bell et al. |
| 2016/0013656 A1 | 1/2016 | Bell et al. |
| 2016/0013677 A1 | 1/2016 | Bell et al. |
| 2016/0013678 A1 | 1/2016 | Bell et al. |
| 2016/0013855 A1 | 1/2016 | Campos |
| 2016/0020636 A1 | 1/2016 | Khlat |
| 2016/0020649 A1 | 1/2016 | Bell et al. |
| 2016/0020830 A1 | 1/2016 | Bell et al. |
| 2016/0042206 A1 | 2/2016 | Pesavento et al. |
| 2016/0054395 A1 | 2/2016 | Bell et al. |
| 2016/0054396 A1 | 2/2016 | Bell et al. |
| 2016/0054440 A1 | 2/2016 | Younis |
| 2016/0056635 A1 | 2/2016 | Bell |
| 2016/0056640 A1 | 2/2016 | Mao |
| 2016/0056669 A1 | 2/2016 | Bell |
| 2016/0056966 A1 | 2/2016 | Bell |
| 2016/0065005 A1 | 3/2016 | Won et al. |
| 2016/0079799 A1 | 3/2016 | Khlat |
| 2016/0094091 A1 | 3/2016 | Shin et al. |
| 2016/0094092 A1 | 3/2016 | Davlantes et al. |
| 2016/0099601 A1 | 4/2016 | Leabman et al. |
| 2016/0099602 A1 | 4/2016 | Leabman et al. |
| 2016/0099609 A1 | 4/2016 | Leabman et al. |
| 2016/0099610 A1 | 4/2016 | Leabman et al. |
| 2016/0099611 A1 | 4/2016 | Leabman et al. |
| 2016/0099612 A1 | 4/2016 | Leabman et al. |
| 2016/0099613 A1 | 4/2016 | Leabman et al. |
| 2016/0099614 A1 | 4/2016 | Leabman et al. |
| 2016/0099755 A1 | 4/2016 | Leabman et al. |

(56) References Cited

U.S. PATENT DOCUMENTS

| | | |
|---|---|---|
| 2016/0099756 A1 | 4/2016 | Leabman et al. |
| 2016/0099757 A1 | 4/2016 | Leabman et al. |
| 2016/0099758 A1 | 4/2016 | Leabman et al. |
| 2016/0100124 A1 | 4/2016 | Leabman et al. |
| 2016/0100312 A1 | 4/2016 | Bell et al. |
| 2016/0126752 A1 | 5/2016 | Vuori et al. |
| 2016/0126776 A1 | 5/2016 | Kim et al. |
| 2016/0141908 A1 | 5/2016 | Jakl et al. |
| 2016/0164563 A1 | 6/2016 | Khawand et al. |
| 2016/0181849 A1 | 6/2016 | Govindaraj |
| 2016/0181854 A1 | 6/2016 | Leabman |
| 2016/0181867 A1 | 6/2016 | Daniel et al. |
| 2016/0181873 A1 | 6/2016 | Mitcheson et al. |
| 2016/0191121 A1 | 6/2016 | Bell |
| 2016/0204622 A1 | 7/2016 | Leabman |
| 2016/0204642 A1 | 7/2016 | Oh |
| 2016/0238365 A1 | 8/2016 | Wixey et al. |
| 2016/0299210 A1 | 10/2016 | Zeine |
| 2016/0323000 A1 | 11/2016 | Liu et al. |
| 2016/0336804 A1 | 11/2016 | Son et al. |
| 2016/0339258 A1 | 11/2016 | Perryman et al. |
| 2016/0359367 A1 | 12/2016 | Rothschild |
| 2017/0005481 A1* | 1/2017 | Von Novak, III ...... H02J 5/005 |
| 2017/0005516 A9 | 1/2017 | Leabman et al. |
| 2017/0005524 A1 | 1/2017 | Akuzawa et al. |
| 2017/0005530 A1 | 1/2017 | Zeine et al. |
| 2017/0025903 A1 | 1/2017 | Song et al. |
| 2017/0026087 A1 | 1/2017 | Tanabe |
| 2017/0043675 A1 | 2/2017 | Jones et al. |
| 2017/0047784 A1 | 2/2017 | Jung et al. |
| 2017/0077735 A1 | 3/2017 | Leabman |
| 2017/0077736 A1 | 3/2017 | Leabman |
| 2017/0077764 A1 | 3/2017 | Bell et al. |
| 2017/0077765 A1 | 3/2017 | Bell et al. |
| 2017/0077995 A1 | 3/2017 | Leabman |
| 2017/0085120 A1 | 3/2017 | Leabman et al. |
| 2017/0085437 A1 | 3/2017 | Condeixa et al. |
| 2017/0092115 A1 | 3/2017 | Sloo et al. |
| 2017/0110887 A1 | 4/2017 | Bell et al. |
| 2017/0110914 A1 | 4/2017 | Bell |
| 2017/0134686 A9 | 5/2017 | Leabman |
| 2017/0163076 A1 | 6/2017 | Park et al. |
| 2017/0179763 A9 | 6/2017 | Leabman |

FOREIGN PATENT DOCUMENTS

| | | |
|---|---|---|
| DE | 2000216655 U1 | 2/2002 |
| EP | 1028482 A2 | 8/2000 |
| EP | 1081506 A1 | 3/2001 |
| EP | 2397973 A1 | 6/2010 |
| EP | 2346136 A1 | 7/2011 |
| EP | 2545635 A2 | 1/2013 |
| GB | 2404497 A | 2/2005 |
| JP | 2006157586 A | 6/2006 |
| JP | 2007043432 A | 2/2007 |
| JP | 2008167017 A | 7/2008 |
| KR | 20060061776 A | 6/2006 |
| KR | 20070044302 A | 4/2007 |
| KR | 100755144 B1 | 9/2007 |
| KR | 20110132059 A | 12/2011 |
| KR | 20110135540 A1 | 12/2011 |
| KR | 20120009843 A | 2/2012 |
| KR | 20120108759 A | 10/2012 |
| KR | 20130026977 A | 3/2013 |
| WO | WO 9952173 | 10/1999 |
| WO | WO 200111716 A1 | 2/2001 |
| WO | WO 2003091943 A1 | 11/2003 |
| WO | WO 2004077550 A1 | 9/2004 |
| WO | WO 2006122783 | 11/2006 |
| WO | WO 2008156571 A2 | 12/2008 |
| WO | WO 2010022181 A1 | 2/2010 |
| WO | WO 2010039246 A1 | 4/2010 |
| WO | WO 2010138994 A1 | 12/2010 |
| WO | WO 2011112022 A2 | 9/2011 |
| WO | WO 2012177283 A1 | 12/2012 |
| WO | WO 2013031988 A1 | 3/2013 |
| WO | WO 2013035190 A1 | 3/2013 |
| WO | WO 2013038074 A2 | 3/2013 |
| WO | WO 2013042399 A1 | 3/2013 |
| WO | WO 2013052950 A1 | 4/2013 |
| WO | WO 2013105920 A2 | 7/2013 |
| WO | WO 2014075103 A1 | 5/2014 |
| WO | WO 2014132258 A1 | 9/2014 |
| WO | WO 2014182788 A2 | 11/2014 |
| WO | WO 2014182788 A3 | 11/2014 |
| WO | WO 2014197472 A1 | 12/2014 |
| WO | WO 2014209587 A1 | 12/2014 |
| WO | WO 2015038773 A1 | 3/2015 |
| WO | WO 2015097809 A1 | 7/2015 |
| WO | WO 2015161323 A1 | 10/2015 |
| WO | WO 2016024869 A1 | 2/2016 |
| WO | WO 2016048512 A1 | 3/2016 |
| WO | WO 2016187357 A1 | 11/2016 |

OTHER PUBLICATIONS

Energous Corp., IPRP, PCT/US2014/037170, Nov. 10, 2015, 8 pgs.
Energous Corp., ISRWO, PCT/US2014/041534, Oct. 13, 2014, 10 pgs.
Energous Corp., IPRP, PCT/US2014/041534, Dec. 29, 2015, 7 pgs.
Energous Corp., ISRWO, PCT/US2014/046956, Nov. 12, 2014, 10 pgs.
Energous Corp., IPRP, PCT/US2014/046956, Jan. 19, 2016, 7 pgs.
Energous Corp., ISRWO, PCT/US2014/037072, Sep. 12, 2014, 8 pgs.
Energous Corp., IPRP, PCT/US2014/037072, Nov. 10, 2015, 6 pgs.
Energous Corp., ISRWO, PCT/US2014/068568, Mar. 20, 2015, 10 pgs.
Energous Corp., IPRP, PCT/US2014/068568, Jun. 14, 2016, 8 pgs.
Energous Corp., ISRWO, PCT/US2014/055195, Dec. 22, 2014, 11 pgs.
Energous Corp., IPRP, PCT/US2014/055195, Mar. 22, 2016, 9 pgs.
Energous Corp., ISRWO, PCT/US2015/067291, Mar. 4, 2016, 10 pgs.
Energous Corp., IPRP, PCT/US2015/067291, Jul. 4, 2017, 4 pgs.
Energous Corp., ISRWO, PCT/US2015/067242, Mar. 16, 2016, 9 pgs.
Energous Corp., IPRP, PCT/US2015/067242, Jun. 27, 2017, 7 pgs.
Energous Corp., ISRWO, PCT/US2015/067243, Mar. 10, 2016, 11 pgs.
Energous Corp., IPRP, PCT/US2015/067243, Jun. 27, 2017, 7 pgs.
Energous Corp., ISRWO, PCT/US2014/037109, Apr. 8, 2016, 12 pgs.
Energous Corp., IPRP, PCT/US2014/037109, Apr. 12, 2016, 9 pgs.
Energous Corp., ISRWO, PCT/US2015/067275, Mar. 3, 2016, 8 pgs.
Energous Corp., IPRP, PCT/US2015/067275, Jul. 4, 2017, 7 pgs.
Energous Corp., ISRWO, PCT/US2015/067245, Mar. 17, 2016, 8 pgs.
Energous Corp., IPRP, PCT/US2015/067245, Jun. 27, 2017, 7 pgs.
Energous Corp., ISRWO, PCT/US2014/041546, Oct. 16, 2014, 12 pgs.
Energous Corp., IPRP, PCT/US2014/041546, Dec. 29, 2015, 9 pgs.
Energous Corp., ISRWO, PCT/US2015/67250, Mar. 30, 2016, 11 pgs.
Energous Corp., IPRP, PCT/US2015/67250, Mar. 30, 2016, 10 pgs.
Energous Corp., ISRWO, PCT/US2015/067325, Mar. 10, 2016, 9 pgs.
Energous Corp., IPRP, PCT/US2015/067325, Jul. 4, 2017, 8 pgs.
Energous Corp., ISRWO, PCT/US2014/040697, Oct. 1, 2014, 12 pgs.
Energous Corp., IPRP, PCT/US2014/040697, Dec. 8, 2015, 9 pgs.
Energous Corp., ISRWO, PCT/US2014/040705, Sep. 23, 2014, 8 pgs.
Energous Corp., IPRP, PCT/US2014/040705, Dec. 8, 2015, 6 pgs.
Energous Corp., ISRWO, PCT/US2015/067249, Mar. 29, 2016, 8 pgs.
Energous Corp., IPRP, PCT/US2015/067249, Jun. 27, 2017, 7 pgs.

(56) References Cited

OTHER PUBLICATIONS

Energous Corp., ISRWO, PCT/US2015/067246, May 11, 2016, 18 pgs.
Energous Corp., IPRP, PCT/US2015/067246, Jun. 27, 2017, 9 pgs.
Energous Corp., ISRWO, PCT/US2014/059317, Feb. 24, 2015, 13 pgs.
Energous Corp., IPRP, PCT/US2014/059317, Apr. 12, 2016, 10 pgs.
Energous Corp., ISRWO, PCT/US2014/049669, Nov. 13, 2014, 10 pgs.
Energous Corp., IPRP, PCT/US2014/049669, Feb. 9, 2016, 8 pgs.
Energous Corp., ISRWO, PCT/US2014/041323, Oct. 1, 2014, 10 pgs.
Energous Corp., IPRP, PCT/US2014/041323, Dec. 22, 2015, 8 pgs.
Energous Corp., ISRWO, PCT/US2014/048002, Nov. 13, 2014, 11 pgs.
Energous Corp., IPRP, PCT/US2014/048002, Feb. 12, 2015 8 pgs.
Energous Corp., ISRWO, PCT/US2014/062682, Feb. 12, 2015, 10 pgs.
Energous Corp., IPRP, PCT/US2014/062682, May 3, 2016, 8 pgs.
Energous Corp., ISRWO, PCT/US2014/049666, Nov. 10, 2014, 7 pgs.
Energous Corp., IPRP, PCT/US2014/049666, Feb. 9, 2016, 5 pgs.
Energous Corp., ISRWO, PCT/US2014/046961, Nov. 24, 2014, 16 pgs.
Energous Corp., IPRP, PCT/US2014/046961, Jan. 19, 2016, 8 pgs.
Energous Corp., ISRWO, PCT/US2015/067279, Mar. 11, 2015, 13 pgs.
Energous Corp., IPRP, PCT/US2015/067279, Jul. 4, 2017, 7 pgs.
Energous Corp., ISRWO, PCT/US2014/041342, Jan. 27, 2015, 10 pgs.
Energous Corp., IPRP, PCT/US2014/041342, Dec. 15, 2015, 8 pgs.
Energous Corp., ISRWO, PCT/US2014/046941, Nov. 6, 2014, 11 pgs.
Energous Corp., IPRP, PCT/US2014/046941, Jan. 19, 2016, 9 pgs.
Energous Corp., ISRWO, PCT/US2014/062661, Jan. 27, 2015, 12 pgs.
Energous Corp., IPRP, PCT/US2014/062661, May 3, 2016, 10 pgs.
Energous Corp., ISRWO, PCT/US2014/059871, Jan. 23, 2015, 12 pgs.
Energous Corp., IPRP, PCT/US2014/059871, Apr. 12, 2016, 9 pgs.
Energous Corp., ISRWO, PCT/US2014/045102, Oct. 28, 2014, 14 pgs.
Energous Corp., IPRP, PCT/US2014/045102, Jan. 12, 2016, 11 pgs.
Energous Corp., ISRWO, PCT/US2014/059340, Jan. 15, 2015, 13 pgs.
Energous Corp., IPRP, PCT/US2014/059340, Apr. 12, 2016, 11 pgs.
Energous Corp., ISRWO, PCT/US2015/067282, Jul. 5, 2016, 7 pgs.
Energous Corp., IPRP, PCT/US2015/067282, Jul. 4, 2017, 6 pgs.
Energous Corp., ISRWO, PCT/US2014/041558, Oct. 10, 2014, 8 pgs.
Energous Corp., IPRP, PCT/US2014/041558, Dec. 29, 2015, 6 pgs.
Energous Corp., ISRWO, PCT/US2014/045119, Oct. 13, 2014, 11 pgs.
Energous Corp., IPRP, PCT/US2014/045119, Jan. 12, 2016, 9 pgs.
Energous Corp., ISRWO PCT/US2014/045237, Oct. 13, 2014, 16 pgs.
Energous Corp., IPRP , PCT/US2014/045237, Jan. 12, 2016, 12 pgs.
Energous Corp., ISRWO , PCT/US2014/054897, Feb. 17, 2015, 10 pgs.
Energous Corp., IPRP , PCT/US2014/054897, Mar. 15, 2016, 8 pgs.
Energous Corp., ISRWO , PCT/US2015/067334, Mar. 3, 2016, 6 pgs.
Energous Corp., IPRP , PCT/US2015/067334, Jul. 4, 2017, 5 pgs.
Energous Corp., ISRWO , PCT/US2014/047963, Nov. 7, 2014, 13 pgs.
Energous Corp., IPRP , PCT/US2014/047963, Jan. 26, 2016, 10 pgs.
Energous Corp., ISRWO , PCT/US2014/054891, Dec. 18, 2014, 12 pgs.
Energous Corp., IPRP , PCT/US2014/054891, Mar. 15, 2016, 10 pgs.
Energous Corp., ISRWO , PCT/US2014/054953, Dec. 4, 2014, 7 pgs.
Energous Corp., IPRP, PCT/US2014/054953, Mar. 22, 2016, 5 pgs.
Energous Corp., ISRWO , PCT/US2015/067294, Mar. 29, 2016, 7 pgs.
Energous Corp., IPRP , PCT/US2015/067294, Jul. 4, 2017, 6 pgs.
Energous Corp., ISRWO , PCT/US2014/062672 Jan. 26, 2015, 11 pgs.
Energous Corp., IPRP , PCT/US2014/062672 May 10, 2016, 8 pgs.
Energous Corp., ISRWO , PCT/US2014/044810 Oct. 21, 2014, 12 pgs.
Energous Corp., IPRP , PCT/US2014/044810, Jan. 5, 2016, 10 pgs.
Energous Corp., ISRWO , PCT/US2015/067271, Mar. 11, 2016, 6 pgs.
Energous Corp., IPRP , PCT/US2015/067271, Jul. 4, 2017, 5 pgs.
Energous Corp., ISRWO , PCT/US2014/040648, Oct. 10, 2014, 11 pgs.
Energous Corp., IPRP , PCT/US2014/040648, Dec. 8, 2015, 8 pgs.
Energous Corp., ISRWO , PCT/US2014/049673, Nov. 18, 2014, 10 pgs.
Energous Corp., IPRP , PCT/US2014/049673, Feb. 9, 2016, 6 pgs.
Energous Corp., ISRWO , PCT/US2014/068282, Mar. 19, 2015, 13 pgs.
Energous Corp., IPRP, PCT/US2014/068282, Jun. 7, 2016, 10 pgs.
Energous Corp., ISRWO, PCT/US2014/068586, Mar. 20, 2015, 11 pgs.
Energous Corp., IPRP, PCT/US2014/068586, Jun. 14, 2016, 8 pgs.
Energous Corp., ISRWO, PCT/US2016/068504, Mar. 30, 2017, 8 pgs.
Energous Corp., ISRWO, PCT/US2016/068495, Mar. 30, 2017, 9 pgs.
Energous Corp., ISRWO, PCT/US2015/067287, Feb. 2, 2016, 8 pgs.
Energous Corp., IPRP, PCT/US2015/067287, Jul. 4, 2017, 6 pgs.
Energous Corp., ISRWO, PCT/US2016/068551, Mar. 17, 2017, 8 pgs.
Energous Corp., ISRWO, PCT/US2016/068498, May 17, 2017, 8 pgs.
Energous Corp., ISRWO, PCT/US2016/068993, Mar. 13, 2017, 12 pgs.
Energous Corp., ISRWO, PCT/US2016/068565, Mar. 8, 2017, 11 pgs.
Energous Corp., ISRWO, PCT/US2016/068987, May 8, 2017, 10 pgs.
Energous Corp., ISRWO, PCT/US2016/069316 , Mar. 16, 2017, 15 pgs.
Supplementary European Search Report, EP Patent Application No. EP14818136-5, dated Jul. 21, 2016, 9 pgs.
European Search Report, EP Patent Application No. EP16189052.0, dated Jan. 31, 2017, 11 pgs.
European Search Report, EP Patent Application No. EP16189319-3, dated Feb. 1, 2017, 9 pgs.
European Search Report, EP Patent Application No. EP14822971, dated Feb. 1, 2017, 9 pgs.
European Search Report, EP Patent Application No. EP16189987, dated Feb. 1, 2017, 8 pgs.
European Search Report, EP Patent Application No. 16196205.5, dated Mar. 28, 2017, 7 pgs.
European Search Report, EP Patent Application No. 16189300, dated Feb. 28, 2017, 4 pgs.
European Search Report, EP Patent Application No. 16189988.5, dated Mar. 1, 2017, 4 pgs.
European Search Report, EP Patent Application No. 16189982.8, dated Jan. 27, 2017, 9 pgs.
European Search Report, EP Patent Application No. 16189974, dated Mar. 2, 2017, 5 pgs.
European Search Report, EP Patent Application No. 16193743, dated Feb. 2, 2017, 5 pgs.
European Search Report, EP Patent Application No. 14868901.1, dated Jul. 7, 2017, 5 pgs.

(56) References Cited

OTHER PUBLICATIONS

L.H. Hsieh et al. Development of a Retrodirective Wireless Microwave Power Transmission System, IEEE, 2003 pp. 393-396.
B.D. Van Veen et al., Beamforming: A Versatile Approach to Spatial Filtering, IEEE, ASSP Magazine, Apr. 1988, pp. 4-24.
Leabman, Adaptive Band-partitioning for Interference Cancellation in Communication System, Thesis Massachusetts Institute of Technology, Feb. 1997, pp. 1-70.
Panda, SIW based Slot Array Antenna and Power Management Circuit for Wireless Energy Harvesting Applications, IEEE APSURSI, Jul. 2012, 2 pgs.
Singh, Wireless Power Transfer Using Metamaterial Bonded Microstrip Antenna for Smart Grid WSN: In Fourth International Conference on Advances in Computing and Communications (ICACC), Aug. 27-29, 2014, Abstract 299.
T. Gill et al. "A System for Change Detection and Human Recognition in Voxel Space using the Microsoft Kinect Sensor," 2011 IEEE Applied Imagery Pattern Recognition Workshop. 8 pgs.
J. Han et al. Enhanced Computer Vision with Microsoft Kinect Sensor: A Review, IEEE Transactions on Cybernetics vol. 43, No. 5. pp 1318-1334, Oct. 30, 2013.
Zhai, "A Practical wireless charging system based on ultra-wideband retro-reflective beamforming" 2010 IEEE Antennas and Propagation Society International Symposium, Toronto, ON 2010, pp. 1-4.
Mao: BeamStar: An Edge-Based Approach to Routing in Wireless Sensors Networks, IEEE Transactions on Mobile Computing, IEEE Service Center, Los Alamitos, CA US, vol. 6, No. 11, Nov. 1, 2007, 13 pgs.
Smolders—Institute of Electrical 1-15 and Electronics Engineers: "Broadband microstrip array antennas" Digest of the Antennas and Propagation Society International Symposium. Seattle, WA Jun. 19-24 1994. Abstract 3 pgs.
Paolo Nenzi et al; "U-Helix: On-chip short conical antenna", 2013 7th European Conference on Antennas and Propagation (EUCAP), ISBN:978-1-4673-2187-7, IEEE, Apr. 8, 2013, 5 pgs.
Adamiuk G et al; "Compact, Dual-Polarized UWB-Antanna, Embedded in a Dielectric" IEEE Transactions on Antenna and Propagation, IEEE Service Center, Piscataway, NJ, US vol. 56, No. 2, ISSN: 0018-926X, abstract; Figure 1, Feb. 1, 2010, 8 pgs.
Mascarenas et al.; "Experimental Studies of Using Wireless Energy Transmission for Powering Embedded Sensor Nodes." Nov. 28, 2009, Journal of Sound and Vibration, pp. 2421-2433.
Li et al. High-Efficiency Switching-Mode Charger System Design Conisderations with Dynamnic Power Path Management, Mar./Apr. 2012 Issue, 8 pgs.
Energous Corp., ISRWO, PCT/US2018/012806, Mar. 23, 2018, 9 pgs.
Energous Corp., ISRWO, PCT/US2017/046800, Sep. 11, 2017, 13 pgs.
Energous Corp., ISRWO, PCT/US2017/065886, Apr. 6, 2018, 13 pgs.
Order Granting Reexamination Request Control No. 90013793 Aug. 31, 2016, 23 pgs.
*Ossia Inc.* vs *Energous Corp.*, PGR2016-00023—Institution Decision, Nov. 29, 2016, 29 pgs.
*Ossia Inc.* vs *Energous Corp.*, PGR2016-00024—Institution Decision, Nov. 29, 2016, 50 pgs.
*Ossia Inc.* vs *Energous Corp.*, PGR2016-00024—Judgement—Adverse, Jan. 20, 2017, 3 pgs.
ReExam Ordered Control No. 90013793 Feb. 2, 2017, 8 pgs.
*Ossia Inc.* vs *Energous Corp.*, Declaration of Stephen B. Heppe in Support of Petition for Post-Grant Review of U.S. Pat. No. 9,124,125, PGR2016-00024, May 31, 2016, 122 pgs.
*Ossia Inc.* vs *Energous Corp.*, Petition for Post-Grant Review of U.S. Pat. No. 9,124,125, May 31, 2016, 92 pgs.
*Ossia Inc.* vs *Energous Corp.*, Patent Owner Preliminary Response, Sep. 8, 2016, 95 pgs.
*Ossia Inc.* vs *Energous Corp.*, Petition for Post Grant Review of U.S. Pat. No. 9,124,125, May 31, 2016, 86 pgs.
*Ossia Inc.* vs *Energous Corp.*, Declaration of Stephen B. Heppe in Support of Petition for Post-Grant Review of U.S. Pat. No. 9,124,125, PGR2016-00023, May 31, 2016, 144 pgs.

\* cited by examiner

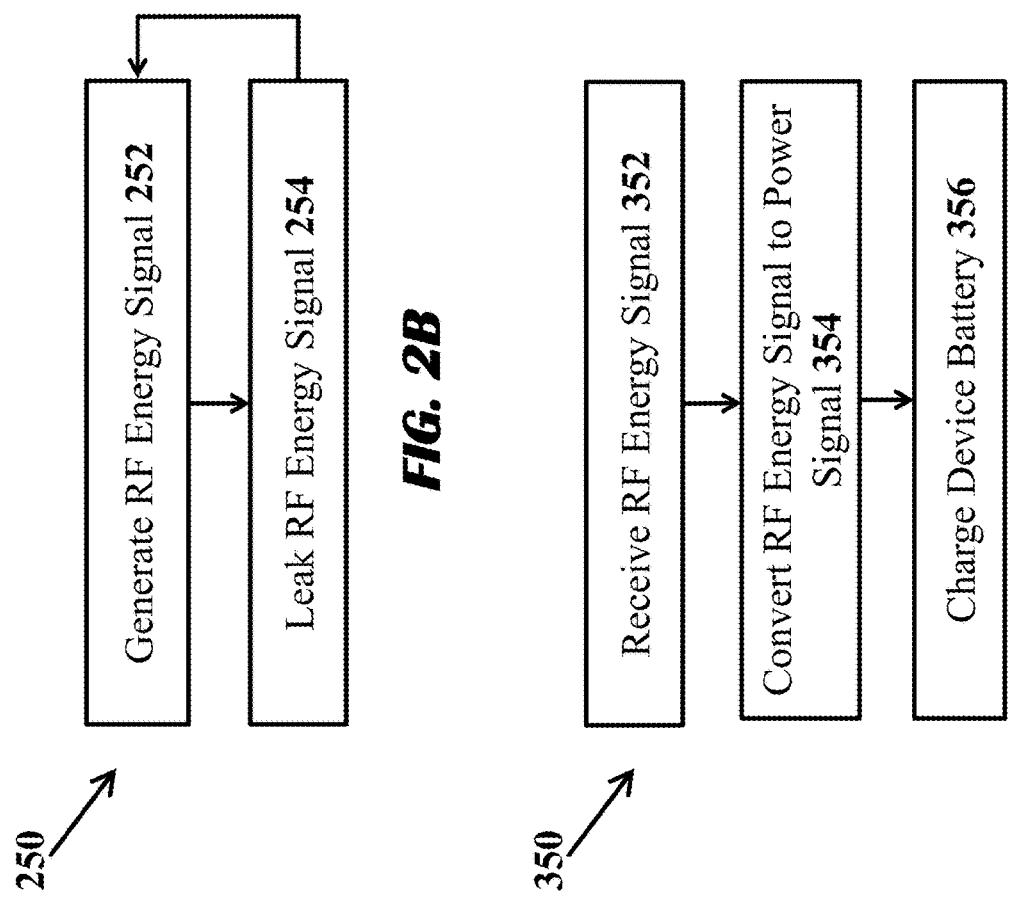

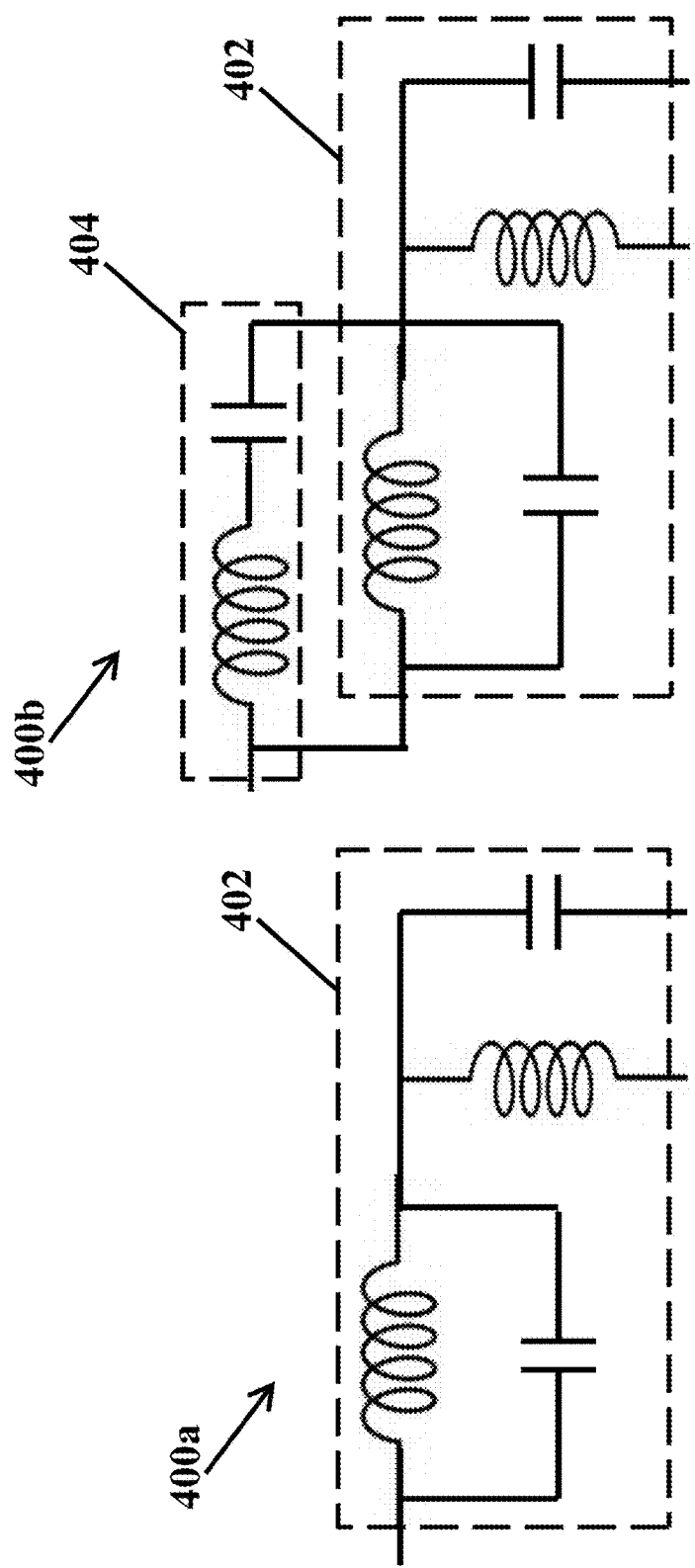

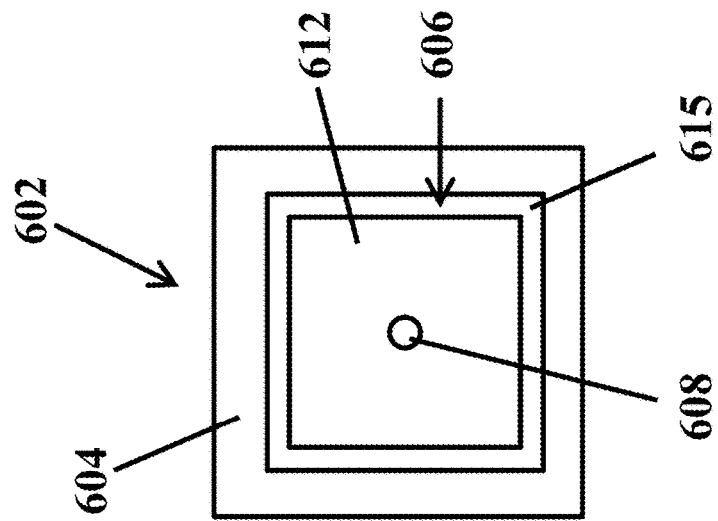
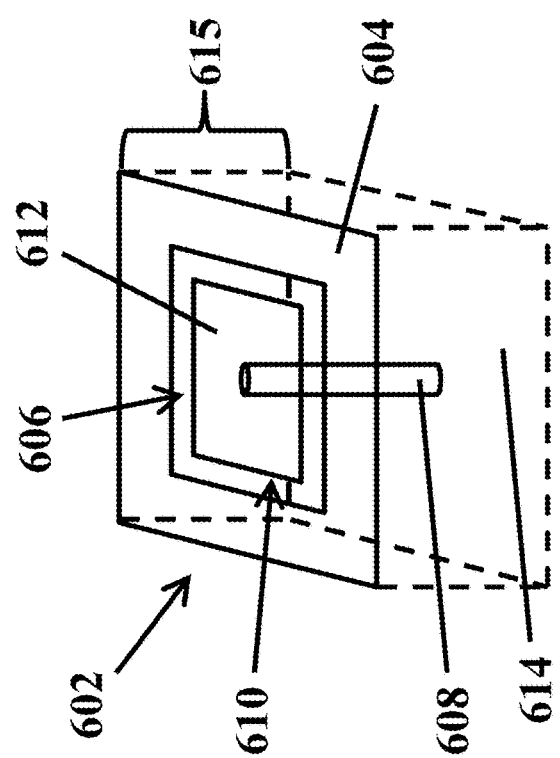
FIG. 6C
FIG. 6D

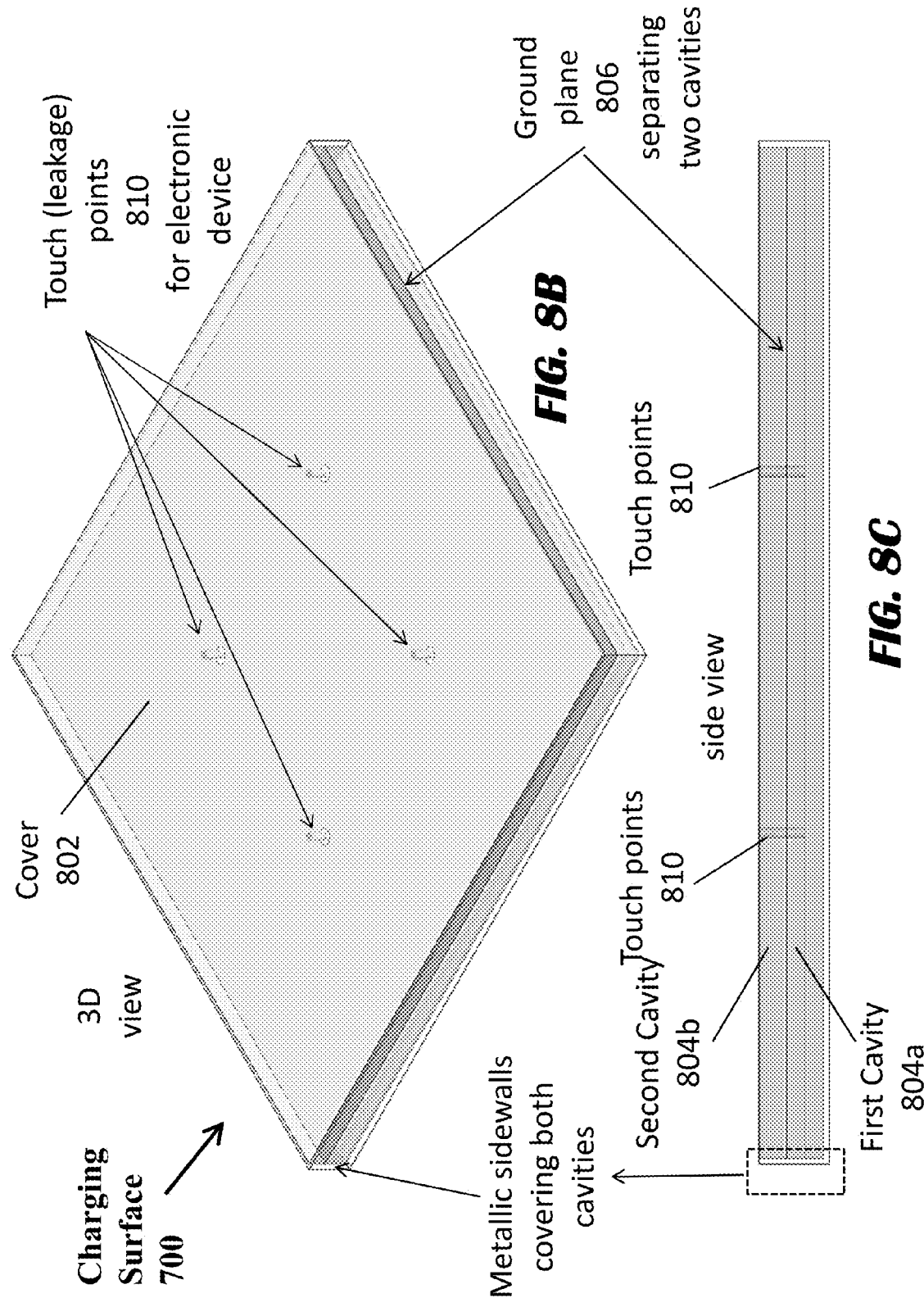

NEAR-FIELD CHARGING PAD FOR WIRELESS POWER CHARGING OF A RECEIVER DEVICE THAT IS TEMPORARILY UNABLE TO COMMUNICATE

CROSS-REFERENCE TO RELATED APPLICATIONS

This non-provisional patent application claims the benefit of U.S. Provisional Patent Application Ser. No. 62/387,205, entitled "Near Field Transmitters for Wireless Power Charging," filed Dec. 24, 2015, which is incorporated by reference herein in it is entirety.

TECHNICAL FIELD

Generally, the present disclosure relates to wireless charging. More particularly, the present disclosure relates to low-power near field charging surfaces.

BACKGROUND

Electronic devices, such as laptop computers, smartphones, portable gaming devices, tablets, or others, require power to operate. As generally understood, electronic equipment is often charged at least once a day, or in high-use or power-hungry electronic devices, more than once a day. Such activity may be tedious and may present a burden to some users. For example, a user may be required to carry chargers in case his electronic equipment is lacking power. In addition, some users have to find available power sources to connect to, which is time consuming. Lastly, some users must plug into a wall or some other power supply to be able to charge their electronic device. However, such activity may render electronic devices inoperable or not portable during charging.

Some conventional solutions include an inductive charging pad, which may employ magnetic induction or resonating coils. As understood in the art, such a solution still requires the electronic devices to: (i) be placed in a specific location on the inductive charging pad, and (ii) be particularly oriented for powering due to electromagnetic fields having a particular orientation. Furthermore, inductive charging units require large coils in both devices (i.e., the charger and the device being charged by the charger), which may not be desirable due to size and cost, for example. Therefore, electronic devices may not sufficiently charge or may not receive a charge if not oriented properly on the inductive charging pad. And, users can be frustrated when an electronic device is not charged as expected after using a charging mat, thereby destroying the credibility of the charging mat.

Other conventional solutions use far field RF wave transmission to create pockets of energy at remote locations for charging a device. Such solutions, however, are better suited for particular uses and configurations as far field RF wave transmission solutions typically use numerous antenna arrays and circuitry for providing phase and amplitude control of the RF waves. Accordingly, there is a desire for an economical application of a charging surface that allows for low-power, wireless charging without requiring a particular orientation for providing a sufficient charge.

SUMMARY

In one embodiment, the present disclosure provides a method for charging an electronic device, the method comprising applying an RF signal to a charging surface having a plurality of unit cells to cause an RF energy signal to be present within the unit cells of the charging surface for charging the electronic device in response to an antenna of the electronic device being positioned in a near-field distance from at least one of the unit cells. The unit cells may at least in part be a periodic structure, where the periodic structure may be locally periodic while being adaptive as function of location within the structure.

In one embodiment, the present disclosure provides a charging surface device comprising: circuitry configured to generate an RF signal; and a plurality of unit cells configured to receive the RF signal and cause an RF energy signal to be present for charging an electronic device in response to an antenna of the electronic device being positioned in a near-field distance measured from a surface of at least one of the unit cells.

In one embodiment, the present disclosure provides a method for charging an electronic device, the method comprising: applying an RF signal to a plurality of unit cells of a charging surface to cause an RF energy signal to be present within the unit cells of the charging surface; receiving the RF energy signal at an antenna of a wireless device when the antenna is positioned in a near-field distance from at least one of the unit cells; and charging a battery of the electronic device in response to the antenna receiving the RF energy signal.

In one embodiment, the present disclosure provides a system comprising: RF circuitry configured to generate an RF signal; an adaptive coupling surface (here, a charging surface) comprising a plurality of unit cells configured to receive the RF signal and to cause an RF energy signal to be trapped/stored within the unit cells when the receiver device is not present and to leak the energy when the receiver is within a near-field region of the surface. Receiver circuitry of an electronic device to be charged may be configured to charge the electronic device in response to an antenna of the electronic device receiving the RF energy signal when the antenna is positioned in a near-field distance from one or more of the unit cells (of the coupling surface).

In one embodiment, the present disclosure provides a method for charging an electronic device, the method comprising: generating an RF signal; applying the RF signal, by a conductive line extending through a via, to a patch antenna member of a unit cell (i.e., located within the coupling surface, where the patent antenna member or exciting element may be a part of the coupling surface design (e.g., one of the unit cells) or the exciting element may be an additional element placed within the other unit cells); generating, by the patch antenna, an RF energy signal in the unit cell; and leaking the RF energy signal from the unit cell to an antenna of the electronic device when the antenna is positioned in a near-field distance from the unit cell.

In one embodiment, the present disclosure provides a charging surface device comprising: a plurality of unit cells configured to receive one or more RF signals, each unit cell including: a patch antenna configured to: (i) receive one of the one or more RF signals, and (ii) generate an RF energy signal for charging an electronic device, and an aperture configured to leak the RF energy signal from the unit cell when an antenna of the electronic device is positioned in a near-field distance from the unit cell.

In one embodiment, the present disclosure provides a method for charging a device, the method comprising: applying an RF signal to a plurality of unit cells of a charging surface to cause an RF energy signal to be present within the unit cells of the charging surface; and filtering the RF energy signal using a harmonic screen filter element to produce the RF energy signal for charging the electronic device in response to an antenna of the electronic device being positioned in a near-field distance from at least one of the unit cells.

In one embodiment, the present disclosure provides a charging surface device comprising: circuitry configured to generate an RF signal; a plurality of unit cells configured to receive the RF signal and to cause an RF energy signal to be present within one or more of the unit cells; and a harmonic screen filter element configured to filter the RF energy signal for charging the electronic device in response to an antenna of the electronic device being positioned in a near-field distance from at least one of the unit cells.

In one embodiment, the present disclosure provides a method of manufacturing a charging surface device, the method comprising: coupling circuitry configured to generate an RF signal to a plurality of unit cells, the plurality of unit cells configured to receive the RF signal and to cause an RF energy signal to be present within one or more of the unit cells; and attaching a harmonic screen filter element configured to filter the RF energy signal for charging the electronic device in response to an antenna of the electronic device being positioned in a near-field distance from at least one of the unit cells.

In one embodiment, the present disclosure provides a method for charging an electronic device, the method comprising: receiving, by an antenna configured with a bandwidth that includes a center frequency and used to communicate wireless signals, a wireless charging signal operating at the center frequency, the wireless charging signal received from a charging surface positioned in a near-field distance from the antenna; and responsive to determining that the antenna is receiving a power above a threshold level, routing the received wireless charging signal to a rectifier to convert the wireless charging signal to a power signal.

In one embodiment, the present disclosure provides a system comprising: receiver circuitry configured to determine a power from a wireless charging signal received by an antenna used to communicate wireless signals, the wireless charging signal received by the antenna from a charging surface positioned in a near-field distance from the antenna; comparator circuitry configured to compare the power to a threshold level; rectifier circuitry configured to rectify the received wireless charging signal to produce a rectified signal; a voltage converter configured to convert the rectified signal to a voltage to charge a chargeable battery; and switching circuitry configured to route the received wireless charging signal to the rectifier when the power exceeds the threshold level.

In one embodiment, the present disclosure provides a method for charging an electronic device, the method comprising: receiving a signal indicative of a request for charging the electronic device; generating, in response to receiving the signal, an RF signal; applying the RF signal to a plurality of unit cells of a charging surface to cause an RF energy signal to be present in the unit cells of the charging surface for charging the electronic device; and leaking the RF energy signal from the unit cells of the charging surface to an antenna of the electronic device when the antenna is positioned in a near-field distance to at least one of the unit cells.

In one embodiment, the present disclosure provides a charging surface device comprising: control circuitry configured to receive a signal indicative of a request for charging an electronic device; a plurality of patch antennas each configured to generate an RF energy signal; and a plurality of unit cells configured to leak the RF energy signal from the unit cells when an antenna of the electronic device is tuned to the center frequency and positioned in a near-field distance from at least one of the unit cells.

In one embodiment, the present disclosure provides a method for charging an electronic device, the method comprising: producing a low-power RF energy signal in a unit cell of a charging surface; leaking the low-power RF energy signal from the unit cell of the charging surface to an antenna of the electronic device when the antenna is positioned in a near-field distance from the unit cell; sensing the low-power RF energy signal in the unit cell of the charging surface; comparing the low-power RF energy signal in the unit cell of the charging surface to a threshold level; and producing, if the low-power RF energy signal is below the threshold level, a subsequent low-power RF energy signal in the unit cell of the charging surface.

In one embodiment, the present disclosure provides a charging surface device comprising: a feeding element, such as a patch antenna, may be configured to produce a low-power RF energy signal; a unit cell inclusive of the feeding element, here the patch antenna, the unit cell configured to retain the low-power RF energy signal when an antenna of an electronic device is not positioned in a near-field distance from the unit cell, and configured to leak the low-power RF energy signal when the antenna of the electronic device is positioned in the near-field distance from the unit cell; and control circuitry configured to sense the low-power RF energy signal in the unit cell, compare the low-power RF energy signal to a threshold, and to cause, if the low-power RF energy signal is below the threshold, the patch antenna to produce a subsequent low-power RF energy signal stored in the unit cell.

In one embodiment, the present disclosure provides a method for charging an electronic device, the method comprising: leaking an RF energy signal from a charging surface in response to a metal structure being proximately positioned at a surface of the charging surface to cause the RF energy signal to enter a space formed between the surface of the charging surface and the metal structure so that an antenna of the electronic device can receive the leaked RF energy signal and route the received RF energy signal to a rectifier to convert the RF energy signal to charge a chargeable battery.

In one embodiment, the present disclosure provides a method for charging an electronic device, the method comprising: applying an RF signal to a plurality of unit cells of a charging surface to cause an RF energy signal to be present within the unit cells of the charging surface; and leaking the RF energy signal from one or more of the unit cells to a gap formed between a surface of the charging surface and a metal portion of the electronic device positioned in a near-field distance from the one or more of the unit cells to cause an antenna of the electronic device to receive the RF energy signal for charging the electronic device.

In one embodiment, the present disclosure provides a charging surface device comprising: circuitry configured to generate an RF signal; and a plurality of unit cells configured to receive the RF signal and to cause an RF energy signal to be present in the unit cells for charging an electronic device positioned in a near-field distance from one or more of the unit cells by leaking the RF energy signal from the one or more of the unit cells to a cavity/gap formed between a surface of the charging surface and a metal portion of the electronic device to cause an antenna of the electronic device to receive the RF energy signal for charging the electronic device.

BRIEF DESCRIPTION OF THE DRAWINGS

Embodiments of the present disclosure are described by way of example with reference to the accompanying figures, which are schematic and may not be drawn to scale. Unless indicated as representing prior art, the figures represent aspects of the present disclosure.

FIG. 2B is a flow diagram illustrating operation of the illustrative charging surface in accordance with one or more embodiments of the present disclosure;

FIG. 3B is a flow diagram illustrating operation of the illustrative electronic device in accordance with one or more embodiments of the present disclosure;

FIG. 4A is an illustrative schematic diagram of circuitry representing the charging surface when no electronic device is positioned within the near-field distance;

FIG. 4B is an illustrative schematic diagram of circuitry representing the charging surface when an electronic device is positioned within the near-field distance;

FIG. 6C illustrates a perspective view of an example embodiment of a unit cell including a portion of the antenna portion of the charging surface illustrated in FIGS. 6A and 6B, in accordance with an embodiment of the present disclosure;

FIG. 6D illustrates an overhead view of the example embodiment of the unit cell illustrated in FIG. 6C, in accordance with an embodiment of the present disclosure;

FIGS. 8B-8D illustrate a more detailed schematic of a charging surface that provides for a resonant-coupler to charge an electronic device, in accordance with an embodiment of the present disclosure;

DETAILED DESCRIPTION

Figure 1A:
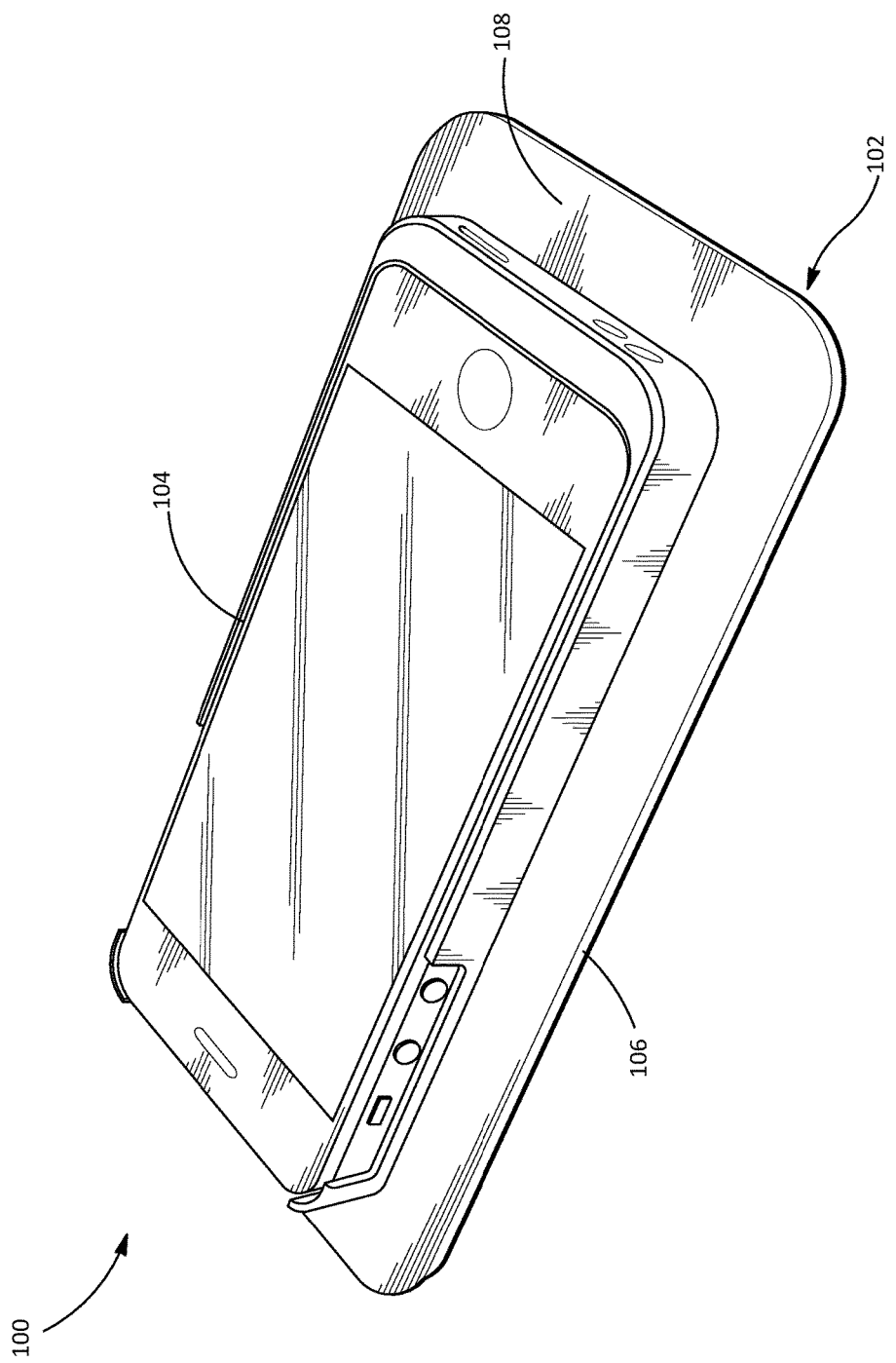
FIG. 1A is an illustration of an example embodiment of an electronic device positioned on an illustrative charging surface that produces an RF energy signal for charging the electronic device, in accordance with an embodiment of the present disclosure.

In the following detailed description, reference is made to the accompanying drawings, which form a part hereof. In the drawings, which may not be to scale or to proportion, similar symbols typically identify similar components, unless context dictates otherwise. The illustrative embodiments described in the detailed description, drawings and claims are not meant to be limiting. Other embodiments may be used and/or and other changes may be made without departing from the spirit or scope of the present disclosure.

Wireless Charging & High-Impedance Surfaces

FIG. 1A illustrates an embodiment of the present disclosure related to a charging surface, where an exemplary electronic device 104 is positioned on an illustrative charging surface 102 that produces a radio frequency (RF) energy signal for charging the electronic device 104. The charging surface 102 is shown as a pad, but it should be understood that the charging surface 102 may have any configuration, such as a desktop surface or portion thereof, housing of another electronic or non-electronic device, or any other surface in which RF charging via near-field RF signals may be provided to charge or power an electronic device, as described herein. The charging surface 102 may generate one or more RF energy signals for wireless power transmission that are received by the electronic device 104 when the electronic device 104, and more specifically, an antenna of the electronic device 104, is positioned within a near-field distance (e.g., preferably less than approximately 4 mm) from the charging surface 102. Alternative near-field distances, both higher than 4 mm and lower than 4 mm depending on the application and configuration of the charging surface 102, may be utilized. The received RF energy signals are then converted to a power signal by a power conversion circuit (e.g., rectifier circuit) (not shown) for charging a battery of the electronic device 104. In some embodiments, the total power output by the charging surface 102 is less than or equal to 1 Watt to conform to Federal Communications Commission (FCC) regulations part 15 (low-power, non-licensed transmitters).

In some embodiments, the electronic device 104 may include any electronic device including the RF power converter components described herein. For example, the electronic device may be any of a variety of portable technologies, such as a tablet, laptop, cell phone, PDA, wearable device, such as smart watches, fitness devices, headsets, or any other portable, mobile, or other electronic device technology that is capable of being recharged or operated utilizing the principles described herein.

In some embodiments, a charging surface 102 may include a housing defined by a plurality of sidewalls 106, a top surface 108, and a bottom surface (not shown). The top surface 108 extends over the bottom surface. The sidewalls 106 span between the top surface 108 and the bottom surface. In some embodiments, the housing is formed of plastic, but alternatively or additionally can be formed of other material(s), such as wood, metal, rubber, glass, or other material that is capable of providing for the functionality described herein. As illustrated in FIG. 1A, the charging surface 102 has a shape of a cuboid, but other two-dimensional or three-dimensional shapes are possible, such as a cube, a sphere, a hemisphere, a dome, a cone, a pyramid, or any other polygonal or non-polygonal shape, whether having an open-shape or a closed-shape. In some embodiments, the housing is waterproof or water-resistant. The charging surface 102 may be stiff or flexible and optionally include a non-skid bottom surface to resist movement when placed on a desktop or tabletop. Similarly, the top surface 108 may be or include non-skid region(s) (e.g., strips) (not shown) or be entirely non-skid to resist motion between the surface 108 and an electronic device. Still yet, a bracket or other guide may be mounted to the top surface 108 to assist a user with positioning of an electronic device. The housing may contain various components of the charging surface 102, which are described in greater detail herein. Note, the charging surface may be made of heat-conductive material (e.g., aluminum nitride) to absorb heat from the receiver device. Moreover, the entire coupling surface may be made of high-DK (i.e., with high dielectric permittivity) plastics/ceramics that may also be used to mold the unit cells to form the surface.

As described in greater detail below, the charging surface 102 may include a plurality of unit cell antennas formed, at least partially, from a substrate material. The substrate may include a metamaterial (i.e., an artificial material being made using small, compared to a wavelength of a signal being transmitted, elements such as patches, dipoles or slots), such as FR4, Rogers, ceramic, or any other material known in the art. The unit cells are designed to retain the RF energy signal used to charge the electronic device 104 prior to the electronic device 104 being placed on the charging surface 102. That is, when there is no antenna of the electronic device 104 positioned within the near-field distance, or an antenna of the electronic device 104 is not tuned or otherwise configured to receive the RF energy signal, the unit cells do not leak or have minimal leakage of the RF energy signal. However, the unit cells are adaptably configured to allow the RF energy signal to leak from the unit cells to an antenna of the electronic device 104 when the antenna is positioned within the near-field distance from the unit cell, and is tuned to the frequency of the RF energy signal (or is otherwise configured to receive the RF energy signal). In the present disclosure, one embodiment of an antenna is considered "tuned" to a particular frequency when leakage of an RF energy signal from the charging surface 102 with metamaterial occurs. One or more surfaces of the unit cell may be formed using metamaterial. For example, a ground plane, antenna patch, and/or both may be formed of metamaterial depending on design criteria.

In configuring the unit cells of the charging surface 102, the unit cells may be periodically spaced and sized such that a frequency signal that is generated and propagating within a substrate of the unit cells may be substantially retained within the charging surface 102 prior to the electronic device 104 being placed within the near-field of the charging surface 102. That is, when an antenna of the electronic device 104 is place in the near-field of the charging surface 102, a change in the boundary conditions of the charging surface results due to capacitance and inductance electrical characteristics being introduced by the electronic device at the surface of the unit cells (see FIGS. 4A and 4B).

The surface may be designed so that electromagnetic tuning results to enable leakage at the particular unit cell(s) that are within the near-field distance of the antenna(s) of the charging surface 102. When "tuned" properly, an RF energy signal is retained within a substrate of the unit cells of the charging surface 102 and no or minimal leakage occurs. The RF energy signal, when no antenna is in the near-field of the charging surface 102, reflects from the surface of the charging surface 102, such that no or minimal leakage occurs. And, when "tuned" properly, as when an antenna of the electronic device 104 is within the near-field of the charging surface 102, the surface characteristics of the charging surface 102 change and the signals may become aligned with slot dipoles or other feature of the unit cell(s) at the location of the antenna of the electronic device 104 to cause leakage to occur at that location. In the event that a different frequency is to be used, a dimensional change may be made to the unit cells of the charging surface 102 to accommodate the different frequency to avoid leakage. As an example, if higher frequencies are used, smaller unit cells need to be included to provide similar performance.

Figure 1B:
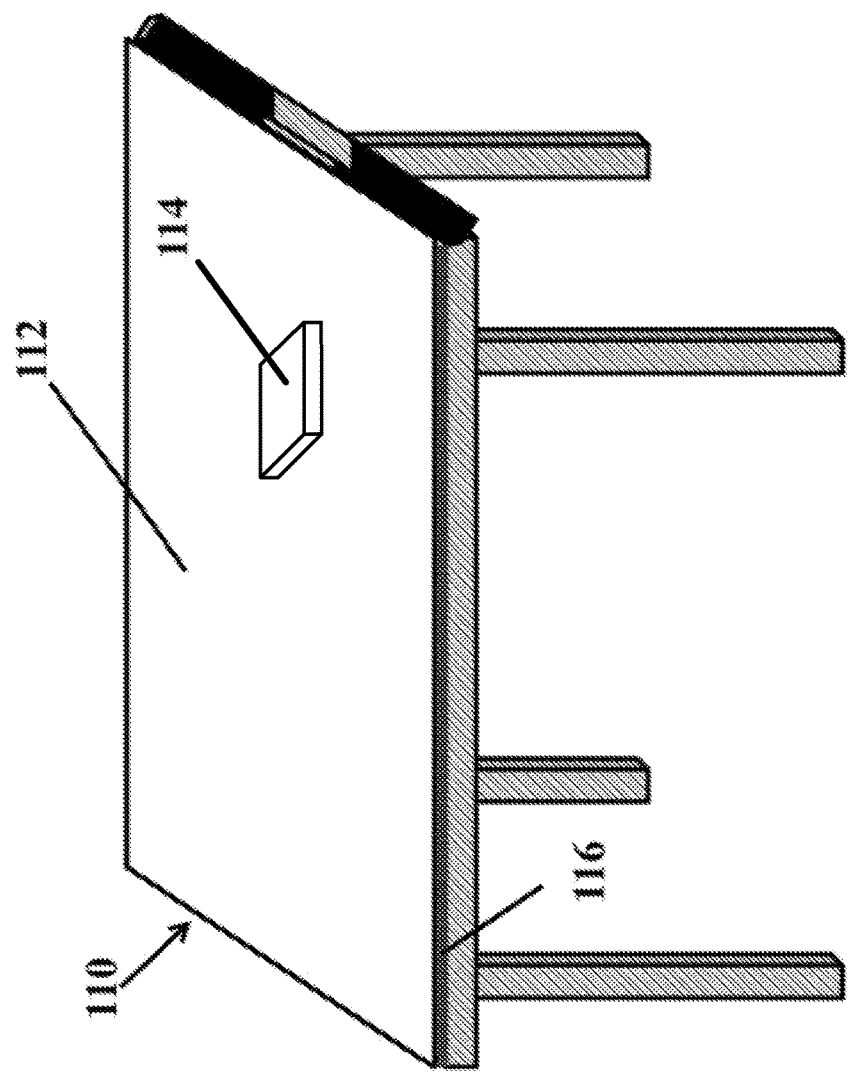
FIG. 1B is an illustrative table having a charging surface on which an electronic device is positioned.

With regard to FIG. 1B, an illustration of an illustrative table 110 inclusive of a surface 112 on which an electronic device 114 is positioned is shown. The surface 112 may fully or partially be configured to operate as a charging surface utilizing the same or similar principles and configuration as the charging surface 102. By providing a piece of furniture, for example, inclusive of a charging surface, the electronic device 114 may be placed on the charging surface 112 and the electronic device 114 will charge independent of a separate charging device or external pad, such as shown in FIG. 1A. It should be understood that a wide variety of devices, furniture, and/or structures may be configured to include a charging surface on one or more surface regions of the devices, furniture, and/or structures. It should also be understood that while a horizontal surface is desirable, alternative angled surfaces may be provided, as well.

As shown, an antenna layer 116 provides for the same or similar structure as the charging surface 102 such that an RF energy signal may be leaked from the charging surface 102 in response to an antenna tuned to the frequency of the RF energy signal being positioned in a near-field distance of the charging surface 102. In one embodiment, rather than the entire charging surface 112 being configured to operatively charge an electronic device, a portion of the charging surface 112 may be configured to perform the charging functionality, as described herein.

Figure 2A:
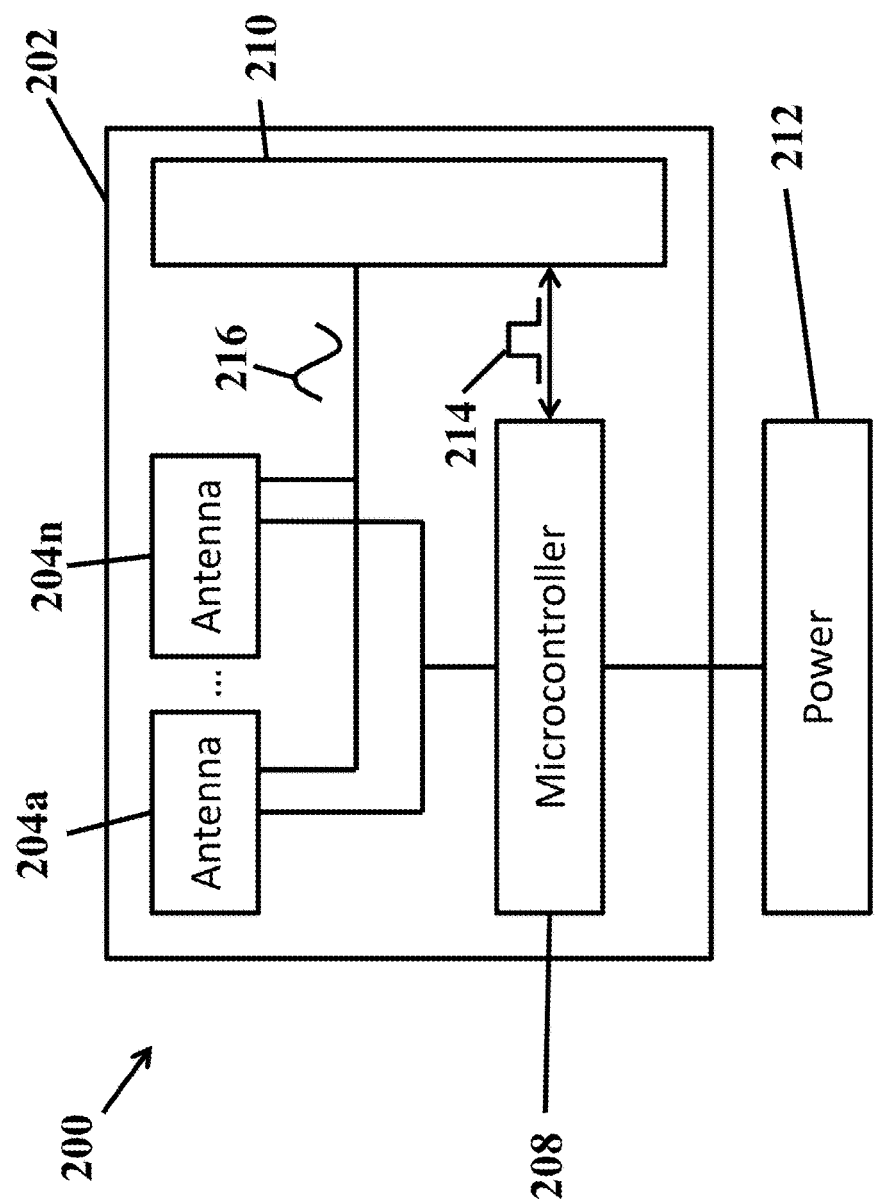
FIG. 2A is a schematic diagram of an illustrative charging surface for generating RF energy signals to charge an electronic device, in accordance with an embodiment the present disclosure.

FIG. 2A illustrates a schematic diagram 200 of various components including an embodiment of the charging surface 102 of FIG. 1A. The charging surface 102 may include a housing 202, where antenna elements 204 (shown as antenna elements 204a through 204n), digital signal processor (DSP) or microcontroller 208, and optional communications component 210 may be included. Housing 202 can be made of any suitable material, for example plastic or hard rubber, that allows for signal or wave transmission and/or reception. Antenna elements 204 are each disposed within one of the unit cells of the charging surface 102, and may include suitable antenna types for operating in frequency bands such as 900 MHz, 2.5 GHz, or 5.8 GHz as these frequency bands conform to Federal Communications Commission (FCC) regulations part 18 (Industrial, Scientific and Medical (ISM) equipment). Other frequencies and multiple frequencies are also possible. Suitable antenna types may include, for example, patch antennas with heights from about 1/24 inch to about 1 inch and widths from about 1/24 inch to about 1 inch. Other types of antenna elements 204 may be used, for example, metamaterials and dipole antennas, among others.

In one embodiment, a microcontroller 208 may include circuitry for generating and controlling RF transmission using antenna elements 204. These RF signals may be produced using an external power supply 212 and RF circuitry (not shown) including a local oscillator chip (not shown) using a suitable piezoelectric material, filters, and other components. These RF signals are then connected to the antennas 204 and cause an RF energy signal to be present in the unit cells of the charging surface 102. Microcontroller 208 may also process information sent by a receiver through its own antenna elements for determining times for generating the RF signals and for causing the appropriate power level to be produced by the resulting RF energy signals. In some embodiments, this may be achieved using communications component 210 configured to cause the RF energy signals to be produced within a desired frequency range, as previously described and as understood in the art. In an alternative configuration, rather than using a local signal generator, a non-local signal generator (i.e., outside the charging surface 102) may be utilized.

In some embodiments, a power amplifier (not shown) and gain control circuitry (not shown) may be applied to each antenna 204. However, given the number of antennas that may be used in a charging surface 102, the use of one or more power amplifiers amplify an RF signal (an RF signal that is supplied to or generated within the charging surface 102) in order to generate an RF energy signal (the signal that is applied to the antennas 204) to feed each of the multiple antennas 204 provides for reduced circuitry and lower cost. In one specific embodiment, four RF input ports (not shown) may be used to feed the antennas 204 of the charging surface 102. In designing the charging surface 102, a single RF input port or RF generator internal to the charging surface 102 may support a certain number or ratio of antennas 204.

In one embodiment, communications component 210 may include a standard wireless communication protocol, such as Bluetooth® or ZigBee®. In addition, communications component 210 may be used to transfer other data, such as an identifier for the electronic device 104 or surface 102, battery level, location, charge data, or other such data. Other communications components may be possible, which may include radar, infrared cameras, or frequency-sensing devices for sonic triangulation to determine the position of the electronic device 104.

In one embodiment, in response to the communications component receiving a wireless signal (e.g., Bluetooth® signal) from an electronic device to be charged by the charging surface 102, the microcontroller 208 may be notified using a digital signal 214 to responsively cause the communications component 210 to generate an RF energy signal 216 to be applied to antennas 204. In an alternative embodiment, the communications component may have its own RF circuitry and antenna(s) for receiving wireless signals, and the microcontroller causes RF energy for charging to be applied to the antennas. With such a configuration, an RF port (see FIGS. 5B and 6B) may provide for an electrical conductor to provide for an RF signal to be communicated to the communications component 210 for processing and communication to the antennas 204. In yet another embodiment, a separate device, such as battery pack, protection case of a mobile device, or any other device that may be used to charge or power an electronic device may include RF circuitry and antenna(s) for receiving wireless signals from the charging surface 102.

In one embodiment, a separate antenna (not shown) may be configured to receive RF signals and communicate the received RF signals to the communications component 210 for processing and/or directly routing to the antennas 204. The use of a separate antenna may enable the charging surface 102 to be operated remotely from a far-field transmitter that transmits an RF charging signal to the charging surface 102 for charging or powering an electronic device in a near-field manner, as described herein.

The power supply 212 may be provided by way of a connection (e.g., a USB or microUSB connection) to a laptop, wall charger, internal battery, external battery, or other power source. The power supply 212 may be used to power circuitry on or at the charging surface 102.

FIG. 2B is a flow diagram 250 illustrating general operation of the charging surface 102 in accordance with one or more embodiments of the present disclosure. At step 252, the charging surface 102 generates an RF energy signal in one or more of the unit cells of the charging surface 102. The unit cells retain substantially all (e.g., below a certain leakage threshold, such as −30 dB below the RF energy signal) of the RF energy signal used to charge the electronic device 104 when there is no electronic device 104 antenna positioned within a near-field distance from any of the antennas 204 of the unit cells or if the antenna of the electronic device 104 is not tuned or otherwise configured to receive the RF energy signal. At step 254, the unit cells adapt to allow the RF energy signal to leak from the unit cells to an antenna of the electronic device 104 when the antenna is: (i) positioned within the near-field distance from one of the unit cell antennas 204, and (ii) tuned to the frequency of the RF energy signal (or is otherwise configured to receive the RF energy signal). The adaption of the unit cells to allow leakage of the RF energy signal is a result of a capacitive inductance element (antenna) being placed in the near-field of one or more of the unit cells. This process continues to charge the electronic device 104.

Figure 2C:
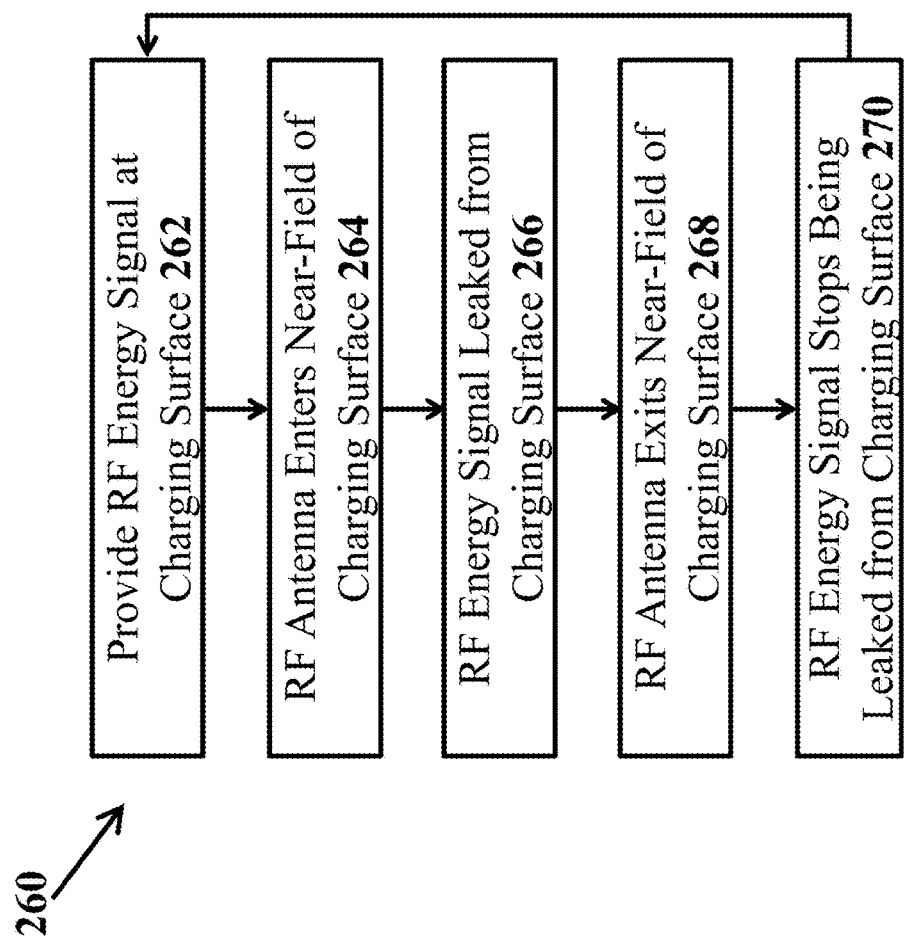
FIG. 2C is a flow diagram illustrating a more detailed operation of the illustrative charging surface in accordance with one or more embodiments of the present disclosure.

FIG. 2C is a flow diagram illustrating a more detailed process 260 of the illustrative charging surface in accordance with one or more embodiments of the present disclosure. The process 260 may start at step 262, where an RF energy signal may be provided at a charging surface. The RF energy signal may be an RF energy signal that is provided at the charging surface by being contained (trapped/stored) or propagated within a substrate of the charging surface. In an alternative embodiment, rather than providing the RF energy signal at the charging surface, an RF signal that is used to cause the RF energy signal to be propagated within the substrate may be turned off until a change in capacitance, inductance, or RF signal is sensed at the charging surface by a passive or active electronic device. Still yet, the RF energy signal may be intermittently turned on or turned on at a low power level until an electronic device is determined to be proximately located or actually within the near-field of the charging surface.

At step 264, an RF antenna of an electronic device may enter a near-field of the charging surface. The near-field may be a range at which the charging surface is capable of leaking the RF energy signal from the surface in response to a capacitance and/or inductance change near the charging surface, as further described herein.

At step 266, the RF energy signal may be leaked from the charging surface in response to the RF antenna entering the near-field of the charging surface. As an example, if the amount of RF energy in the RF energy signal that is distributed and being propagated within the substrate of the charging surface is 5 W, then the RF energy signal may automatically be routed to a location (e.g., above one or more unit cells) of the antenna of the electronic device that is within the near-field of the charging surface and leaked therefrom to cause the 5 W to be applied to the antenna. As understood in the art, the amount of charge that results from being in the near-field of the charging surface is based on the amount of coupling between the two antennas. If, for example, a coupling ratio is 1, then there is 0 dB loss. If, for example, the coupling ratio is 0.5, then there is a 3 dB loss.

At step 268, when the RF antenna exits from the near-field of the charging surface, the RF energy signal stops being leaked from the charging surface at step 270. At that time, the RF energy signal again is trapped/stored within the substrate of the charging surface. Alternatively, in one embodiment, the RF signal that is applied to the charging surface to create the RF energy signal is turned off to save power.

Figure 3A:
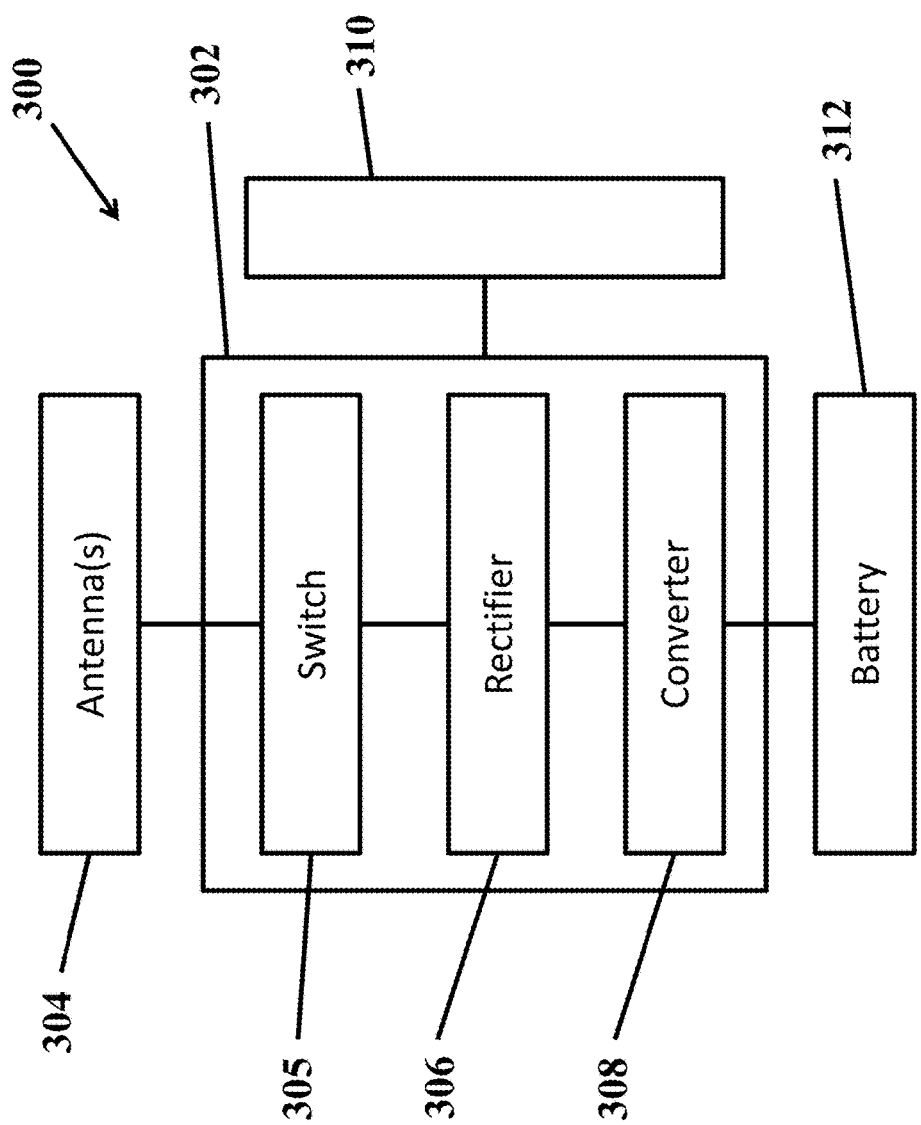
FIG. 3A is a schematic diagram of an illustrative electronic device for receiving the RF energy signals generated by a charging surface, in accordance with an embodiment of the present disclosure.

FIG. 3A illustrates a schematic diagram 300 of various components comprising an embodiment of the electronic device 104. The electronic device 104 may include a receiver component 302, one or more antennas 304, a battery 312 that is to be charged in accordance with the present disclosure, and an optional communications component 310. In some embodiments, the communications component 310 may be included in the receiver component 302. In some embodiments, the receiver component 302 comprises circuitry including one or more switch elements 305, a rectifier 306, and a power converter 308, where the rectifier 306 and power converter 308 may be combined. The receiver 302 may be positioned within the electronic device 104 and connected to the electronic device antenna(s) 304, battery 312, and optional communications component 310. In some embodiments, the receiver component 302 may include a housing made of any suitable material, for example plastic or hard rubber that may allow for signal or wave transmission and/or reception.

The device antennas 304 may include one or more antenna types capable of operating in frequency bands similar to the bands described above with respect to FIG. 2A. In some embodiments, the device antennas 304 may include an antenna designed for Wi-Fi data communication with the electronic device 104, and an antenna designed for wireless data communication associated with telecommunications of the electronic device 104. The antennas 304 may be conventional and native to the electronic device 104 as produced off-the-shelf for consumer usage. In some embodiments, the device antennas 304 that operate in the frequency bands as described above serve at least two purposes. One exemplary purpose is to facilitate the data communication with the electronic device 104 over wireless standards such as Bluetooth or WLAN for communication of user data as well as for communication of data related to the wireless charging function. A second purpose is to receive the RF charging signal from a charging surface and provide this signal to the receiver component 302. In such embodiments the device antennas 304 are serving two functions, and there is no separate dedicated antenna for reception of wireless charging signal.

However, in other embodiments, the electronic device 104 may include two sets of antennas. One set of one or more antennas to facilitate wireless data communication such as over Bluetooth or WLAN for communication of user data as well as data related to wireless charging operation; a second set of one or more antennas to receive RF wireless charging signals and provide this signal to the receiver component 302. In this embodiment, one set of antenna(s) is dedicated to the reception of RF charging signal. Note that in this embodiment, use of separate set of antenna(s) allows for the data communication and RF charging to operate on different frequencies if desired.

The charging surface has a certain operating frequency band. Depending on that operating frequency band of an antenna of an electronic device 104, the antenna of the electronic device 104 is to be within the operating frequency band of the charging surface so that power transfer within the near-field may be made. As an example, if the RF frequency of the RF energy signal operates within a Wi-Fi frequency band, then antennas for mobile communications will not cause leakage of the RF energy signal due to being outside the frequency band of the charging surface. In one embodiment, a separate device, such as a power pack with an antenna, power converter, and battery, may be configured to operate at a frequency outside the frequency band of conventional mobile communications (e.g., GSM, LTE, etc.). As an example, the charging surface may be configured to operate over an unlicensed frequency band, and a power pack may be configured to also operate over that frequency band so that communications are not impacted when being charged by the charging surface.

In some embodiments, the receiver component 302 may incorporate antennas (not shown) that are used in lieu of, or in addition to, the electronic device antennas 304. In such embodiments, suitable antenna types may include patch antennas with heights from about 1/24 inch to about 1 inch and widths from about 1/24 inch to about 1 inch, or any other antenna, such as a dipole antenna, capable of receiving RF energy signals generated by the charging surface 102. Alternative dimensions may be utilized, as well, depending on the frequencies being transmitted by the antenna. In any event, regardless of whether the original device antennas 304 or additional antennas incorporated into the receiver 302 are used, the antennas should be tuned or otherwise be configured to receive the RF energy signal generated by the charging surface 102 when placed within a near-field distance from the charging surface 102. In some embodiments, the receiver component 302 may include circuitry for causing an alert signal to indicate that the RF energy signal is received. The alert signal may include, for example, a visual, audio, or physical indication. In an alternative embodiment, rather than using an antenna internal to an electronic device, a separate charging device, such as a "back pack" that may simultaneously operate as a protective case, as an example, for the electronic device (e.g., mobile phone), may include an antenna along with a power conversion electronic device that converts the RF energy signal into a DC power signal.

The switch element(s) 305 may be capable of detecting the RF energy signals received at one or more of the antennas 304, and directing the signals to the rectifier 306 when the detected signals correspond to a power level that exceeds a threshold. The switch element(s) may be formed from electronics, such as diode(s), transistor(s), or other electronic devices that may be used to determine a power level, absolute or average, that causes the switch element(s) 305 to route the signal from a receiver to the rectifier 306 for power conversion thereby. For example, in some embodiments, the switch may direct the received RF energy signals to the rectifier 306 when the RF energy signal received at the antenna 304 is indicative of a wireless power transfer greater than 10 mW. In other embodiments, the switch may direct the received RF energy signals when they are indicative of a wireless power transfer greater than 25 mW. This switching acts to protect from damaging electronic components, such as a receiver circuit, of the electronic device 104 by preventing a power surge from being applied thereto. If the threshold power is not reached, the electronic device operates in a conventional manner.

The rectifier 306 may include diodes, resistors, inductors, and/or capacitors to rectify alternating current (AC) voltage generated by antennas 304 to direct current (DC) voltage, as understood in the art. In some embodiments, the rectifier 306 and switch 305 may be placed as close as is technically possible to the antenna element 304 to minimize losses. After rectifying AC voltage, DC voltage may be regulated and/or conditioned using power converter 308. Power converter 308 can be a DC-DC converter, which may help provide a constant voltage output, regardless of input, to an electronic device or, as in this embodiment, to a battery 312. Typical voltage outputs can be from about 0.5 volts to about 10 volts. Other voltage output levels may be utilized, as well.

Optional communications component 310, similar to that described above with respect to FIG. 2A, may be included in electronic device 104 to communicate with the communications component 210 and other electronic equipment. The communications component 310 may be integrated with the receiver component 302 or may be a discrete component located in the electronic device 104. In some embodiments, the communications component 310 may be based on standard wireless communication protocols, which may include Bluetooth® or ZigBee®. In addition, communications component 310 may be used to communicate other data, such as an identifier for the electronic device 104 or charging surface 102, battery level, location, power requirements specific to the electronic device 104, or other data.

FIG. 3B is a flow diagram 350 illustrating general operation of the electronic device 104 in accordance with one or more embodiments of the present disclosure. At step 352, the antenna 304 receives an RF energy signal from one or more of the unit cells of the charging surface 102 when the antenna 304 is tuned to the frequency of the RF energy signal (or is otherwise configured to receive the RF energy signal) and is positioned within a near-field distance from one or more of the antennas 204 of the unit cells. At step 354, the receiver component 302 converts the received RF energy signal to a power signal that is used to charge the device battery 312 at step 356. Alternatively, rather than charging a battery, the power signal may power circuitry of the electronic device directly, thereby enabling the electronic device to be operated independently of a battery.

FIG. 4A illustrates a schematic diagram of an electrical circuit model 400a representing the electrical state of the charging surface 102 when the electronic device 104 is not positioned within the near-field distance from the charging surface 102. The electrical circuit model 400a includes circuitry 402 representative of the electromagnetic operation of the charging surface 102 when no electronic device antenna 304 is positioned in a near-field distance from the charging surface 102. The electrical circuit model 400a represents a model of the charging surface 102 that is configured not to leak or otherwise output RF signals due to not being tuned or otherwise operating as high-impedance prior without an antenna of an electronic device being positioned within the near-field distance of the charging surface 102.

Figure 4C:
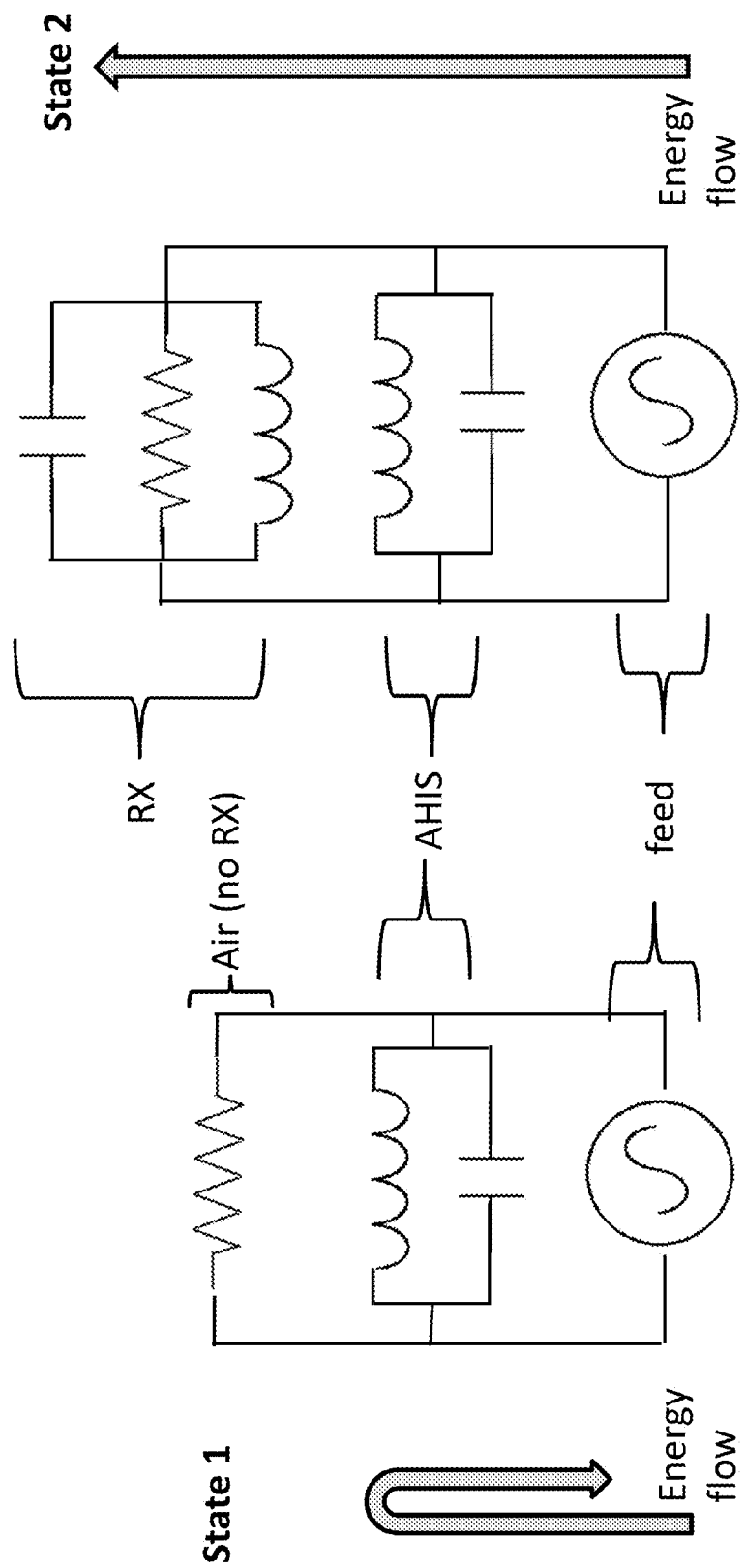
FIG. 4C shows schematic models of equivalent circuits with two states of energy flow without and with an electronic device positioned in a near-field distance of the charging surface.

FIG. 4B illustrates a schematic diagram of an electrical circuit model 400b representing an electrical connection between the charging surface 102 and the electronic device 104 when the electronic device 104 is positioned within the near-field distance from the charging surface 102 and the antenna(s) 304 of the electronic device 104 is tuned to the center frequency of the RF energy signal generated by the charging surface 102. The electrical circuit model includes circuitry 404 representative of the electronic device 104 being electromagnetically coupled to the circuitry 402 of the charging surface 102 to cause a change in the electromagnetic operation of the charging surface 102. The electrical circuit model 400b represents a model of the charging surface 102 that is configured to leak or otherwise output RF signals when an antenna of an electronic device is positioned within the near-field distance of the charging surface 102 so as to cause the representative electrical circuit model 400b to become tuned due to coupling effects, as understood in the art and further described with regard to FIGS. 4C and 4D.

Figure 4D:
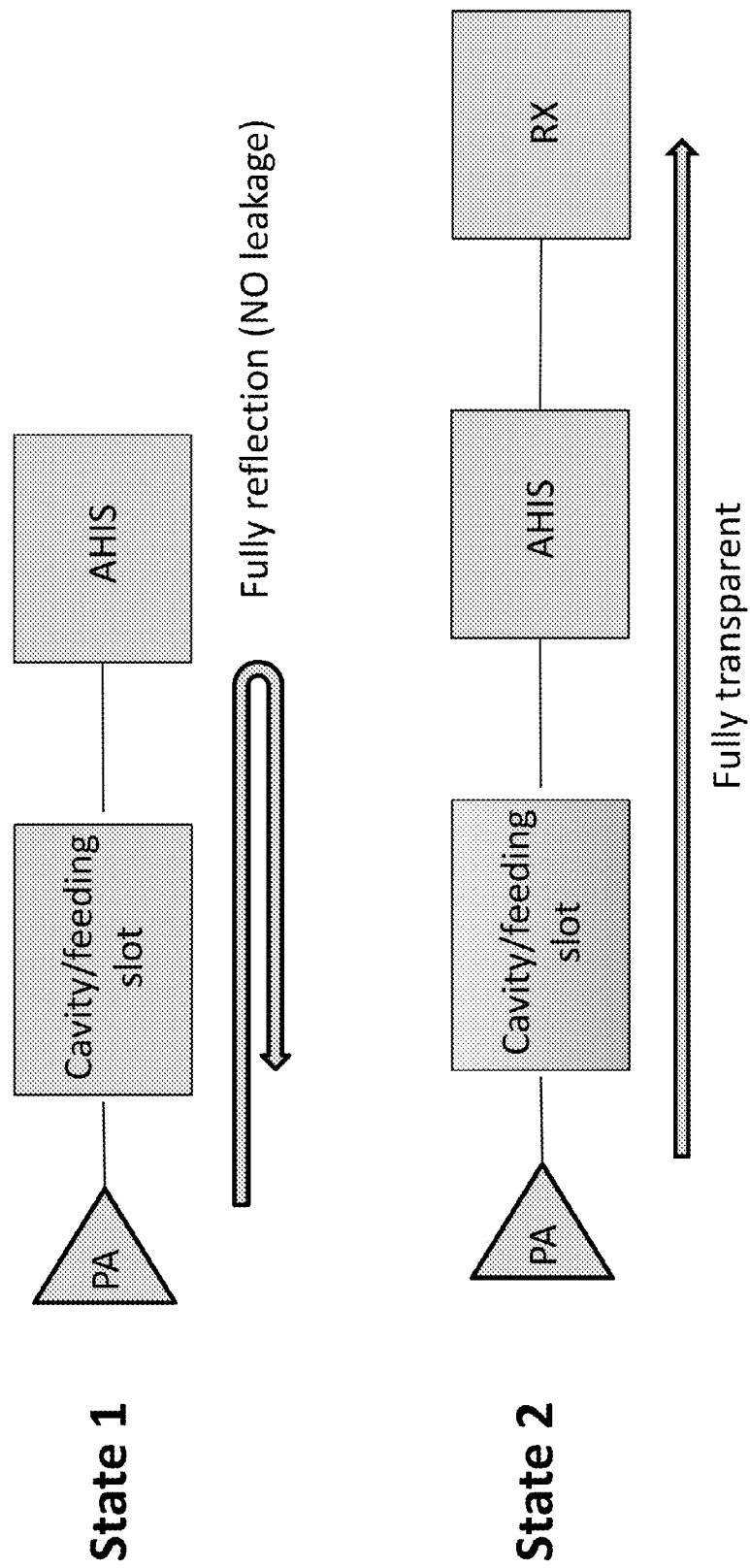
FIG. 4D is an illustration of an alternative representation of the schematic models of FIG. 4C.

FIG. 4C shows schematic models of equivalent circuits with two states of energy flow without and with an electronic device positioned in a near-field distance of the charging surface. In the first state, air causes a reflection of energy from a high impedance surface of the charging surface. In the second state, inclusion of an antenna receiver in a near-field of the surface forms an inductive coupling that enables energy flow through the high impedance surface of the charging surface. FIG. 4D is an illustration of an alternative representation of the schematic models of FIG. 4C. It should be understood that the models in FIGS. 4C and 4D are simplified and more complex models may be utilized to represent the adaptive high-impedance surface.

Figure 5A:
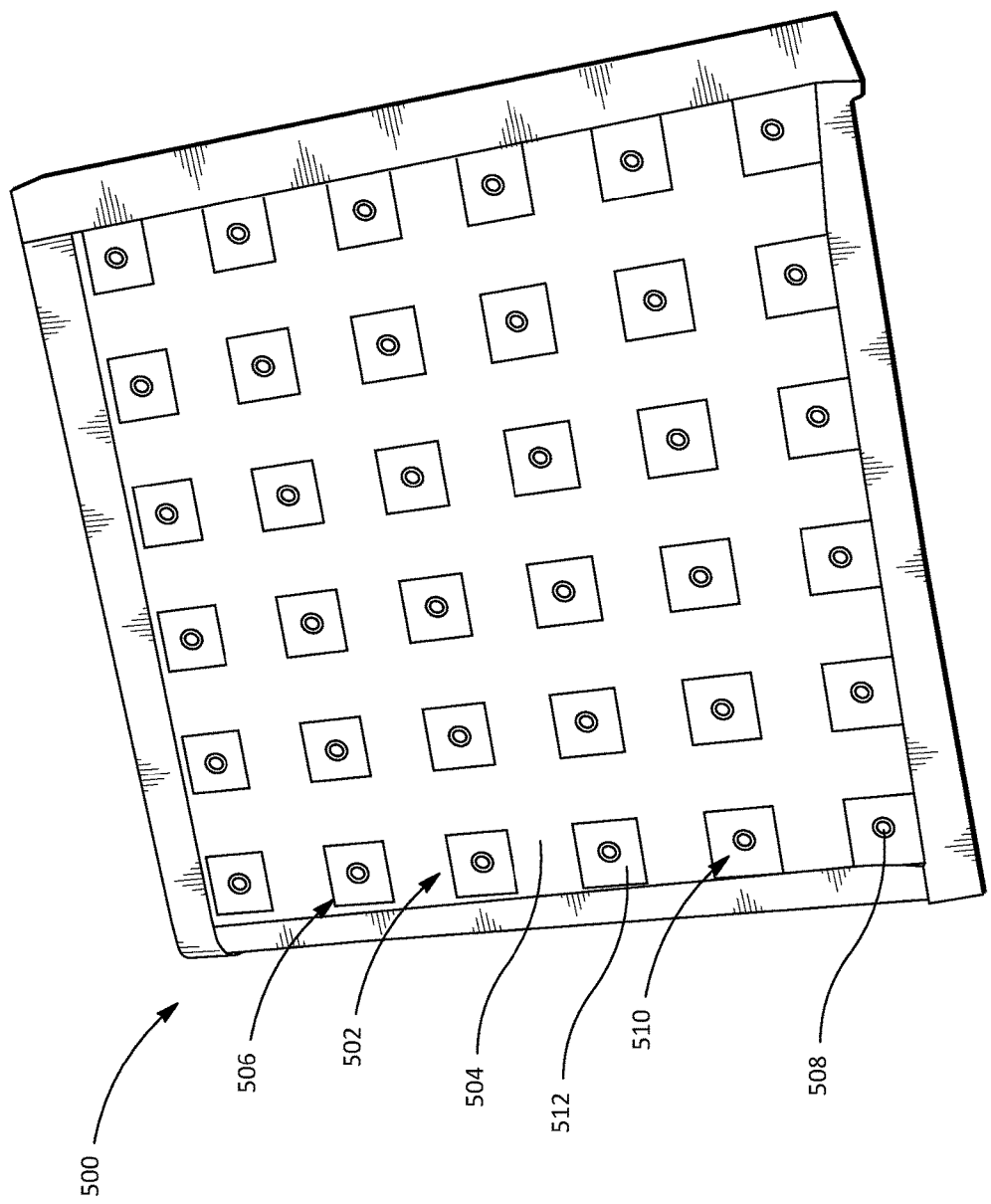
FIG. 5A is an illustration of a top-side view of an example embodiment of an antenna portion of a charging surface including two substrate layers, in accordance with an embodiment of the present disclosure.
Figure 5B:
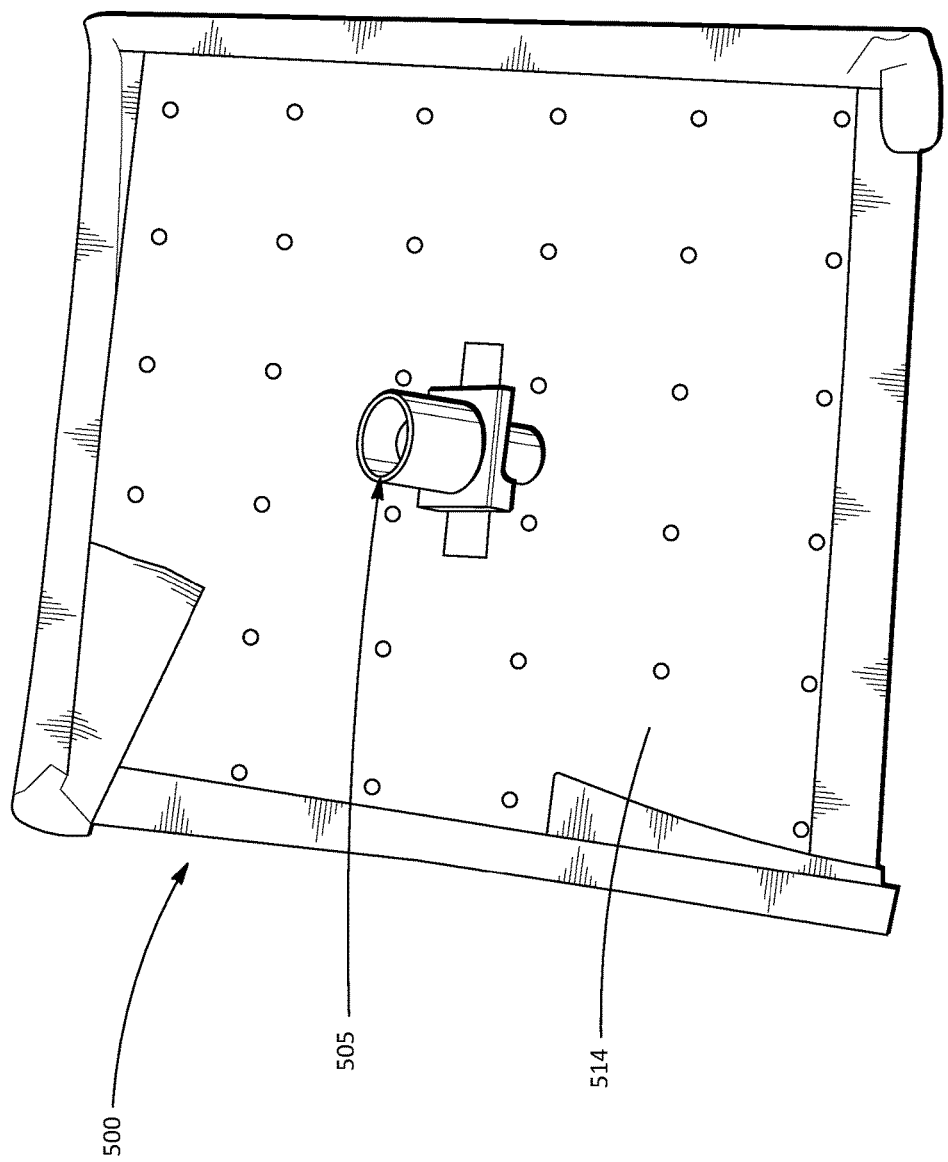
FIG. 5B is a bottom-side view of an example embodiment of a feeding portion (i.e. slot being made into the ground plane of the surface) of a charging surface including two substrate layers, in accordance with an embodiment of the present disclosure.
Figure 5D:
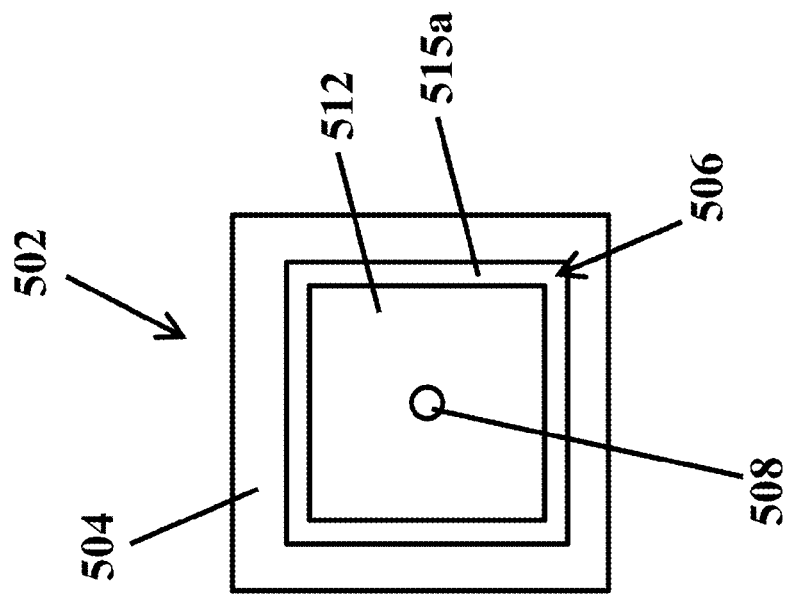
FIG. 5D is an overhead view of the example embodiment of the unit cell illustrated in FIG. 5C, in accordance with an embodiment of the present disclosure.
Figure 5C:
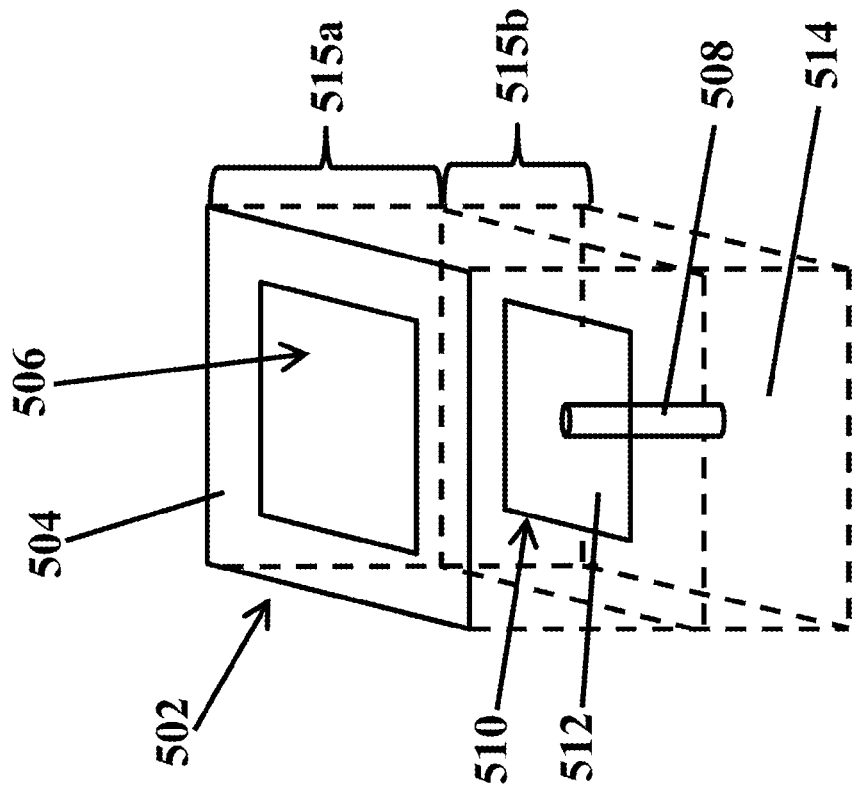
FIG. 5C is a perspective view of an example embodiment of a unit cell used for the antenna portion of the charging surface illustrated in FIGS. 5A and 5B, in accordance with an embodiment of the present disclosure.

Referring now to FIGS. 5A-5D, an example embodiment of an antenna portion 500 of a charging surface is provided, wherein the antenna portion 500 includes a plurality of unit cells 502 arranged in a matrix formation. Each of the unit cells 502 includes two substrate layers 515a and 515b. The top substrate layer 515a of each of the unit cells 502 includes a metal portion 504 (e.g., copper) defining apertures 506 positioned at the top of the unit cells 502. The bottom substrate layer 515b of each unit cell 502 includes a patch antenna 510 comprising a metal patch 512 having an electrical connection through a via 508 to a ground plane 514. The ground plane 514 may be a metamaterial. The ground plane 514 is connected to an RF port 505 as shown in FIG. 5B for conducting RF signals to unit cells 502.

In some embodiments, the patch antenna 510 is configured to generate the RF energy signal that radiates within the top substrate layer 515a. In accordance with the present disclosure, the RF energy signal remains in the top substrate layer 515a until the RF energy signal decays or is leaked to an antenna 304 (FIG. 3) of an electronic device positioned on a charging surface.

In some embodiments, the size of the aperture 506 is determined in accordance with the periodic frequency of the RF energy signal such that the RF energy signal does not leak from the aperture 506 in the unit cells 502 unless an antenna tuned to the frequency of the RF energy signal is positioned in a near-field distance (e.g., less than about 4 mm) from at least one of the unit cells 502.

Figure 6A:
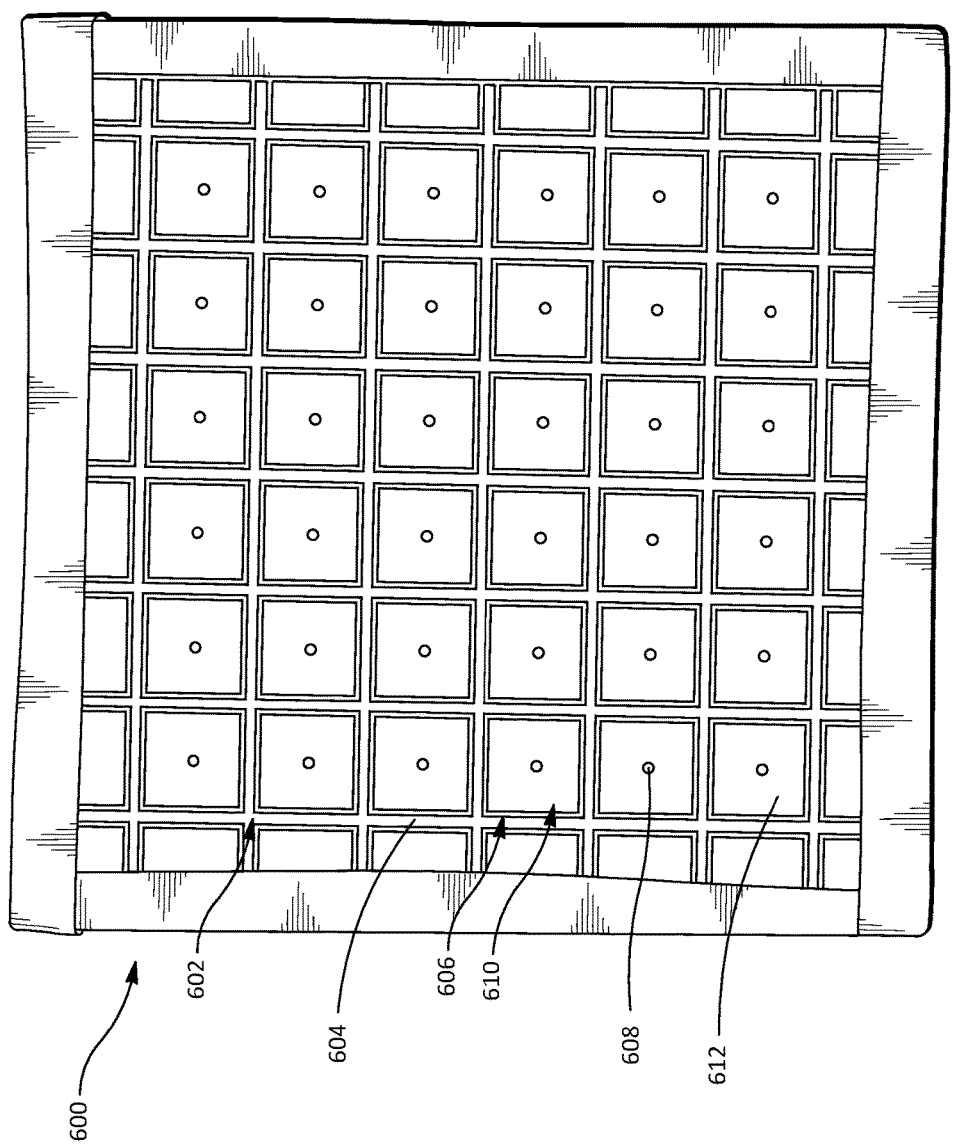
FIG. 6A is a top-side view of an example embodiment of an antenna portion of a charging surface formed with one substrate layer, in accordance with an embodiment of the present disclosure.
Figure 6B:
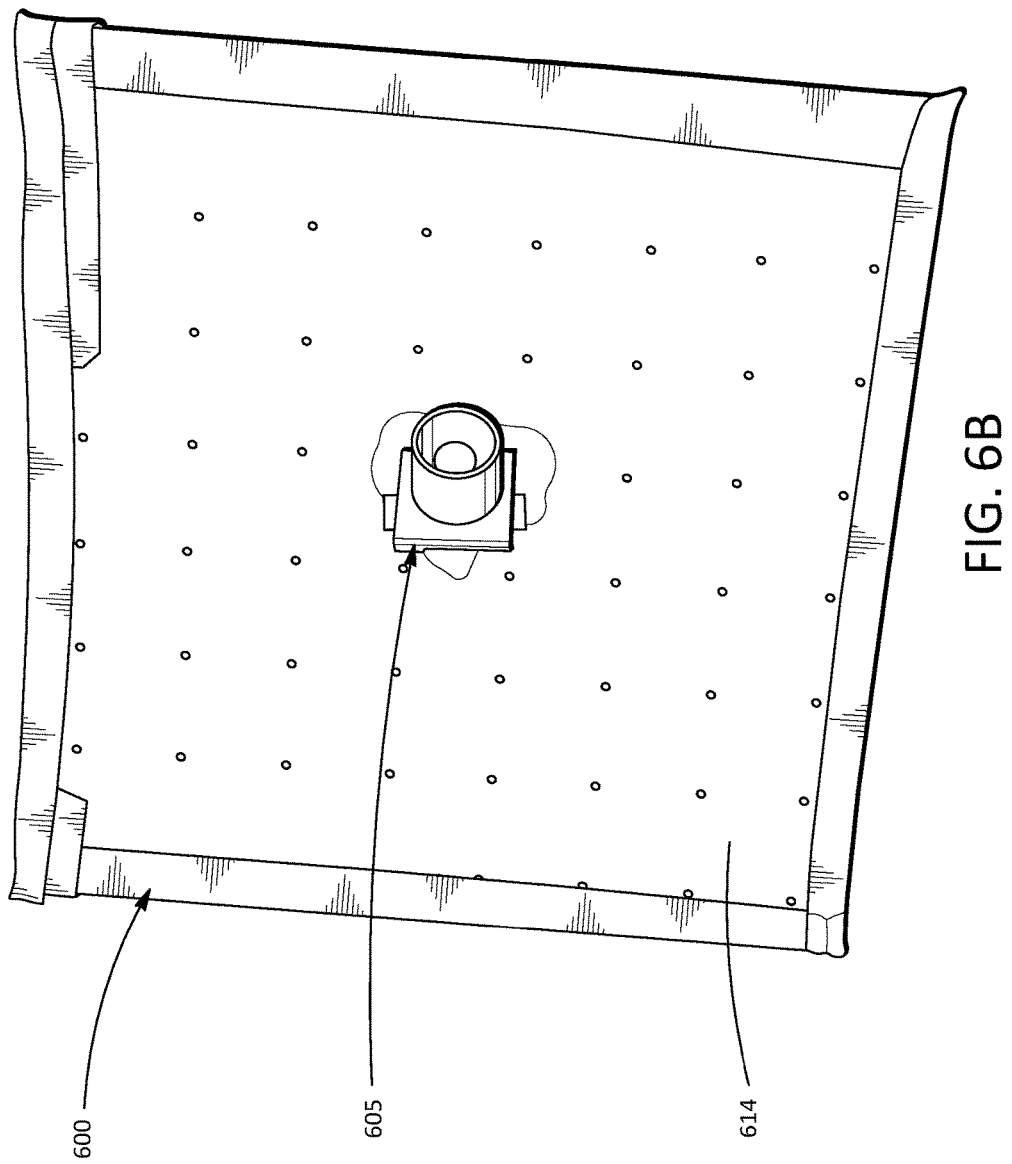
FIG. 6B illustrates a bottom-side view of an example embodiment of an antenna portion of a charging surface formed with one substrate layer, in accordance with an embodiment of the present disclosure.

Referring now to FIGS. 6A-6D, an example embodiment of an antenna portion 600 of a charging surface is provided, where the antenna portion 600 is composed of a plurality of unit cells 602 arranged in a matrix formation. Each of the unit cells 602 includes one substrate layer 615 having a metal portion 604 (e.g., copper) defining an aperture 606 positioned at the top of the unit cells 602. The unit cells 602 also include a patch antenna 610 formed by a metal patch 612 having an electrical connection through a via 608 to a ground plane 614. The ground plane 614 may be physically and electrically connected to an RF port 605, as shown in FIG. 6B. The RF port 605 may be used to provide an RF energy signal from an RF energy signal generator to be applied to each of the unit cells 602, and the ground plane 614 may be electrically connected to a ground portion of the RF port 605.

In the embodiment illustrated in FIGS. 6A-6D, the patch antenna 610 is positioned within the unit cell 602 such that the aperture 606 is formed around a perimeter of the metal patch 612. In some embodiments, the patch antenna 610 is configured to propagate the RF energy signal from the top surface of the substrate layer 615. In accordance with the present disclosure, the RF energy signal remains at or near the top surface of the substrate layer 615 until the RF energy signal decays or is received by the electronic device antenna 304.

In some embodiments, the size of the aperture 606 is determined in accordance with the periodic frequency of the RF energy signal generated by the patch antenna 610 such that the RF energy signal does not or has minimal leakage from the aperture 606 of the unit cells 602 unless an antenna tuned to the frequency of the RF energy signal is positioned in a near-field distance from at least one of the unit cells 602. The aperture 606 may be altered in dimension depending on frequency of the RF energy signal so as to be properly tuned for preventing leakage of the RF energy signal when no electronic device is positioned in the near-field. It should be understood that a number of layers of the unit cell may vary depending on the application, where different number of layers may provide different responses from the unit cells to provide different harmonic responses (e.g., higher or shifted harmonic frequencies for different wireless powering applications).

Figure 6E:
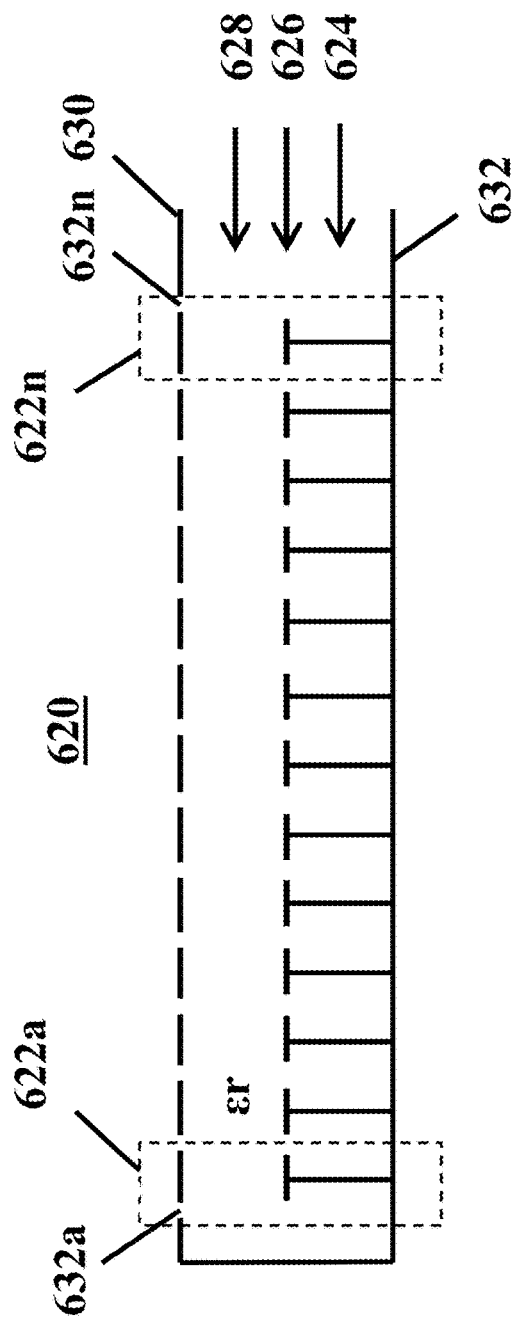
FIG. 6E is an illustration of a cross-sectional view of an illustrative charging surface inclusive of a plurality of unit cells.

FIG. 6E is an illustration of a cross-sectional view of an illustrative charging surface 620 inclusive of a plurality of unit cells 622a-622n (collectively 622). The unit cells 622 include vias 624, patches or slots 626, substrate 628, and surface element 630. The surface element 630 include a plurality of holes or patches 632a-632n (collectively 632). In one embodiment, the length and width of the unit cells 622 are between about 5 mm and about 10 mm. It should be understood that alternative dimensions may be utilized as a function of the frequency being propagated or trapped/stored by the unit cells and/or the material being used to form the surface 622. The substrate 628 may be formed of Rogers FR-4, ceramic, or other material. The use of a substrate 628, such as ceramic, allows for the dimensions of the unit cells to be smaller than otherwise possible without a substrate 628.

Resonance

A resonant coupler may be formed when a device to be charged itself enables transmission of power and operates as part of a charging system. For example, a mobile telephone having a metallic case may be utilized to complete a charging device, as further described in FIGS. 7A and 8A-8C. The charging system may work in two different stages. A first stage may provide for a field being fed through a feeding point (e.g., slot on a ground plane) into a first cavity and getting trapped in the structure of the first cavity. The first cavity may include a number of touch/leak points that are activated when being touched by or proximately close to an electronic device with a metal case. A second stage may operate when the electronic device is placed on the surface at a touch point so that energy leaks out of the second cavity formed in part by the electronic device on top of the charging surface.

FIGS. 7A, 8A-8C illustrate a cross-sectional view of the electronic device 104 positioned a distance D within a near-field distance $D_{NF}$ from a charging surface 700, in accordance with an embodiment of the present disclosure. Thus, in accordance with the present embodiment, the antenna(s) 304 of the electronic device 104 are positioned a distance D, which is within the near-field distance $D_{NF}$. The RF energy signals generated by the charging surface 700 in the near-field do not achieve a particular polarization before being received by the antenna(s) 304 of the electronic device 104. In some embodiments, the near-field distance $D_{NF}$ is less than approximately 4 mm.

Figure 7A:
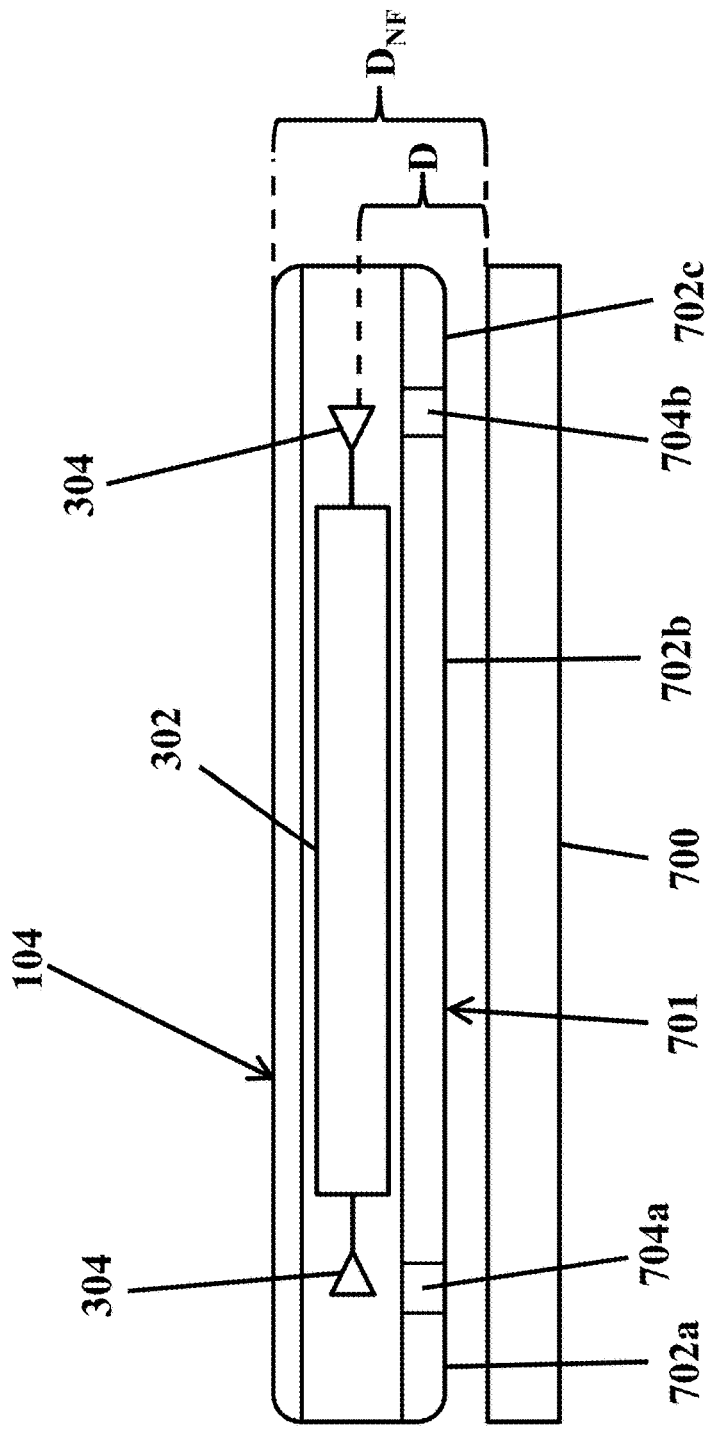
FIG. 7A illustrates a cross-sectional view of an example embodiment of an electronic device positioned within a near-field distance from a charging surface, in accordance with an embodiment of the present disclosure.
Figure 8A:
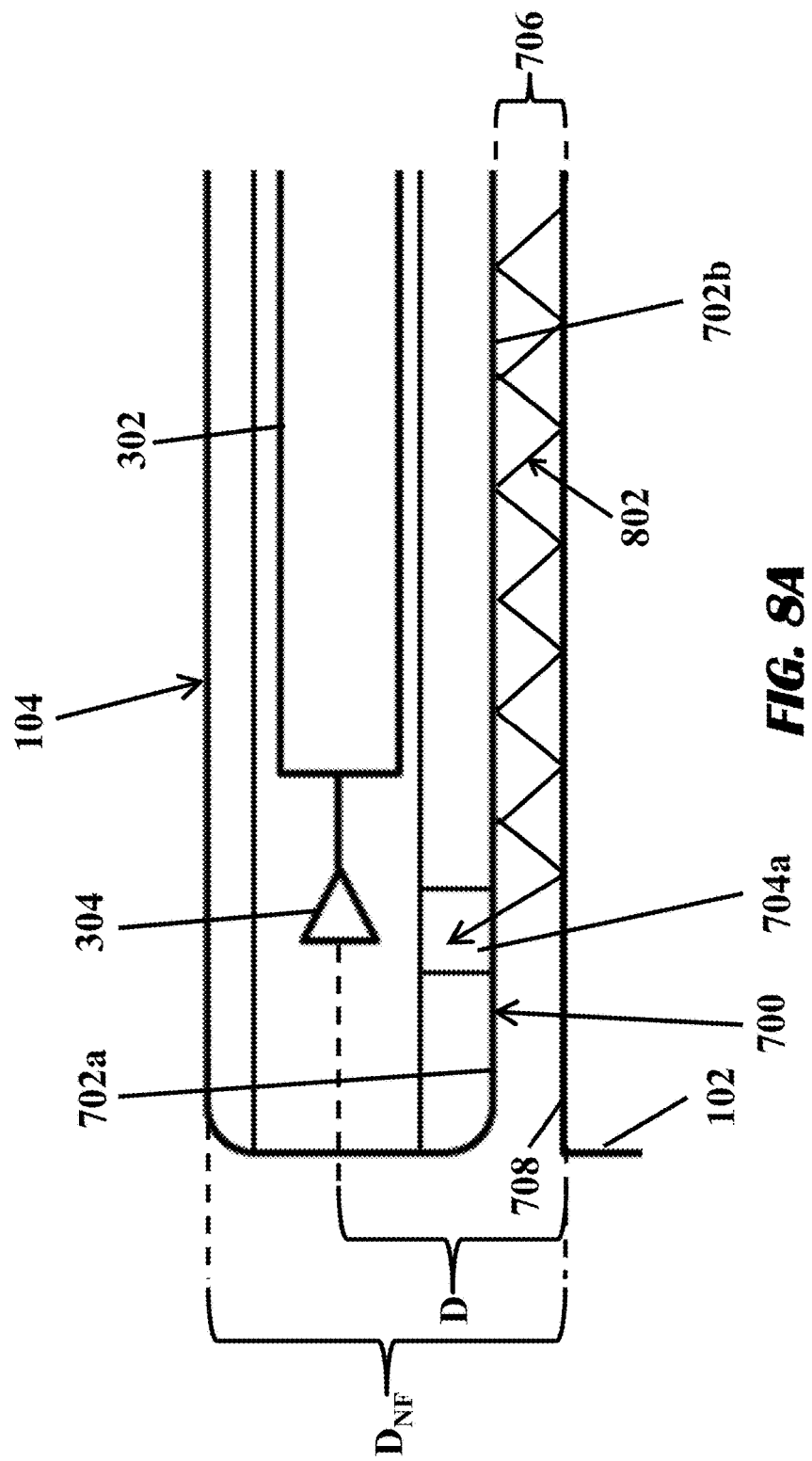
FIG. 8A illustrates resonance of an example RF energy signal located between an electronic device with metallic surface and a surface of a charging device, in accordance with an embodiment of the present disclosure.

In the embodiment illustrated in FIGS. 7A and 8A-8C, the electronic device 104 includes a back surface 701 that is generally formed of metallic surfaces 702a, 702b, and 702c and includes defining gaps 704a and 704b that are non-metallic and that may be formed of a plastic, glass, or any other material suitable to allow signal or wave transmission and/or reception. The gaps 704a and 704b are located proximate the antennas 304 such that the antennas 304 may receive signals entering through the gaps 704a and 704b. The metallic surfaces 702a, 702b, and 702c reflect RF energy signals 802, as shown in FIG. 8A, such that the RF energy signal 802 generated by the charging surface 102 traverses or resonates within a cavity 706 formed between a top surface 708 of the charging surface 700 and one or more of the metallic surfaces 702a, 702b, and 702c until it reaches at least one of the gaps 704a and 704b. The RF energy signal 802 traverses or resonates between the metal surface 702b, for example, and top surface of the charging surface 700 as a trapped wave in the cavity 706 (see FIG. 8A, RF energy signal 802 reflecting between the two surfaces). The gaps 704a and 704b are positioned above the charging surface 700, and more specifically, one or more unit cells of the charging surface 700, so that the RF energy signal 802 can traverse the cavity 706 to reach one of the gaps 704a and 704b. When the RF energy signal 802 reaches the gap 704a, the RF energy signal 802 enters through the gap 704a and is received by the device antenna 304.

More particularly, as shown in FIGS. 8B and 8C, the charging surface 700 is shown to include a cover 802 within which a first cavity 804a and a second cavity 804b (collectively 804) are formed by a ground plane 806 that separates the two cavities 804. The ground plane may be formed of metamaterial, as described herein. The charging surface 700 may also include one or more touch points 810 from which an RF energy signal emanates. In operation, a first stage may provide for an RF energy signal being fed through a feeding point (e.g., slot on a ground plane) into the first cavity 804a and gets trapped in the structure of the first cavity 804a. The first cavity 804a may include a number of touch/leak points 810 that are activated when being touched by or proximately close to an electronic device with a metal case. A second stage may operate when the electronic device is placed on the cover 802 at least one of the touch points 810 so that energy leaks out of the second cavity 804b formed in part by the electronic device on top of the cover 802 of the charging surface 700. Because only a few touch points 810 are utilized in this charging surface 700, fewer power amplifiers are needed to supply RF energy signals, thereby costing less than having many more touch points. In one embodiment, four touch points 810 may be utilized. However, it should be understood that the number of touch points may vary depending on the size of the area provided by the charging surface 700. If a large area (e.g., desk) is provided, then more touch points 810 are provided. If a smaller area (e.g., pad) is provided, then fewer touch points 810 are provided.

In some embodiments, such as that shown in FIGS. 7A and 8A, the metallic surfaces 702a, 702b, and 702c are positioned substantially parallel to the top surface 708 of the charging surface 700. Although the RF energy signal 802 is represented in FIG. 8A as having a triangle waveform reflection, it should be appreciated that the RF energy signal 802 may be reflected in other patterns, as understood in the art. As used herein, "traverses" refers to the RF energy signal travelling along or through a space or cavity by reflecting off of surfaces.

Figure 8D:
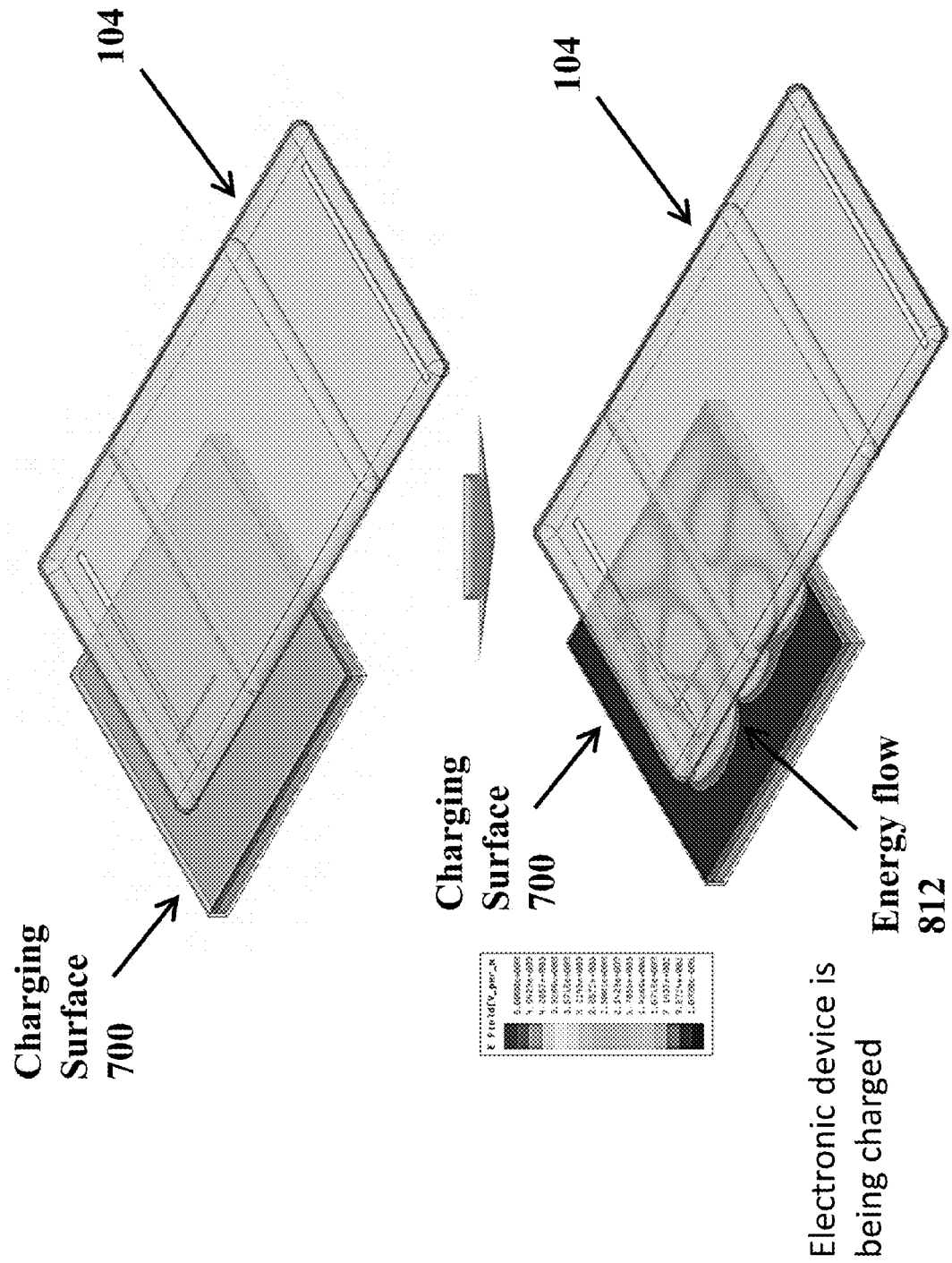

FIG. 8D shows the electronic device 104 being placed on the charging surface 700. As the electronic is placed on the charging surface 700, energy flow 812 from an RF energy signal is created in the cavity formed by the electronic device 104 and the charging surface.

Figure 7B:
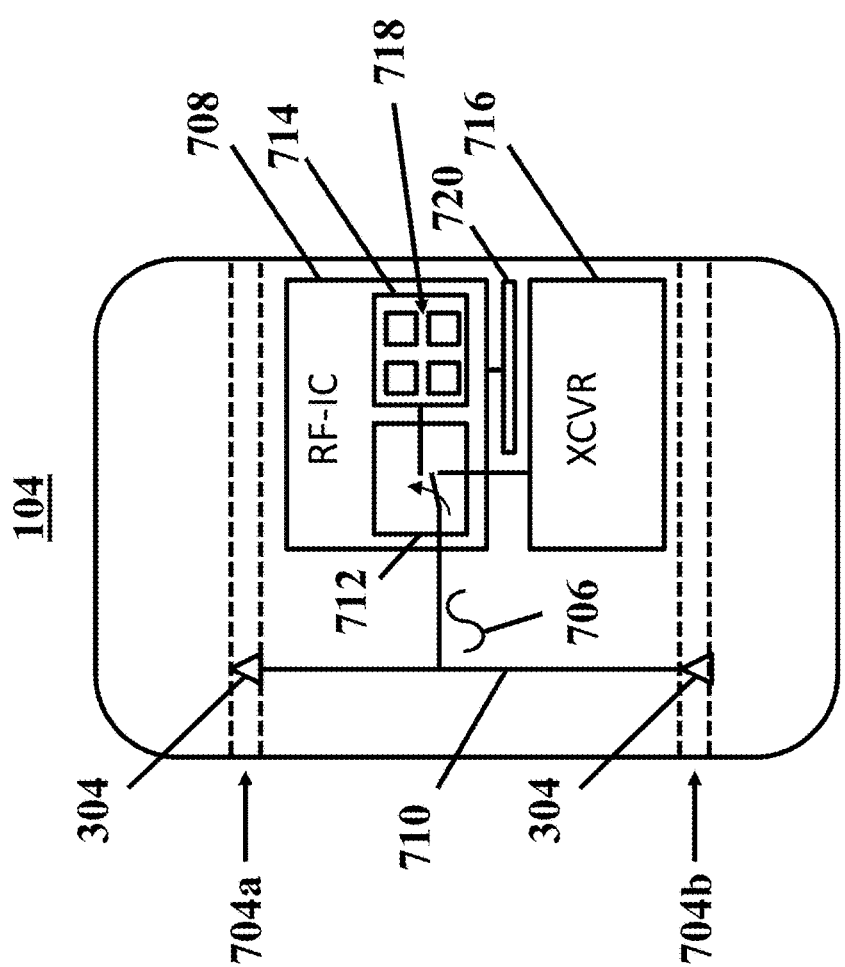
FIG. 7B illustrates an illustrative electronic schematic of the electronic device of FIG. 7A.

FIG. 7B illustrates an illustrative electronic schematic of the electronic device 104 of FIG. 7A. The electronic device 104 is shown to include the two gaps 704 within which the antennas 304 are positioned to receive RF signals 706. The antennas 304 are in electrical communication with an RF integrated circuit (RF-IC) 708 via electrical conductor 710. The RF-IC 708 is shown to include a switch 712 and rectifier device 714. The switch 712 may be configured to cause the RF signals 706 to be routed to a transceiver (XCVR) 716 when communications signals. The transceiver 716 is a conventional transceiver used for user communications, as understood in the art. However, in response to the RF signals 706 crossing a certain threshold level, such as 0.1 W or 0.25 W, the switch 712 may be activated to cause the RF signals 706 to be routed to the rectifier device 714 that includes one or more rectifiers 718 therein. The switch 712 may be a solid state switch, as understood in the art. An output from the rectifier device 714 may be routed to a battery 720 used to power the electronic device 104.

Figure 9:
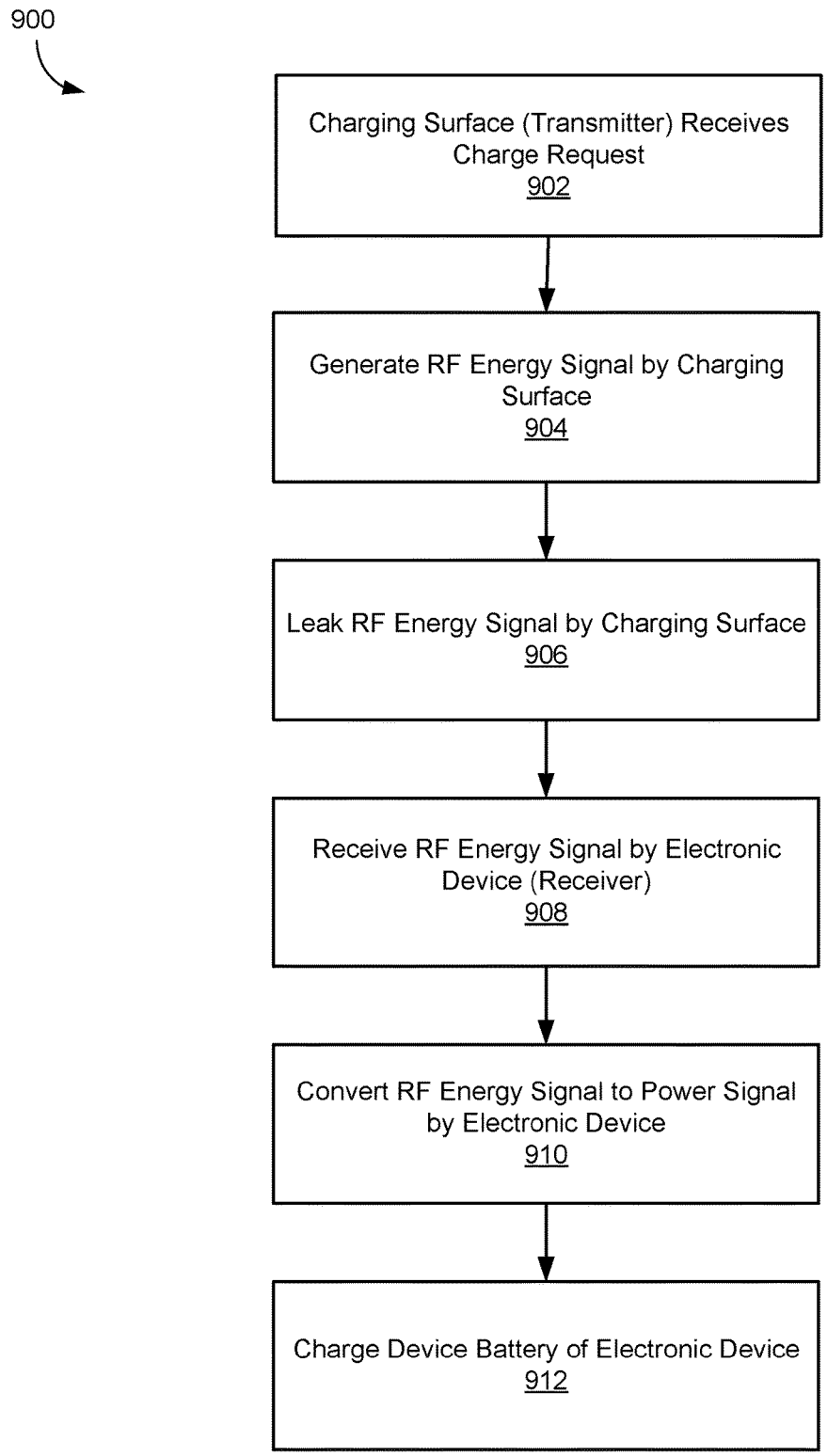
FIG. 9 illustrates a flow diagram of an example method for charging an electronic device using a charging surface, where the electronic device communicates a signal indicative of a request to charge or otherwise pairs with the charging surface, in accordance with an embodiment of the present disclosure.

Referring now to FIG. 9, an example method is shown in flow diagram 900 for charging the electronic device 104 with the charging surface 102 in accordance with an embodiment of the present disclosure. In the embodiment illustrated in FIG. 9, the charging surface 102 communicates with the electronic device 104 via respective communication components 210 and 310. At step 902, the charging surface communication component 210 receives, from the electronic device communication component 310, a signal indicative of a request to charge the electronic device 104. In some embodiments, this signal may include, for example, an identification of the electronic device 104, a battery level, power requirements of the electronic device 104, or other information. For example, in some instances, the electronic device 104 may be a device having a lower power requirement, such as, for example, a smart-watch or other wearable technology. In order to avoid receiving a large power surge that would damage the smart-watch, the charge request could include a power limit, such as, 0.5 W. Alternative power levels may be utilized, as well. Similarly, the electronic device 104 may have a larger power requirement. In such cases, the charge request could include the larger power requirement, such as 5 W, for charging the electronic device 104.

Rather than receiving an active charge request, the charging surface may receive or sense any wireless or radiation signal from an electronic device that indicates that an electronic device is proximate to the charging surface, including but not limited to the presence or absence of reflection of an RF energy signal transmitted by the charging surface. Any receiver or sensor may be utilized to sense such a signal from an electronic device. In an alternative embodiment, a proximity switch or pressure switch may be utilized to detect that an electronic device is proximate to or positioned on the charging surface. Still yet, a magnetic switch or light switch may be utilized.

At step 904, the microcontroller 208 initiates generation of an RF energy signal in accordance with the data provided in the charge request. For example, if the charge request indicates the power requirements of the electronic device 104, then the microcontroller 208 causes the RF energy signal to be generated such that the power transmitted to the electronic device 104 complies with the power requirements communicated in the charge request. In accordance with the above example of a smart-watch, the microcontroller 208 may cause the charging surface 102 to generate an RF energy signal capable of providing wireless power transfer of 0.5 W to the smart-watch. In one embodiment, if an electronic device is sensed, then an RF energy signal may be generated.

As discussed herein, the RF energy signal is generated in the unit cells of the charging surface 102, and substantially remains in the unit cells until the RF energy signal decays or is leaked. When an antenna 304 tuned to the frequency of the RF energy signal is placed within a near-field distance from one or more of the unit cells, those unit cell(s) allow the RF energy signal to leak to the antenna 304 at step 906.

As step 908, the leaked RF energy signal is received at the antenna(s) 304 tuned to the frequency of the RF energy signal and placed within the near-field distance from the unit cell(s).

At step 910, the received RF energy signal is converted to a power signal to charge the battery 312 of the electronic device 104. This step may include detecting the RF energy signal received at the antenna 304, activating the switch mechanism 305 when the RF energy signal is indicative of a power signal greater than the threshold value (e.g., 10 mW) rectifying the signal via the rectifier 306, and converting the rectified signal to a DC power signal via the converter 308. The power signal is then used to charge or operate the electronic device battery 312 at step 912.

Although it is not illustrated in the flow diagram 900, the communications component 310 may, in some embodiments, transmit a signal to the charging surface 102 to request that the charging be suspended or discontinued. This may happen, for example, if the battery 312 of the electronic device 104 is completely charged or reaches a desired charge level, the electronic device 104 is being turned off, the communications component 310 is being turned off or moved out of communication range with the communications component 210, or for other reasons. In another embodiment, in the event that the electronic device is no longer being sensed, electronically, physically or otherwise depending on the sensor being utilized, then the communications component 210 may be turned off.

Figure 10:
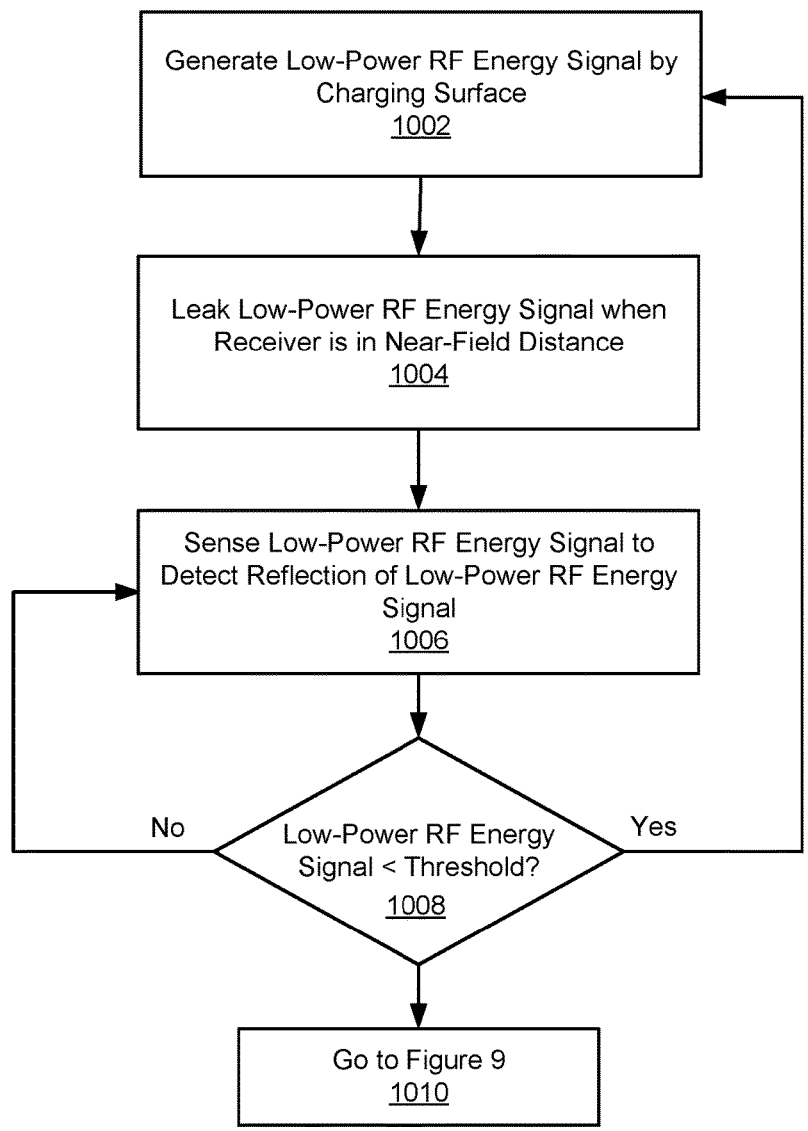
FIG. 10 illustrates a flow diagram of an example method for charging an electronic device using a charging surface when the electronic device does not communicate a signal indicative of a request to charge, in accordance with an embodiment of the present disclosure.

Referring now to FIG. 10, an example method is shown in flow diagram 1000 for sensing the presence of and charging the electronic device 104 with the charging surface 102 in accordance with an embodiment of the present disclosure. In the embodiment illustrated in FIG. 10, the electronic device 104 does not communicate with the charging surface 102 via respective communication components 210 and 310. This embodiment is representative of instances where the electronic device 104 is turned off, has a drained battery, or is otherwise unable to communicate with the charging surface 102. Thus, in the present embodiment, the charging surface 102 operates in a manner so as to avoid flooding an undetected electronic device 104 with excessive power. This is the manner that a receiver with a dead battery, and hence no ability to communicate with the transmitter, may be charged.

At step 1002, the charging surface 102 generates a low-power RF energy signal, which is an RF energy signal capable of providing wireless, low-power transmission to an electronic device 104. Specifically, the microcontroller 208 initiates generation of the low-power RF energy signal such that the power capable of being transmitted via the low-power RF energy signal is "low-power." For example, in some embodiments, low-power is 1 W. Alternative power levels may be utilized, as well. In some embodiments, detecting that an electronic device is positioned within a near-field distance of the charging surface may be accomplished by activating the unit cell patch antennas 204 with a 1% duty cycle.

In accordance with the present disclosure, the low-power RF energy signal is generated in the unit cells of the charging surface 102, and remains in the unit cells until the low-power RF energy signal decays or is leaked. When an antenna 304 tuned to the frequency of the low-power RF energy signal is placed within a near-field distance from one or more of the unit cells, those unit cells allow the RF energy signal to leak to the antenna 304 at step 1004.

At step 1006, the microcontroller 208 may sense the low-power RF energy signal present in the unit cells. For example, in some embodiments, the microcontroller 208 may include sensing circuitry, such as, an RF coupler capable of detecting a "reflection" of the low-power RF energy signal, where the reflection is representative of, for example, approximately 10% of the low-power RF energy signal present in the unit cells. The microcontroller 208 may, therefore, calculate the low-power RF energy signal present in the unit cells based on the reflected value sensed by the microcontroller 208. Although the sensing performed at step 1006 is illustrated in a sequential order in FIG. 10, it should be appreciated that this step may be performed in any order or repeated continuously in parallel with the processes performed in the flow diagram 1000. The low-power RF energy signal may be generated periodically or aperiodically in a pulsed or other manner to determine if an electronic device is present, as indicated in the diagram 1000.

Once the microcontroller 208 senses the low-power RF energy signal present in the unit cells, the sensed low-power RF energy is compared to a threshold value at step 1008 to determine whether to generate a subsequent low-power RF energy signal within the unit cells. Instances in which the sensed low-power RF energy signal is less than the threshold value are indicative of a situation in which the low-power RF energy signal has either decayed or leaked to an antenna tuned to the frequency of the low-power RF energy signal and positioned within a near-field distance from one or more of the unit cells. Thus, if the sensed low-power RF energy signal is less than the threshold, it is presumed the low-power RF energy signal has either leaked or decayed, so the process returns to step 1002 and the microcontroller 208 activates the antennas 204 to generate a subsequent low-power RF energy signal. Otherwise, when the reflection is above the threshold, the low-power RF energy signal remains in the substrate and subsequent RF signals are not generated so that the unit cells of the charging surface 102 do not continue to build up energy. Accordingly, the process returns to step 1006, and the microcontroller 208 continues to sense the low-power RF energy signal present in the unit cells.

The method illustrated in FIG. 10 is indicative of a situation m which no communication component 310 is communicating with the charging surface 102. For example, the battery 312 of the electronic device 104 may be too depleted to activate the communication component 310. However, once the battery 312 has sufficient charge, the electronic device 104 may, in some embodiments, activate the communication component 310. At that time, the communication component 310 may initiate communication with the communication component 210 of the charging surface 102, and the charging surface 102 may switch (illustrated at step 1010, FIG. 10) to the charging method illustrated in FIG. 9 and described above.

Harmonic Filter

Figures 11A, 11B:
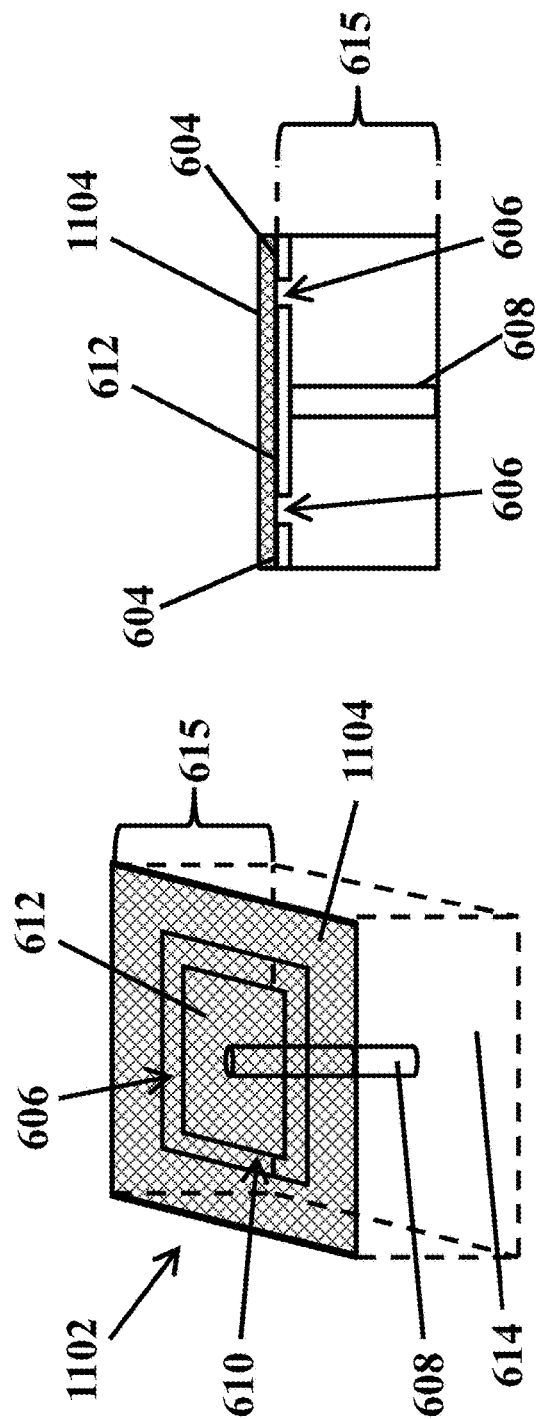
FIG. 11A illustrates a perspective view of an embodiment of a unit cell of a charging surface having a harmonic screen filter element, where the harmonic screen filter element is positioned on or above a top surface of the unit cell.
FIG. 11B illustrates a cross-sectional view of an embodiment of a unit cell of a charging surface having a harmonic screen filter element (note, the harmonic filter screen may also be made of periodic unit cells), where the harmonic screen filter element is positioned on or above a top surface of the unit cell.

In conventional power-transmission systems, various electronic elements that form the system are often lumped together, and losses experienced by each lumped element are compounded such that the system, as a whole, experiences a larger loss than each of the elements individually. For example, if a system has an antenna that is 90% efficient lumped with an amplifier that is 90% efficient, then the combined efficiency of a system comprising these two elements is approximately 81%. As more elements are added, the overall efficiency of the system is further reduced. Accordingly, in order to increase the efficiency of the disclosed charging surface, some embodiments of the charging surface may include filter elements such as, a harmonic filter, to reduce the radiated energy in frequencies other than the intended wireless charging signal, and specifically to reduce the energy in the harmonics of the intended wireless charging signal. A harmonic filter may, for example, attenuate these frequency components by 40 dB to 70 dB FIGS. 11A and 11B illustrate perspective and cross-sectional views, respectively, of a representative unit cell 1102 comprising an embodiment of the charging surface 102, where each unit cell 1102 has a harmonic filter element 1104 positioned on a top surface of the unit cell 1102. The unit cell 1102 illustrated in FIGS. 11A and 11B is similar to that described above and shown in FIGS. 6A-6D, however, the harmonic filter element 1104 may be placed on a top surface of unit cells of a different embodiment, such as the embodiment described above and illustrated in FIGS. 5A-5D.

It should be appreciated that the harmonic filter element 1104 included in each unit cell 1102 may be a discrete filter element, or it may be a portion of a larger, single harmonic filter element spanning the top surfaces of multiple unit cells 1102 forming the charging surface 102. Thus, the charging surface 102 includes, in such embodiments, a harmonic filter element 1104 placed over the unit cells 1102 such that the charging surface 102 includes a harmonic filter positioned over a matrix (or array) of transmit antennas (e.g., patch antennas 610).

In the embodiment illustrated in FIGS. 11A and 11B, each of the unit cells 1102 includes a single substrate layer 615, and the harmonic filter element 1104 present in each of the unit cells 1102 comprises a single harmonic filter element spanning the entire top surface area of the unit cells 1102. In other embodiments, however, the harmonic filter element 1104 may include multiple harmonic filter elements, where one of the multiple harmonic filter elements are disposed on a top surface of one of the elements forming the unit cells 1102. It should be understood that the unit cell with the harmonic rejection filter may be formed by a more complex unit cell, such as a unit cell that includes more layers and features within the unit cell. For example, this latter embodiment could be represented by a harmonic filter element 1104 placed on the top surface area of the patch antenna 610, a harmonic filter element 1104 placed on the top surface area of the metal portion 604, and no harmonic filter element covering the aperture 606.

In some embodiments, the harmonic filter element 1104 is formed of two or more screen layers, wherein each layer includes a screen to filter out specific harmonics of the intended wireless charging signal. The harmonic filter 1104 acts to filter the RF energy signal generated by the patch antenna 610 such that the RF energy signal operates at a particular frequency (also referred to herein as a center frequency). As a result of the harmonic filter element 1104 being a passive mechanical device, loss in signal power is reduced as compared with an electronic filter.

Figure 12B:
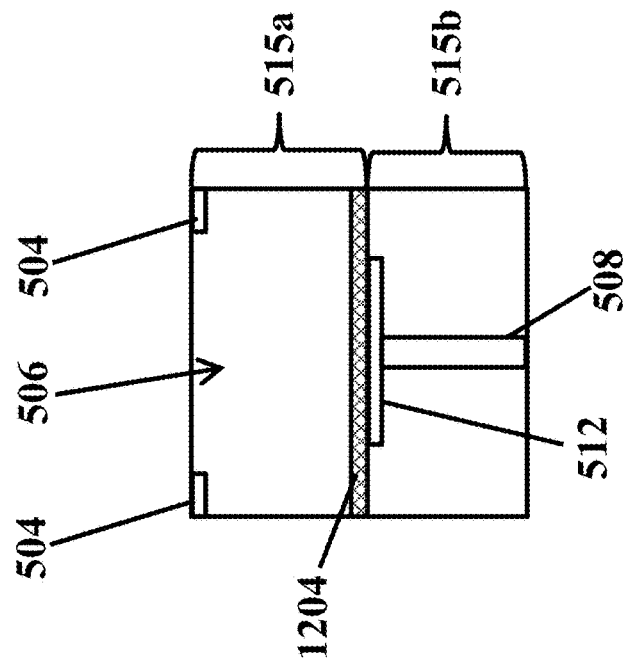
FIG. 12B illustrates a cross-sectional view of an embodiment of a unit cell of a charging surface having a harmonic screen filter element, where the harmonic screen filter element is positioned within a substrate layer of the unit cell.
Figure 12A:
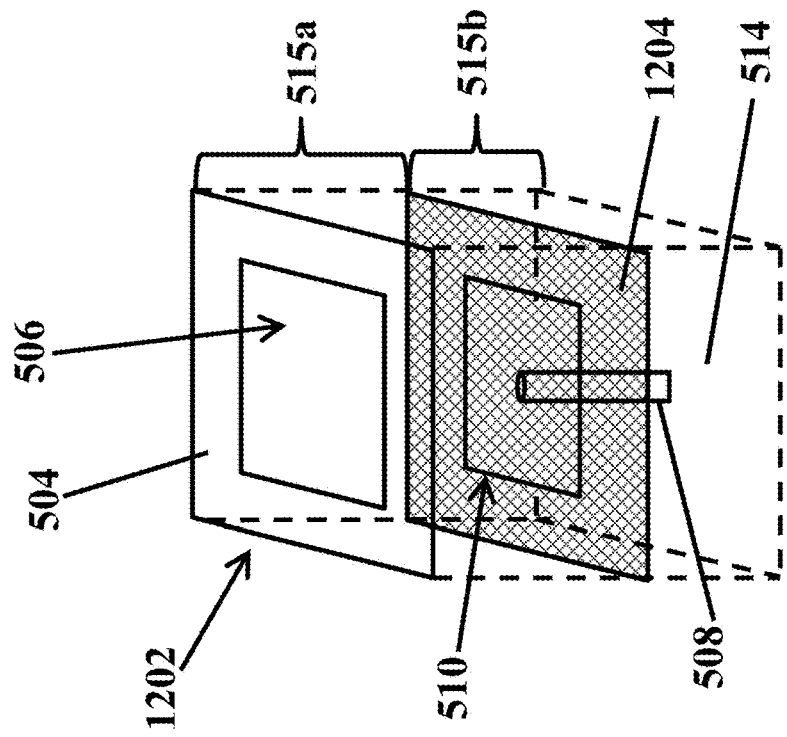
FIG. 12A illustrates a perspective view of an embodiment of a unit cell of a charging surface having a harmonic screen filter element, where the harmonic screen filter element is positioned within a substrate layer of the unit cell.

FIGS. 12A and 12B illustrate perspective and cross-sectional views, respectively, of a representative unit cell 1202 comprising an embodiment of the charging surface 102, where each unit cell 1202 has a harmonic filter element 1204 positioned within a top substrate layer 515a of the unit cell 1202 (or optionally between the top substrate layer 515a and a bottom substrate layer 515b). It should be appreciated that the harmonic filter element 1204 included in each unit cell 1202 may be a discrete filter element, or it may be a portion of a larger, single harmonic filter element spanning the top substrate layers 515a of multiple unit cells 1202 forming the charging surface 102. Thus, the charging surface 102 includes, in such embodiments, a harmonic filter element 1204 placed within the top substrate layers 515a of the unit cells 1202 such that the charging surface 102 includes a harmonic filter positioned over a matrix (or array) of transmit antennas (e.g., patch antennas 510).

In the embodiment illustrated in FIGS. 12A and 12B, the unit cells 1202 include a top substrate layer 515a and a bottom substrate layer 515b, and the harmonic filter element 1204 present in the top substrate layer 515a of each of the unit cells 1202 comprises a single harmonic filter element spanning the entire area of the top substrate layer 515a of the unit cells 1202. In other embodiments, however, the harmonic filter element 1204 may span only a portion of the top substrate layer 515a such that the harmonic filter element 1204 is disposed above only the patch antenna 510, which is located in the bottom substrate layer 515b.

In some embodiments, the harmonic filter element 1204 is formed of two or more screen layers, wherein each layer includes a screen to filter out specific harmonics of the intended wireless charging signal. The harmonic filter 1204 acts to filter the RF energy signal generated by the patch antenna 510 such that the RF energy signal operates at a particular frequency (also referred to herein as a center frequency). As a result of the harmonic filter element 1204 being a passive mechanical device, loss in signal power is reduced as compared with an electronic filter.

The foregoing method descriptions and flow diagrams are provided merely as illustrative examples and are not intended to require or imply that the steps of the various embodiments must be performed in the order presented. The steps in the foregoing embodiments may be performed in any order. Words such as "then," "next," etc., are not intended to limit the order of the steps; these words are simply used to guide the reader through the description of the methods. Although process flow diagrams may describe the operations as a sequential process, many of the operations can be performed in parallel or concurrently. In addition, the order of the operations may be rearranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or the like, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory, processor-readable storage media may be any available media that may be accessed by a computer. By way of example, and not limitation, such non-transitory, processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method of wirelessly delivering power to a receiver device, the method comprising:
    while a receiver device lacks sufficient power to send an electromagnetic communication signal:
        radiating, via an antenna of a unit cell included in a near-field charging pad, a radio frequency (RF) power transmission wave at a first power level, wherein the near-field charging pad includes a plurality of unit cells, including the unit cell;
        detecting, by the near-field charging pad, an amount of energy associated with the RF power transmission wave that is reflected by one or more of the plurality of unit cells;
        determining, by the near-field charging pad, that the receiver device is within a near-field charging distance of the near-field charging pad when the amount satisfies a threshold; and
    in response to determining that the receiver device is within the near-field charging distance of the near-field charging pad, continuing to radiate, via the antenna of the unit cell, the RF power transmission wave at the first power level; and
    upon receiving an electromagnetic communication signal generated by the receiver device:
        ceasing to radiate the RF power transmission wave at the first power level; and
        radiating, via the antenna of the unit cell, a new RF power transmission wave at a second power level greater than the first power level.

2. The method of claim 1, wherein radiating the RF power transmission wave at the first power level occurs before detecting any receiver devices within the near-field distance of the near-field charging pad.

3. The method of claim 1, wherein:
    the electromagnetic communication signal includes device-specific characteristics of the receiver device, and
    the second power level of the new RF power transmission wave radiated by the antenna of the unit cell is determined based at least in part on the device-specific characteristics of the receiver device.

4. The method of claim 3, wherein the device-specific characteristics include one or more of: an identifier of the receiver device, a battery level of the receiver device, and a power requirement of the receiver device.

5. The method of claim 1, wherein:
    the near-field charging pad includes a communications radio for receiving the electromagnetic communication signal from the receiver device; and
    the receiver device includes a corresponding communications radio for sending the electromagnetic communications signal to the near-field charging pad.

6. The method of claim 1, wherein each unit cell in the plurality of unit cells radiates, via a respective antenna, a respective RF power transmission wave at the first power level.

7. The method of claim 6, wherein the detecting of the amount of energy associated with the RF power transmission wave is performed in conjunction with detecting a respective amount of energy associated with each of the RF power transmission waves that is reflected by the plurality of unit cells of the near-field charging pad.

8. The method of claim 1, wherein:
    the near-field charging pad includes a controller and an RF coupler;
    the controller is connected with the RF coupler; and
    the RF coupler (i) detects the amount of energy associated with the RF power transmission wave that is reflected by the one or more unit cells of the plurality of unit cells and (ii) provides the amount to the controller.

9. The method of claim 1, wherein the receiver device includes:
    a wireless power receiver for receiving RF power transmission waves; and
    an electronic device coupled with the wireless power receiver.

10. A near-field charging pad for wirelessly delivering power to a receiver device, the near-field charging pad comprising:

while a receiver device lacks sufficient power to send an electromagnetic communication signal:
  radiating, via an antenna of a unit cell included in a near-field charging pad, a radio frequency (RF) power transmission wave at a first power level, wherein the near-field charging pad includes a plurality of unit cells, including the unit cell;
  detecting, by the near-field charging pad, an amount of energy associated with the RF power transmission wave that is reflected by one or more of the plurality of unit cells;
  determining, by the near-field charging pad, that the receiver device is within a near-field charging distance of the near-field charging pad when the amount satisfies a threshold; and
  in response to determining that the receiver device is within the near-field charging distance of the near-field charging pad, continuing to radiate, via the antenna of the unit cell, the RF power transmission wave at the first power level; and
upon receiving an electromagnetic communication signal generated by the receiver device:
  ceasing to radiate the RF power transmission wave at the first power level; and
  radiating, via the antenna of the unit cell, a new RF power transmission wave at a second power level greater than the first power level.

11. The near-field charging pad of claim 10, wherein radiating the RF power transmission wave at the first power level occurs before detecting any receiver devices within the near-field distance of the near-field charging pad.

12. The near-field charging pad of claim 10, wherein:
the electromagnetic communication signal includes device-specific characteristics of the receiver device, and
the controller is further configured to determine the second power level of the new RF power transmission wave based at least in part on the device-specific characteristics of the receiver device.

13. The near-field charging pad of claim 12, wherein the device-specific characteristics include one or more of: an identifier of the receiver device, a battery level of the receiver device, and a power requirement of the receiver device.

14. The near-field charging pad of claim 10, wherein:
the near-field charging pad includes a communications radio for receiving the electromagnetic communication signal from the receiver device; and
the receiver device includes a corresponding communications radio for sending the electromagnetic communications signal to the near-field charging pad.

15. The near-field charging pad of claim 10, wherein each unit cell in the plurality of unit cells radiates, via a respective antenna, a respective RF power transmission wave with the at the first power level.

16. The near-field charging pad of claim 15, wherein the detecting of the amount of energy associated with the RF power transmission wave is performed in conjunction with detecting a respective amount of energy associated with each of the RF power transmission waves that is reflected by the plurality of unit cells of the near-field charging pad.

17. The near-field charging pad of claim 10, wherein:
the controller is connected with the RF coupler; and
the RF coupler (i) detects the amount of energy associated with the RF power transmission wave that is reflected by the one or more unit cells of the plurality of unit cells and (ii) provides the amount to the controller.

18. The near-field charging pad of claim 10, wherein the receiver device includes:
a wireless power receiver for receiving RF power transmission waves; and
an electronic device coupled with the wireless power receiver.

19. A non-transitory computer-readable storage medium storing executable instructions that, when executed by one or more processors that are in communication with a near-field charging pad, cause the near-field charging pad to:
while a receiver device lacks sufficient power to send an electromagnetic communication signal:
  radiating, via an antenna of a unit cell included in a near-field charging pad, a radio frequency (RF) power transmission wave at a first power level, wherein the near-field charging pad includes a plurality of unit cells, including the unit cell;
  detecting, by the near-field charging pad, an amount of energy associated with the RF power transmission wave that is reflected by one or more of the plurality of unit cells;
  determining, by the near-field charging pad, that the receiver device is within a near-field charging distance of the near-field charging pad when the amount satisfies a threshold; and
  in response to determining that the receiver device is within the near-field charging distance of the near-field charging pad, continuing to radiate, via the antenna of the unit cell, the RF power transmission wave at the first power level; and
upon receiving an electromagnetic communication signal generated by the receiver device:
  ceasing to radiate the RF power transmission wave at the first power level; and
  radiating, via the antenna of the unit cell, a new RF power transmission wave at a second power level greater than the first power level.

20. The non-transitory computer-readable storage medium of claim 19, wherein radiating the RF power transmission wave at the first power level occurs before detecting any receiver devices within the near-field distance of the near-field charging pad.

21. The non-transitory computer-readable storage medium of claim 19, wherein:
the electromagnetic communication signal includes device-specific characteristics of the receiver device, and
the second power level of the new RF power transmission wave radiated by the antenna of the unit cell is determined based at least in part on the device-specific characteristics of the receiver device.

22. The non-transitory computer-readable storage medium of claim 21, wherein the device-specific characteristics include one or more of: an identifier of the receiver device, a battery level of the receiver device, and a power requirement of the receiver device.

23. The non-transitory computer-readable storage medium of claim 19, wherein:
the near-field charging pad includes a communications radio for receiving the electromagnetic communication signal from the receiver device; and
the receiver device includes a corresponding communications radio for sending the electromagnetic communications signal to the near-field charging pad.

24. The non-transitory computer-readable storage medium of claim 19, wherein the receiver device includes:

a wireless power receiver for receiving RF power transmission waves; and an electronic device coupled with the wireless power receiver.

\* \* \* \* \*